(12) United States Patent
Kempen et al.

(10) Patent No.: US 7,391,948 B2
(45) Date of Patent: Jun. 24, 2008

(54) OPTICAL WAVEGUIDE STRUCTURE

(75) Inventors: Lothar U. Kempen, Redondo Beach, CA (US); Rongchung Tyan, Irvine, CA (US); Edgar A. Mendoza, Redondo Beach, CA (US)

(73) Assignee: Richard Nagler, Manhattan Beach, CA (US)

( * ) Notice: Subject to any disclaimer, the term of this patent is extended or adjusted under 35 U.S.C. 154(b) by 0 days.

(21) Appl. No.: 11/093,275

(22) Filed: Mar. 28, 2005

(65) Prior Publication Data

US 2006/0029348 A1 Feb. 9, 2006

Related U.S. Application Data

(63) Continuation of application No. 10/080,288, filed on Feb. 19, 2002, now abandoned.

(51) Int. Cl.
G02B 6/26 (2006.01)
G02B 6/10 (2006.01)
G02B 6/12 (2006.01)
G02B 6/14 (2006.01)

(52) U.S. Cl. .................. 385/132; 385/14; 385/28; 385/43; 385/130; 385/131

(58) Field of Classification Search .............. 385/14, 385/43, 129–132
See application file for complete search history.

(56) References Cited

U.S. PATENT DOCUMENTS

| | | | |
|---|---|---|---|
| 5,175,788 A * | 12/1992 | Miura et al. | 385/131 |
| 2002/0021879 A1 * | 2/2002 | Lee et al. | 385/129 |
| 2003/0044118 A1 * | 3/2003 | Zhou et al. | 385/43 |
| 2003/0081902 A1 * | 5/2003 | Blauvelt et al. | 385/50 |
| 2003/0114006 A1 * | 6/2003 | White | 438/694 |
| 2003/0117691 A1 * | 6/2003 | Bi et al. | 359/333 |

* cited by examiner

Primary Examiner—M R Connelly-Cushwa
(74) Attorney, Agent, or Firm—Lawrence S. Cohen; Herbert M. Shapiro

(57) ABSTRACT

Waveguide structures in which light confinement strength varies along the direction of light propagation are described. The waveguides include a core adapted to propagate light along a path defined by the core and a cladding material that at least partially surrounds the core. The core and the cladding material each have a refractive index profile in the direction of light propagation. One or more of the profiles or lateral core dimensions are varied along the direction of light propagation, thereby causing the degree of light confinement to vary in the direction of light propagation. With such structures it is possible to tailor the velocity of the light propagating through the core and the confinement of the light to the core for any given core cross section. The structures may be used, for example, in mode-matching an input or output of a waveguide and in fabricating compact directional couplers.

12 Claims, 27 Drawing Sheets

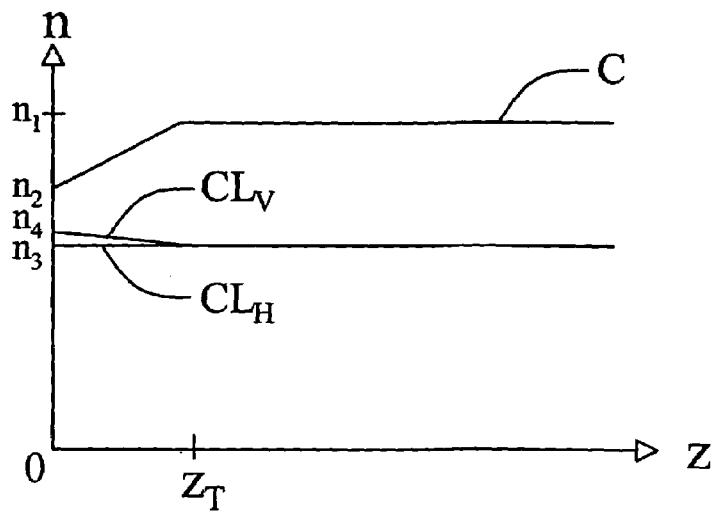
FIG. 15
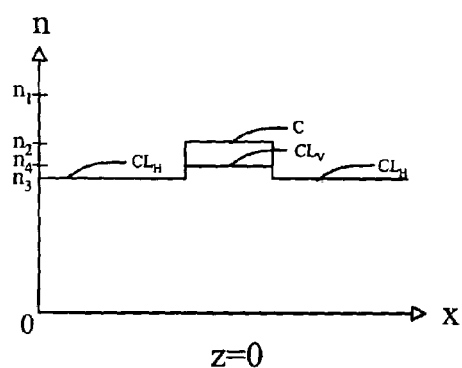    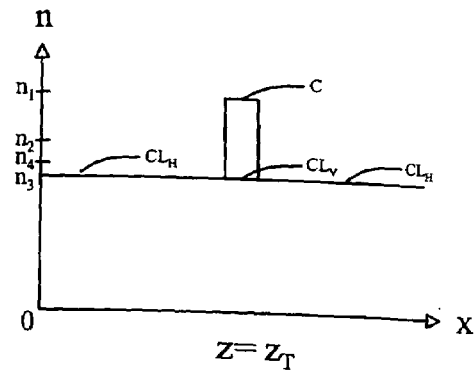
FIG. 16A            FIG. 16B

OPTICAL WAVEGUIDE STRUCTURE

This application is a continuation of U.S. patent application Ser. No. 10/080,288, filed Feb. 19, 2002 now abandoned, which is hereby incorporated by reference in its entirety.

FIELD OF THE INVENTION

The field of the present invention relates to integrated optical devices and methods of fabricating such devices.

BACKGROUND OF THE INVENTION

Optical waveguides are structures that confine the optical field in one or two spatial dimensions and allow propagation of light in the third dimension. Confinement of the light is achieved by surrounding a core region of given refractive index with materials of lower refractive index to allow light in the core to be totally internally reflected at the interface with the surrounding materials. The geometric size and shape of the core and surrounding regions, as well as their respective refractive indices, define the distribution of light energy and the light propagation velocity in the waveguide.

Integrated waveguide structures are attractive because they are capable of integrating complex functionalities into a relatively small chip. The basic building block of integrated optics is essentially the waveguide circuit provided in a single plane parallel to a supporting wafer or substrate. A variety of planar fabrication techniques have been adopted from the semiconductor industry for fabricating integrated optic devices because such techniques are well established and understood. The typical process of fabricating integrated optic devices starts with layer deposition by, for example, molecular beam epitaxy (MBE), metalographic vapor phase epitaxy (MOPE), flame hydrolysis deposition (FHD), chemical vapor deposition (CVD), or spin coating of polymers or sol-gels. The layer is then patterned by, for example, reactive ion etching (RIE), reactive ion beam etching (RIBE), or ultraviolet (UV) patterning followed by development of the exposed layer by a wet dissolution process. The patterned layer, which forms the core, is then typically covered with a cladding layer by using one of the layer deposition processes mentioned above.

An optical waveguide realized by planar techniques typically includes a generally rectangular core region of a given refractive index surrounded by a cladding material of a lower refractive index. The thickness (y-dimension) of the core is defined by the layer deposition process employed, or in some instances a diffusion step, and is thus typically constant over the chip area within the limitations of the process equipment. Only the lateral dimension (x-direction) of the core region can easily be varied by using an appropriately designed photomask for the planar lithography involved in the layer patterning step, which also defines the layout and routing of the waveguides formed on the optical chip.

The number of waveguides, or channels, provided on an integrated optical chip is limited by the chip area, the amount of horizontal spacing provided between the channels, and the minimum bending radii that produces an acceptable amount of loss within the bend. The spacing between channels can be limited, for example, by the geometry of a fiber ribbon to be interfaced with an input and/or output facet of the optical chip or by the spacing required to prevent unwanted coupling between individual channels.

Waveguide structures that exhibit strong light confinement to the core, the so called "strongly guiding" waveguide structures, offer the possibility of smaller bending radii, as well as more closely spaced waveguides, than waveguide structures with weak light confinement. As a result, strongly guiding waveguide structures offer the possibility of realizing smaller devices and increased packing density. A problem arises, however, when strongly guiding waveguide structures have to be interfaced with standard fibers employed in optical communication networks. Strongly guiding waveguide structures that only support propagation of the fundamental mode (a strong requirement in most optical communication networks) have a much smaller mode-field diameter and larger Numerical Aperture than standard fibers used in optical communication networks. This mismatch reduces coupling efficiency and causes strong losses at the optical interface when light is launched from the fiber into the waveguide or vice versa.

Currently known waveguide technologies do not adequately address the competing goals of achieving increased packing density and low loss interfaces with standard optical communication network fibers. One attempt has been to provide a lateral taper at the end of the waveguide, as illustrated in FIG. 1, therefore increasing the lateral dimension of the waveguide mode. This design can be realized by using a modified mask layout with standard planar processing techniques, therefore ensuring good production yield. The disadvantage of this design is threefold: it does not address the mismatch in vertical direction, the structure will not be single-mode in the horizontal direction in the tapered region, and the Fresnel loss at the interface from the high-index waveguide to the low-index fiber remains unchanged.

More advanced structures using a three dimensional adiabatic taper, such as illustrated in FIG. 2, have been demonstrated, which deviate from standard planar processing by attempting to either deposit layers with thickness variations and index variations, or to locally modify parts of the structure. These structures typically transform the guide from a large core, low $\Delta n$ type at the fiber input to a small core, high $\Delta n$ type in the optical circuit. However, currently known approaches have the disadvantage of requiring non-standard fabrication techniques, which are hard to control and thus adversely affect the overall production yield. For example, the structure shown in FIG. 2 is accomplished through a modification of the standard flame hydrolysis deposition technique. The gas composition and scan pattern are gradually varied to deposit a thinner, higher $\Delta n$ guiding layer near the center of the circuit. The core width is then varied by lithography. Further, the patterned core may then be overcoated with a cladding layer as illustrated. In another approach to forming an adiabatic taper, a small-core, high $\Delta n$ waveguide is first fabricated with uniform parameters, and then modified by local diffusion of dopants included in the core so as to radially expand the core. This is done by clamping one end of the substrate in a cooled holder and heating the other to a high temperature. In yet another approach, a small-core, high $\Delta n$ type waveguide is fabricated that is physically tapered to create a larger mode field at the interface. As illustrated in FIG. 3, this taper has to be applied in both the x and y-directions of the core to maintain a circular field shape. While the lateral size variation can be achieved relatively easily using standard planar techniques, the taper in the core thickness is very hard to control in the manufacturing process.

While the first approach has the advantage of not requiring a modification of the vertical core size, thus offering higher production yields, the small optical improvement, as discussed above, limits its usefulness. In view of the difficulties of physically tapering the core in the y-direction consistently, the second and fourth approaches described above are not widely practiced. The third approach has also not taken hold due to the high temperatures required to locally diffuse the dopants in the core, in addition to the issues created by applying a large thermal gradient across the optical chip by heating one end of the optical chip while cooling the other end.

In view of the shortcomings of current interface technologies, the desire to achieve a high coupling efficiency between integrated waveguides and standard fibers usually defines the waveguide dimension and guiding strength. As a result, most integrated waveguides manufactured today are weakly guiding and have a relatively large mode-field diameter to match the mode-field diameter of standard optical communication network fibers.

Another approach for increasing packing density is to stack the waveguide structures to make three-dimensional integrated optic devices. Basically, this approach relies on the use of two or more waveguiding layers with vertical separation between each. However, if adjacent waveguiding layers are coupled together by a directional coupler, the number of waveguides that may be provided in a particular waveguiding layer is severely limited by the number of waveguides included in the immediately adjacent waveguiding layer. This is because the vertical separation between the guiding layers must be defined to permit evanescent coupling between select guides in adjacent layers. As a result, however, waveguides in the adjacent guiding layers must be carefully laid out to avoid crossing paths or from even coming too close to the same path in order prevent crosstalk between channels in the respective guiding layers.

SUMMARY OF THE INVENTION

The present invention is directed to waveguide structures in which light confinement strength, i.e., the degree to which a waveguide confines light energy in a direction transverse to the direction of light propagation, varies over at least a portion of the length of the waveguides. As a result, light confinement strength in the waveguide structures according to the present invention is a function of z, the axial location of the light propagating through the waveguides, and thus varies along the direction of light propagation through the waveguides.

The waveguide structures according to the present invention comprise a core adapted to propagate light along a path defined by the core and a cladding material that at least partially surrounds the core. The core and the cladding material each have a refractive index profile in the direction of light propagation. The refractive index profile of the core or the refractive index of the cladding, or both, are provided with a gradient in the direction of light propagation. With such structures it is possible to tailor the velocity of the light propagating through the core of the waveguide and the light confinement strength of the waveguide for any given core cross section. The waveguide structures may be formed on a substrate using planar fabrication techniques.

In one embodiment, at least one of (1) the lateral dimension of the core or (2) the refractive index profile of the core vary along a predefined portion of the core, and the refractive index profile of the cladding includes a gradient along the predefined portion.

In another embodiment, the refractive index profile of the core, the refractive index profile of the cladding material, or both include a gradient along a predefined portion of the core sufficient to cause the evanescent field of light propagating through the core to expand or contract with respect to the core as the light propagates through the predefined portion of the core.

Waveguide structures according to the present invention may be used, for example, in mode-matching an input or output of a high Δn waveguide with a low Δn interfacing fiber.

As a result, waveguide structures according to the present invention may be used in the fabrication of optical chips that exhibit both high packing densities and low loss interfaces with fibers. Waveguide structures according to the present invention may also be used to fabricate more compact directional couplers, both two-dimensional and three-dimensional, which thereby permit further improvements in packing densities to be realized.

Thus, according to another aspect of the present invention, an integrated optical coupler is provided. In one embodiment, the optical coupler comprises a first core adapted to propagate light along a first path, a second core spaced apart from the first core and adapted to propagate light along a second path, a cladding material surrounding the first and second cores, and a coupling region of a predetermined length formed between the first and second cores to couple light propagating in the first or second core to the other core. The first and second cores have first and second refractive index profiles, respectively, that extend along their axial extent. Furthermore, at least the first core includes a gradient in field confinement strength over the predetermined length in the coupling region so that the first core has a reduced field confinement strength in the coupling region as compared to adjacent the coupling region. The reduction in field confinement strength may, for example, be accomplished by varying at least one of (1) the lateral dimension of the core, (2) the refractive index profile of the core, or (3) the refractive index of the cladding material over the predetermined length in the coupling region sufficient to cause the evanescent field of light propagating through the core to expand in the coupling region.

Further objects, features and advantages of the invention will be better understood from the following description considered in connection with the accompanying drawings in which various embodiments of the invention are illustrated by way of example.

BRIEF DESCRIPTION OF THE DRAWINGS

FIG. 15 is a graph illustrating refractive index profiles in the z-direction of the core, horizontally adjacent cladding material, and vertically adjacent cladding material of the waveguide structure shown in FIG. 14.

FIGS. 16A and 16B are graphs illustrating refractive index profiles in the x-direction of the core and vertically adjacent cladding material of the waveguide structure shown in FIG. 14 at two locations along the z-axis, $Z=0$ and $Z=Z_T$, respectively.

DETAILED DESCRIPTION OF THE INVENTION

Embodiments of the invention will now be described with reference to the drawings. To facilitate the description, like elements have been referenced with the same reference number in the various figures.

The waveguide structures of the present invention may be constructed to transmit a wide variety of different optical wavelengths. The dimensions of the waveguide structures described herein may also vary over a wide range. In practice, however, the dimensions of a particular waveguide structure are preferably optimized for the particular wavelength range to be transmitted and the desired number of propagating modes. For purposes of describing the present invention by means of example, waveguide dimensions have been given herein that are suitable for propagating a wavelength range around 1.55 μm in the single optical mode condition, which is common in the telecommunications field. As will be appreciated by those skilled in the art from the present disclosure, other dimensions may be required or desirable for alternative implementations of the invention, as well as other wavelengths and/or propagation modes. Based on the teachings herein and basic optics principles, however, those having ordinary skill in the art will readily be able to determine suitable dimensions for waveguide structures according to the present invention for any given wavelength or desired number of propagation modes.

Figure 4:
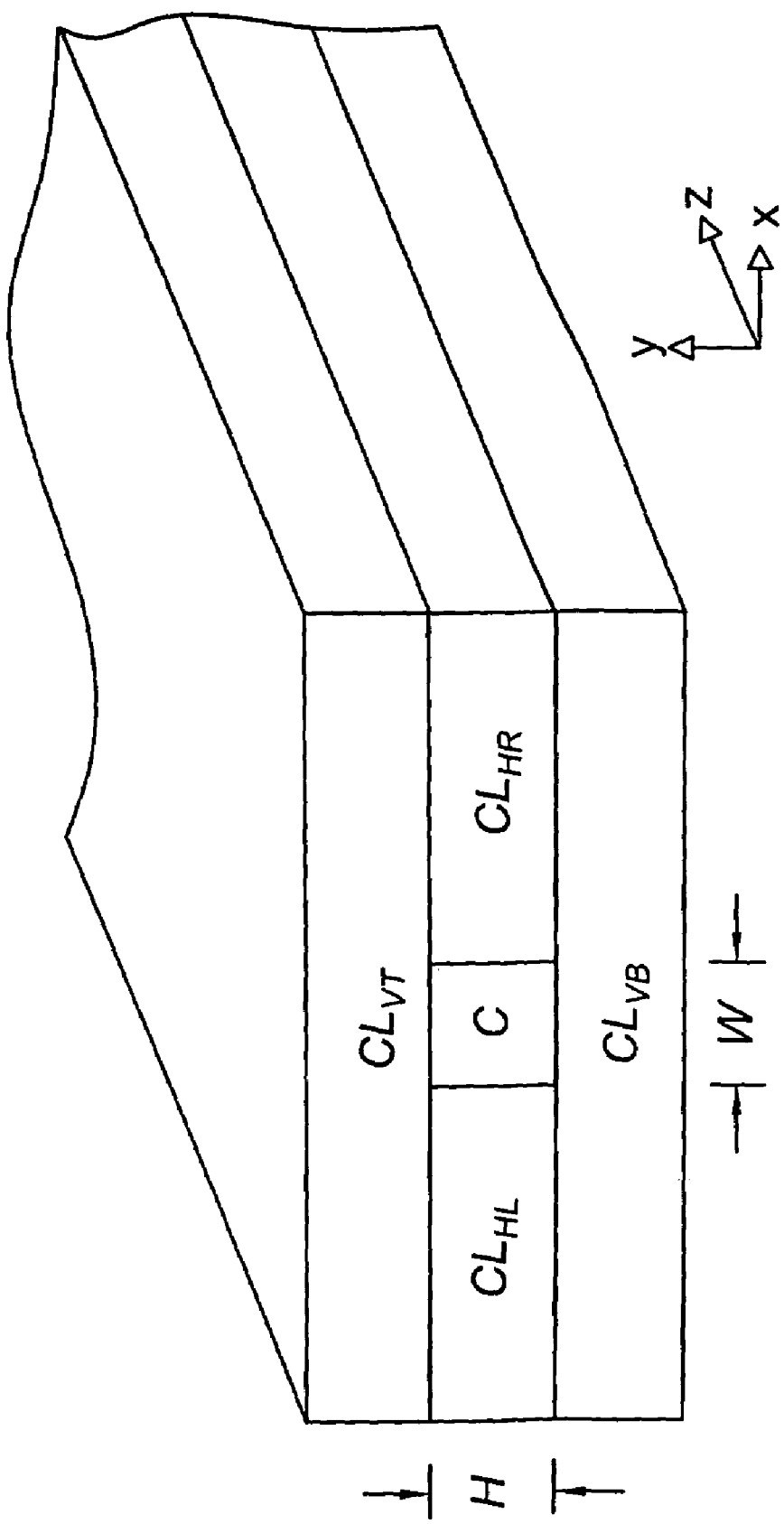
FIG. 4 is a cross-sectional view of one embodiment of a waveguide structure according to the present invention.

FIG. 4 shows a cross-section of the layer profile of a typical planar waveguide structure according to the present invention. The waveguide core of width W and height H has an index of refraction C and is surrounded in all directions by cladding material with the refractive indices $CL_{HL}$ and $CL_{HR}$ in the horizontal or lateral left and right direction (x-direction), respectively, and with the refractive indices $CL_{VT}$ and $CL_{VB}$ in the vertical top and bottom direction (y-direction), respectively. To ensure light is confined in the transverse cross-sectional plane, the adjacent cladding indices all have to be smaller than the core index. However, in the waveguide structures according to the present invention, one or more of the indices may vary in the direction of light propagation through the core (the z-direction). In other words, C=C(z), $CL_{HL}=CL_{HL}(z)$, $CL_{HR}=CL_{HR}(z)$, $CL_{VT}=CL_{VT}(z)$, and $CL_{VB}=CL_{VB}(Z)$. As long as C is greater than $CL_{HL}$, $CL_{HR}$, $CL_{VT}$ and $CL_{VB}$ at any given point along the core, however, then the waveguide will still confine light. On the other hand, if the delta between the index of the core and one or more of the cladding indices changes, then the light confinement strength of the waveguide may be altered from that at a previous location along the z-axis. Similarly, by altering the lateral cross-sectional dimension of the core at desired locations along the z-axis, the light confinement strength may also be varied along the z-axis. It is also noted that while the cross-sectional indices of refraction of the core, C, horizontally adjacent cladding material, $CL_{HL}$ and $CL_{HR}$, and vertically adjacent cladding material $CL_{VT}$ and $CL_{VB}$ are illustrated in FIG. 4, as well as in some of the embodiments described below, as being constant across the transverse cross-sectional plane, the invention is not limited in this regard. Rather, it is also possible for the refractive indices C, $CL_{HL}$, $CL_{HR}$, $CL_{VT}$, and $CL_{VB}$ to change across the transverse cross-sectional plane of the waveguide structure.

The present invention addresses waveguide structures where at least one of the cross-sectional refractive indices or the lateral cross-sectional dimension of the core are varied along the direction of light propagation (z-direction). As noted above varying any of these parameters affects the light confinement strength of the waveguide, i.e. the degree to which the waveguide confines light energy in a direction transverse to the direction of light propagation. This in turn affects the light energy distribution across the cross section of the waveguide structure for light propagating through the waveguide. Varying one or multiple of these parameters along the direction of light propagation (z-direction) may therefore be used to induce a variation of light energy distribution across the cross section of the waveguide at predefined locations along the direction of light propagation (z-direction). Hence, the light confinement strength in the waveguide structures of the present invention will vary along the direction of light propagation (z-direction).

For purposes of describing the invention, five preferred embodiments of waveguide structures according to the present invention are described in detail below that may be used, for example, to match a planar waveguide structure to an external component with low coupling losses. Those skilled in the art will readily appreciate from the described embodiments that a large number of other embodiments of waveguide structures that have varying cross-sectional light confinement strength along the direction of light propagation are also possible and encompassed within the present invention. Similarly, six preferred embodiments of integrated optical couplers according to the present invention are described in detail below. The integrated optical couplers of the present invention employ waveguides having variable light confinement strength to realize the coupler; in particular, at least one of the waveguides forming the coupler includes a section with reduced light confinement strength that defines the coupling region. Other embodiments of directional couplers based on the same mechanism are also encompassed within the present invention and will become obvious to those skilled in the art from the embodiments described herein.

Figure 5:
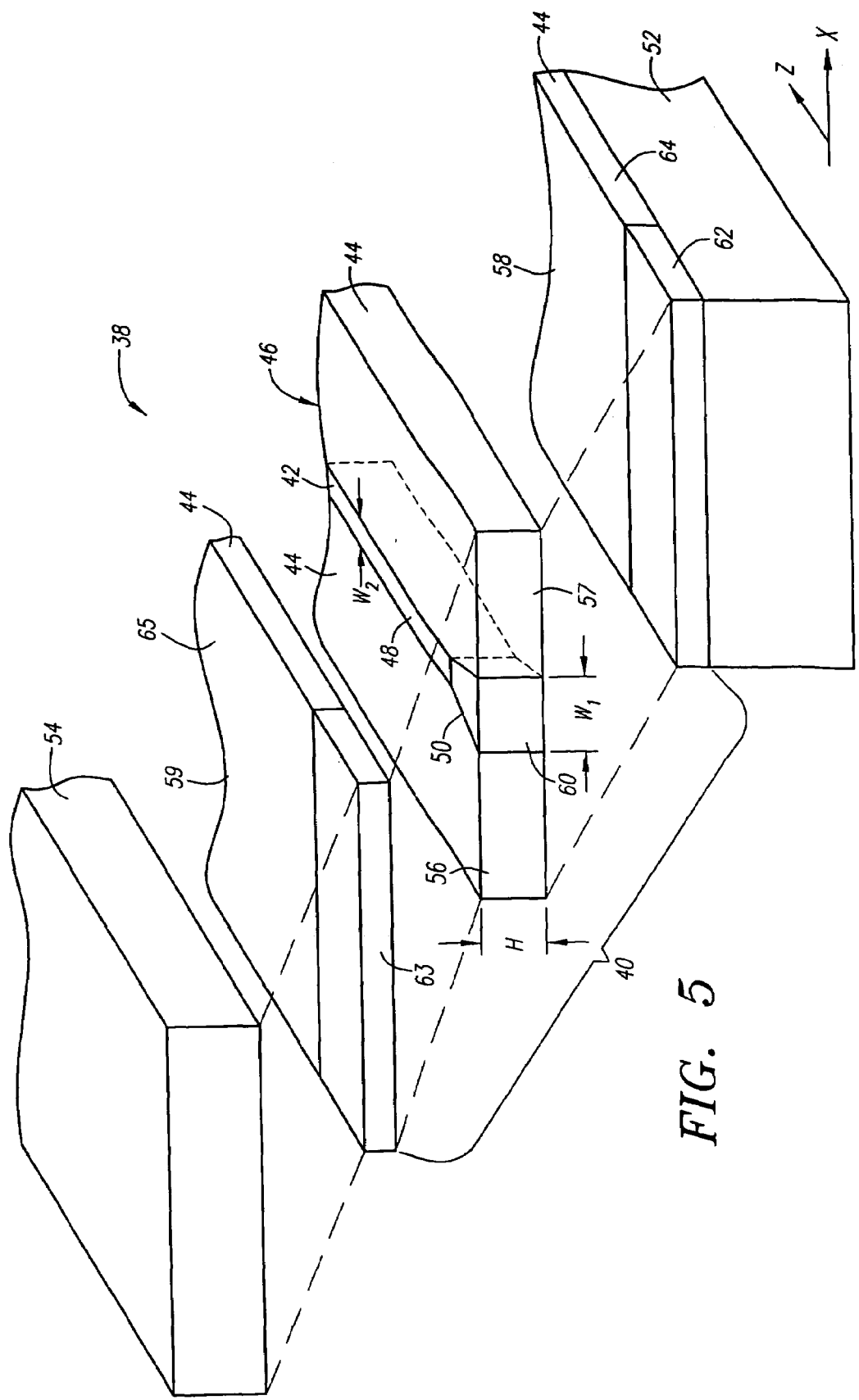
FIG. 5 is an exploded partial perspective view of one embodiment of a waveguide structure according to the present invention.
Figure 6:
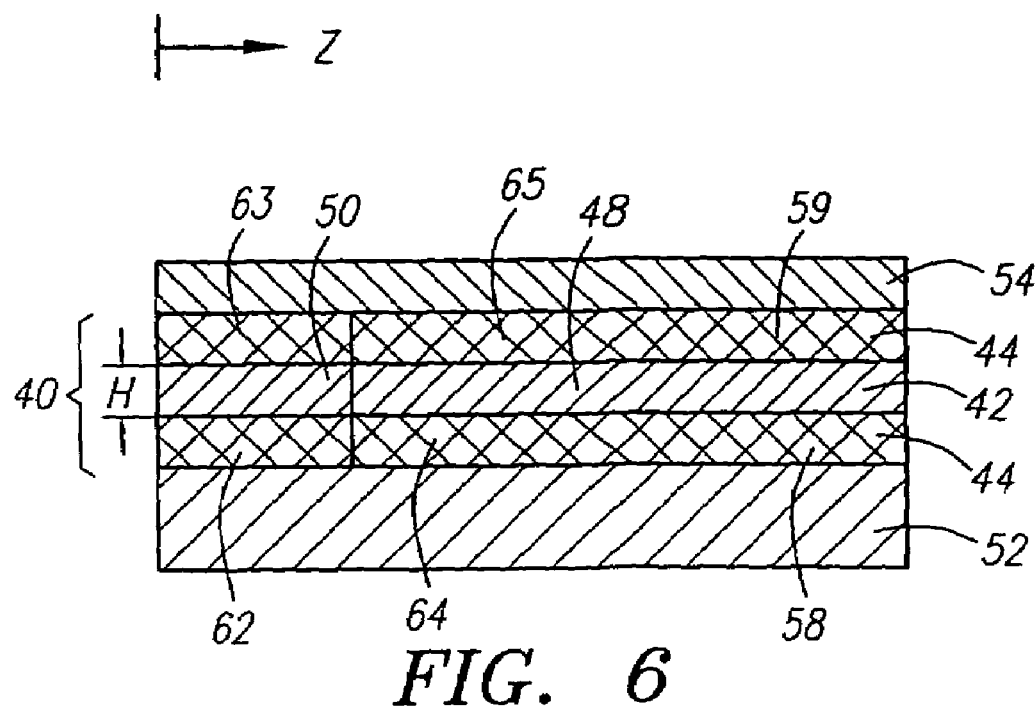
FIG. 6 is a longitudinal cross-sectional view through the core of the waveguide structure shown in FIG. 5.
Figure 7:
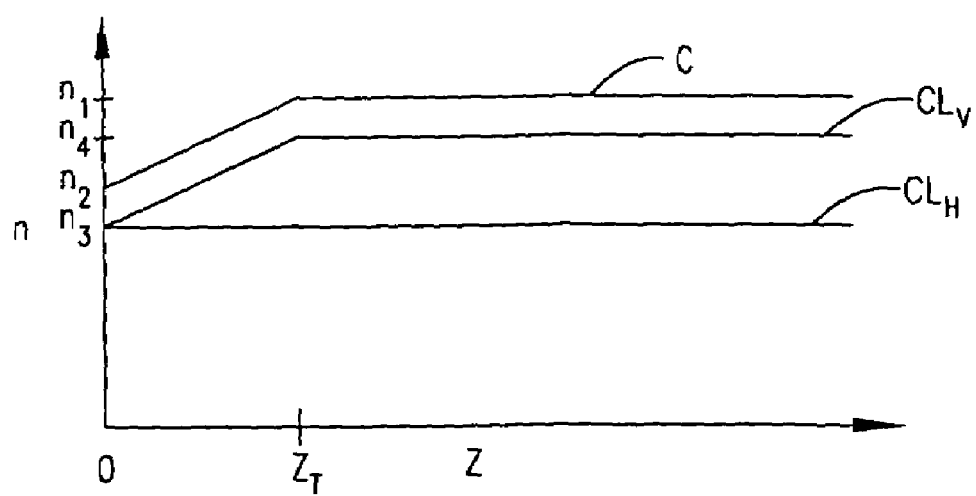
FIG. 7 is a graph illustrating refractive index profiles in the z-direction of the core, horizontally adjacent cladding material, and vertically adjacent cladding material of the waveguide structure shown in FIG. 5.

FIGS. 5-7 illustrate a waveguide structure 40 according to a first embodiment of the invention. Waveguide structure 40 comprises core 42 and cladding material 44, which surrounds core 42. Although cladding material 44 is shown as completely surrounding core 42 in the illustrated embodiment, cladding material 44 may only partially surround core 42 in other embodiments. For example, in certain implementations, cladding material 44 may only be provided on the two lateral sides and bottom of core 42.

The waveguide structure 40 will typically be formed on a substrate 52 and form part of an integrated optical chip 38. A wide variety of substrates can be used for substrate 52, including those conventionally used in fabricating integrated optics, such as silica, silicon, indium gallium arsenide, and indium phosphide substrates. The optical chip 38 may also include a protective layer 54 formed over the waveguide structure 40. The protective layer 54 acts as a moisture barrier layer and helps protect the waveguide structure 40 from mechanical damage. Protective layer 54 may comprise a metal film or a polymer coating. Suitable polymer coating materials include, for example, polymethylmethacrylate, polyvinylacrylate, polyvinylchloride, and polytetrafluoroethylene.

The core 42 is adapted to propagate light in an axial direction along a path defined by the core. Core 42 includes a channel waveguide 48 coupled to a taper 50 that, in the present embodiment, laterally extends out from the waveguide 48. As a result, the lateral dimension, W, of the core 42 varies over the axial extent of taper 50 from $W_1$ at its widest point to $W_2$ at its narrowest point, which corresponds to the width of channel waveguide 48. On the other hand, the vertical dimension, H, of the core 42 preferably remains constant over the axial extent of core 42, at least within the limitations of the fabrication equipment employed.

The waveguide structure 40 has varying transverse light confinement strength in the direction of light propagation, or z-direction. In the present embodiment, the varying light confinement is achieved by varying the refractive indices of the core 42, the cladding material 44, and the lateral dimension of core 42 in the direction of light propagation. Accordingly, the core 42 and the cladding material 44 each have a refractive index profile in the z-direction, or direction of light propagation.

Because the cladding material 44 of the present embodiment comprises horizontally adjacent cladding material 56, 57 and vertically adjacent cladding material 58, 59, the cladding material 44 may have from one to four refractive index profiles adjacent to core 42 in the direction of light propagation. For example, the horizontally adjacent cladding material 56, 57 and the vertically adjacent cladding material 58, 59 could all have the same refractive index profile, or each could have a separate refractive index profile for a total of four refractive index profiles.

In the waveguide structures of the present invention, the number of refractive index profiles provided in the adjacent cladding material 44 will depend on the shape of the core 42, the refractive index profile of the core 42, and the intended use of the waveguide structure. In the embodiment shown in FIG. 5, the refractive index profiles of the horizontally adjacent cladding material 56, 57 are the same, and the refractive index profiles of the vertically adjacent cladding material 58, 59 are the same. Because the geometry of the core 42 is symmetrical in both the horizontal and vertical directions, this creates symmetry in the modal field in the vertical and horizontal transverse directions as light propagates through core 42.

FIG. 7 graphically illustrates preferred refractive index profiles for the core 42, the horizontally adjacent cladding material 56, 57, and the vertically adjacent cladding material 58, 59 for the waveguide structure 40 shown in FIGS. 5 and 6. In FIG. 7, the refractive index profile of the core 42 is labeled "C", the refractive index profile of the horizontally adjacent cladding material 56, 57 is labeled "$CL_H$", and the refractive index profile of the vertically adjacent cladding material 58, 59 is labeled "$CL_V$".

As seen from FIG. 7, the core 42 has a higher refractive index than the surrounding cladding material 44 at all points along its axial extent. As a result, light will be internally reflected within core 42 throughout its axial extent. This is true even though portions of the cladding material 44 may have a greater refractive index than portions of the core 42, so long as the two portions are physically displaced along the length of the core 42.

The channel waveguide 48 of the core 42 has a first constant refractive index value, $n_1$. On the other hand, the refractive index of the tapered portion 50 of the core 42 varies from a second refractive index value, $n_2$, at end face 60 to the first refractive index value, $n_1$, where the tapered portion 50 is coupled to channel waveguide 48. This location is graphically represented with "$Z_T$" on the Z-axis of FIG. 7.

The refractive index profile for the vertically adjacent cladding material 58, 59 is varied over regions 62, 63 from a third refractive index value, $n_3$, at an axial position corresponding to end face 60 to a fourth refractive index value, $n_4$, corresponding to the axial location where taper 50 is coupled to channel waveguide 48. The profile then remains constant at a refractive index value equal to $n_4$ over regions 64, 65, that are adjacent to the bottom and top of channel waveguide 48. Thus, the refractive index profile of the vertically adjacent cladding material 58, 59 includes a gradient along the portion of core 42 that varies in its lateral dimension, as well as in its refractive index.

The refractive index profile of the horizontally adjacent cladding material 56, 57 is constant along the axial extent of core 42 in the present embodiment. As seen from FIG. 7, the refractive index of the horizontally adjacent material is set equal to the third refractive index value, $n_3$.

In the present embodiment, the various refractive indices are set to have the following relationship: $n_1 > n_4 > n_2 > n_3$. However, in alternative implementations of the embodiment, other relationships may be desirable. Similarly, as illustrated by the various embodiments described herein, a wide variety of other refractive index profiles may also be employed.

The values of $n_1$ and $n_3$ are selected to impart a desired light confinement strength to waveguide 48 in the horizontally transverse direction. The greater the $\Delta n$ waveguide 48 possesses with respect to horizontally adjacent cladding 56, 57, the more strongly it will confine light in the horizontally transverse direction. This in turn will impact the packing densities that will be able to be achieved on optical chip 38 as discussed above.

For purposes of the present disclosure, waveguides that have a $\Delta n$ value in the range of about 0.3% and 0.8% are generally considered moderately guiding, while waveguides with a $\Delta n$ of greater than or equal to about 0.8% are considered strongly guiding. As a result, typically $n_1$ and $n_3$ will be selected so that channel waveguide 48 has a $\Delta n$ of at least 0.3% with respect to the horizontally adjacent cladding material 56, 57. Preferably $n_1$ and $n_3$ are selected so that waveguide 48 has a $\Delta n$ greater than or equal to 0.8% with respect to the horizontally adjacent cladding material 56, 57.

It is conventional in the art to calculate $\Delta n$ as a percent difference of the adjacent cladding material. The same nomenclature is used herein.

The lateral dimension, $W_2$, of waveguide 48 is preferably selected so as to support only the fundamental mode of the light that is to be propagated through waveguide 48. In specific applications, however, it may be desirable to choose $W_2$ such that a limited number of modes are supported.

The value of $n_2$ and the lateral dimension of the widest point of taper 50 (i.e., $W_1$) are set based on the mode-field characteristics desired at end face 60. For example, if taper 50 is to be used as an input interface for a standard single-mode optical networking fiber with a mode-field diameter of 8 μm, then $W_1$ may be set at approximately 7 μm and $n_2$ may be selected so as to provide a $\Delta n$ of approximately 0.2% to 0.4% with respect to the horizontally adjacent cladding material 56, 57. Similarly, if the height, H, of core 42 is selected for purposes of matching the vertical mode field diameter at end face 60 to that of a standard optical networking fiber with a mode-field diameter of 8 μm, then the height of the core 42 may also be set at 7 μm. Further, as seen from FIG. 7, the refractive index of the vertically adjacent cladding material at end face 60 is preferably set to a value of $n_3$ to provide a circular field shape at end face 60.

Because core 42 in the present embodiment has a uniform height across its axial extent and a relatively large height, H, for purposes of matching the mode field diameter of a standard optical networking fiber, the $\Delta n$ of core 42 with respect to the vertically adjacent cladding material is preferably maintained at a constant value in the present embodiment. Accordingly, as seen from FIG. 7, the refractive index profile of vertically adjacent cladding material 58, 59 is generally shaped the same as the refractive index profile of core 42, thus $\Delta n$ in the vertical direction remains constant over the axial extent of core 42 in the present embodiment.

If the core 42 is provided with a relatively large height, H, for purposes of matching the numerical aperture of a weakly guiding fiber, a low $\Delta n$ must be maintained in the vertically transverse direction if the application in which waveguide structure 40 is used requires that the core 42 only support the propagation of the fundamental mode. Having a high $\Delta n$ in the horizontal direction and a low $\Delta n$ in the vertical direction will elongate the modal field of light propagating through waveguide 48. However, because a high $\Delta n$ exists in the horizontally transverse direction, smaller bending radii, and hence closer packing densities, can still be achieved in the waveguiding layer 46 of optical chip 38.

The angle at which taper 50 is tapered with respect to the axis of core 42 in the present embodiment depends on how quickly the refractive index in core 42 is varied from $n_1$ to $n_2$. For example, if only single-mode propagation is desired in the horizontally transverse direction, then taper 50 should be tapered at a rate that will ensure only the fundamental mode of the propagating light is supported within the taper 50 at any point along its axial extent.

The refractive indices in the taper 50 and the regions 62, 63 may be continuously graded, as shown in FIG. 7, or they may be graded quasi-continuously with a series of small steps or periodic changes in the refractive index. In general, however, the longer the taper 50 is and the more gradual the refractive indices are graded in the taper 50 and the regions 62, 63, the lower the propagation losses will be in the taper 50.

As described above, the waveguide structure 40 may be used to match the modal field of an input fiber, thereby permitting waveguides having a higher $\Delta n$ to be formed in a waveguiding layer 46 of optical chip 38 than the interfacing input fiber. Similarly, the waveguide structure 40 may be used to match the modal field of an output fiber. Thus, the waveguide structure 40 satisfies the competing goals of achieving low loss, high efficiency couplings with fibers while also permitting higher packing densities to be realized.

Although the illustrated embodiment was described in connection with matching the modal field of a weakly guiding standard optical networking fiber, the waveguide structure 40 is not limited to standard fibers. Using the principles described above, the taper 50, and the corresponding variations in the refractive index profiles provided in the taper 50 and the regions 62, 63, may be adapted to match the modal field of any fiber or waveguide structure, including those with a higher Δn than channel waveguide 48, e.g. semiconductor laser structures. The waveguide structure 40 may also be used to lower coupling losses between strongly guiding waveguides and weakly guiding waveguides in the waveguiding layer 46. For particular applications of matching waveguide structures, the width of core 42 may also decrease rather than increase in the area of taper 50 or be left constant, i.e. $W_1 < W_2$ or $W_1 = W_2$, as illustrated by embodiments described below. As shown by the ensuing embodiments, however, the refractive index profiles of the structure would have to be modified accordingly to provide optimal matching conditions.

Figure 8:
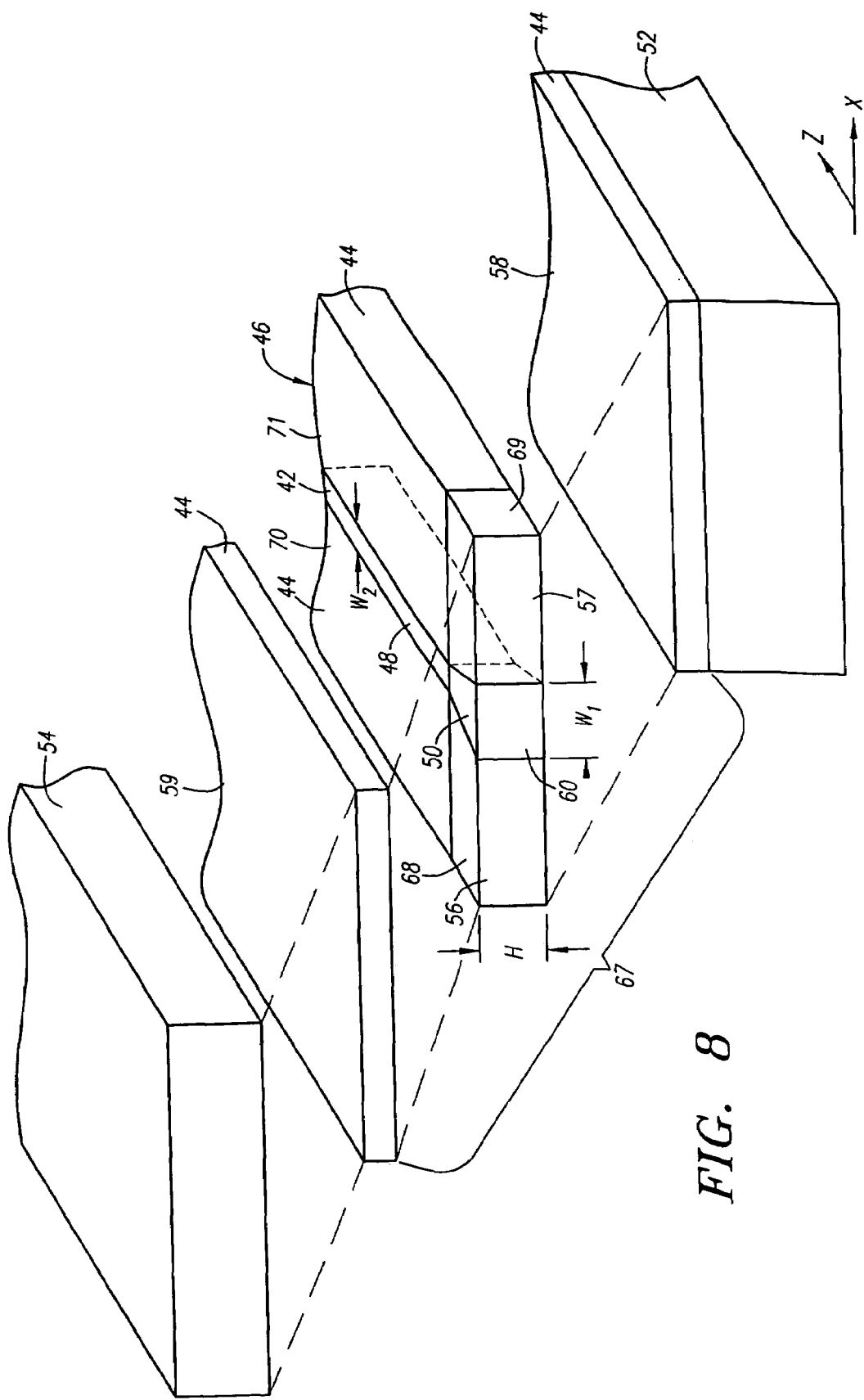
FIG. 8 is an exploded partial perspective view of another embodiment of a waveguide structure according to the present invention.

A second embodiment of a waveguide structure according to the present invention is shown in FIG. 8. The principal difference between the waveguide structure 67 shown in FIG. 8 and the waveguide structure 40 of the previous embodiment resides in the refractive index profiles of the core 42 and the cladding material 44. As with the previous embodiment, the core 42 is adapted to propagate light in an axial direction along a path defined by the core. The core 42 includes a channel waveguide 48 coupled to a taper 50 that, in the present embodiment, laterally extends out from the waveguide 48. As a result, the lateral dimension, W, of the core 42 varies over the axial extent of taper 50 from $W_1$ at its widest point to $W_2$ at its narrowest point, which corresponds to the width of channel waveguide 48. On the other hand, the vertical dimension, H, of the core 42 preferably remains constant over the axial extent of core 42, at least within the limitations of the fabrication equipment employed.

The waveguide structure 67 has varying light confinement strength in the direction of light propagation, or z-direction. In the present embodiment, the varying light confinement strength is achieved by varying the refractive indices of the horizontally adjacent cladding material 56, 57 and the lateral dimension of core 42 in the direction of light propagation.

Figure 9:
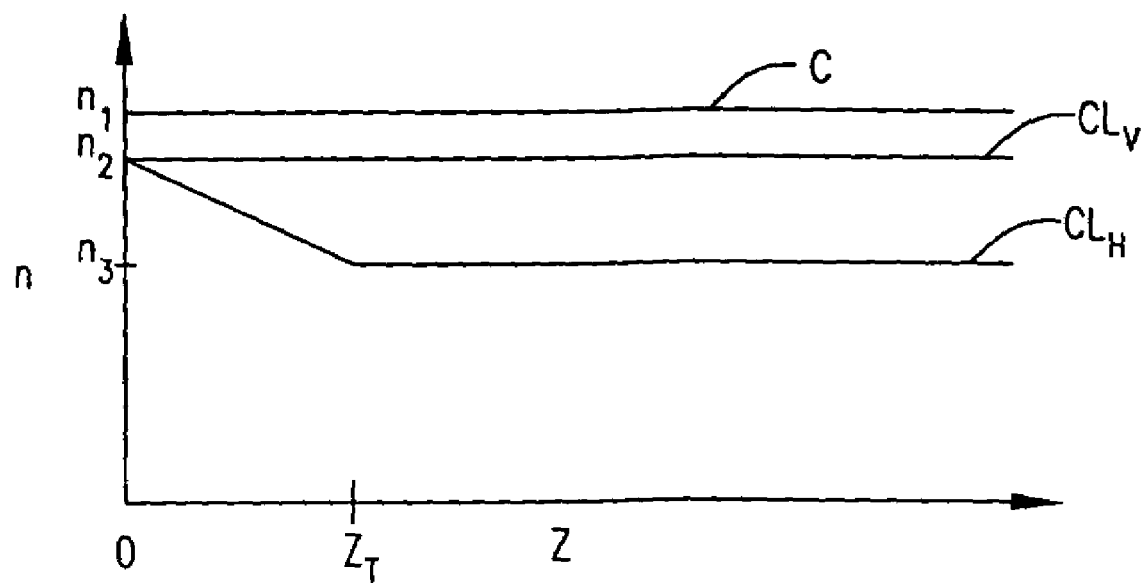
FIG. 9 is a graph illustrating refractive index profiles in the z-direction of the core, horizontally adjacent cladding material, and vertically adjacent cladding material of the waveguide structure shown in FIG. 8.

FIG. 9 graphically illustrates preferred refractive index profiles for the core 42, the horizontally adjacent cladding material 56, 57, and the vertically adjacent cladding material 58, 59 for the waveguide structure 67 shown in FIG. 8. In FIG. 9, the refractive index profile of the core 42 is labeled "C", the refractive index profile of the horizontally adjacent cladding material 56, 57 is labeled "$CL_H$", and the refractive index profile of the vertically adjacent cladding material 58, 59 is labeled "$CL_V$".

As seen from FIG. 9, the core 42 has a higher refractive index than the surrounding cladding material 44 at all points along its axial extent. As a result, light will be internally reflected within core 42 throughout its axial extent.

In the present embodiment, the core 42 has a first constant refractive index value, $n_1$. In other words, the refractive index of the core does not vary in the region of taper 50 as it did in connection with the waveguide structure 40.

The refractive index profile for the horizontally adjacent cladding material 56, 57 is varied over regions 68, 69 from a second refractive index value, $n_2$, at an axial position corresponding to end face 60 to a third refractive index value, $n_3$, corresponding to the axial location where taper 50 is coupled to channel waveguide 48. This location is graphically represented with "$Z_T$" on the Z-axis of FIG. 9. The profile then remains constant at a refractive index value equal to $n_3$ over regions 70, 71 that are adjacent to the sides of channel waveguide 48. Thus, the refractive index profile of the horizontally adjacent cladding material 56, 57 includes a gradient along the portion of core 42 that varies in its lateral dimension.

The refractive index profile of the vertically adjacent cladding material 58, 59 is constant along the axial extent of core 42 in the present embodiment. As seen from FIG. 9, the refractive index of the vertically adjacent material is set equal to the second refractive index value, $n_2$.

In the present embodiment, the various refractive indices are set to have the following relationship: $n_1 > n_2 > n_3$. However, in alternative implementations of the embodiment, other relationships or profiles may be desirable.

The values of $n_1$ and $n_3$ are selected to impart a desired light confinement strength to waveguide 48. The greater the Δn waveguide 48 possesses with respect to horizontally adjacent cladding 56, 57, the more strongly it will confine light in the horizontally transverse direction. This in turn will impact the packing densities that will be able to be achieved on optical chip 38 as discussed above.

Typically $n_1$ and $n_3$ will be selected so that channel waveguide 48 has a Δn of at least 0.3% with respect to the horizontally adjacent cladding material 56, 57. Preferably $n_1$ and $n_3$ are selected so that waveguide 48 has a Δn greater than or equal to 0.8% with respect to the horizontally adjacent cladding material 56, 57.

The lateral dimension, $W_2$, of waveguide 48 is preferably selected so as to support only the fundamental mode of the light that is to be propagated through waveguide 48. In specific applications, however, it may be desirable to choose $W_2$ such that a limited number of modes are supported.

The value of $n_2$ and the lateral dimension of the widest point of taper 50 (i.e., $W_1$) are set based on the mode-field characteristics desired at end face 60. For example, if taper 50 is used as an input interface for a standard single-mode optical networking fiber with a mode-field diameter of 8 μm, then $W_1$ may be set at approximately 7 μm and $n_2$ may be selected so as to provide a Δn of approximately 0.2% to 0.4% between the core 42 and the horizontally adjacent cladding material 56, 57 at the end face 60. Similarly, if the height, H, of core 42 is selected for purposes of matching the vertical mode field diameter at end face 60 to that of a standard optical networking fiber with a mode-field diameter of 8 μm, then the height of the core 42 may also be set at 7 μm. Further, as seen from FIG. 9, the refractive index of the vertically adjacent cladding material at end face 60 is preferably set to a value of $n_2$ to provide a circular field shape at end face 60.

Because core 42 has a uniform height across its axial extent, the Δn of core 42 with respect to the vertically adjacent cladding material is preferably maintained at a constant value in the present embodiment. Accordingly, as seen from FIG. 9, the refractive index profile of vertically adjacent cladding material 58, 59 is generally shaped the same as the refractive index profile of core 42, thus vertically adjacent cladding material 58, 59 has a constant refractive index profile equal to $n_2$. As a result, Δn in the vertical direction remains constant over the axial extent of core 42 in the present embodiment.

If the core 42 is provided with a relatively large height, H, for purposes of matching the numerical aperture of a weakly guiding fiber, a low Δn must be maintained in the vertically transverse direction if the application in which waveguide structure 67 is used requires that the core 42 only support the propagation of the fundamental mode. Having a high Δn in the horizontal direction and a low Δn in the vertical direction will elongate the modal field of light propagating through waveguide 48. However, because a high Δn exists in the horizontally transverse direction, smaller bending radii, and hence closer packing densities, can still be achieved in the waveguiding layer 46 of optical chip 38.

The angle at which taper 50 is tapered with respect to the axis of core 42 in the present embodiment depends on how quickly the refractive index in the regions 68, 69 is varied from $n_2$ to $n_3$. For example, if only single-mode propagation is desired, then taper 50 should be tapered at a rate that will ensure only the fundamental mode of the propagating light is supported within the taper 50 at any point along its axial extent.

The refractive indices in the regions 68, 69 may be continuously graded, as shown in FIG. 7, or they may be graded quasi-continuously with a series of small steps or periodic changes in the refractive index. In general, however, the longer the taper 50 is and the more gradual the refractive indices are graded in the regions 68, 69, the lower the propagation losses will be in the taper 50.

As described above, the waveguide structure 67 may be used to match the modal field of an input fiber, thereby permitting waveguides having a higher Δn to be formed in the waveguiding layer 46 of optical chip 38 than the interfacing input fiber. Similarly, the waveguide structure 67 may be used to match the modal field of an output fiber. Thus, the waveguide structure 67 satisfies the competing goals of achieving low loss, high efficiency couplings with fibers while also permitting higher packing densities to be realized.

Although, the illustrated embodiment was described in connection with matching the modal field of a weakly guiding standard optical networking fiber, the waveguide structure 67 is not limited to standard fibers. Using the principles described above, the taper 50, and the corresponding variations in the refractive index profiles provided in the regions 68, 69, may be adapted to match the modal field of any fiber or waveguide, including those with a higher Δn than channel waveguide 48, e.g. semiconductor laser structures. The waveguide structure 67 may also be used to lower coupling losses between strongly guiding waveguides and weakly guiding waveguides in the waveguiding layer 46.

Figure 10:
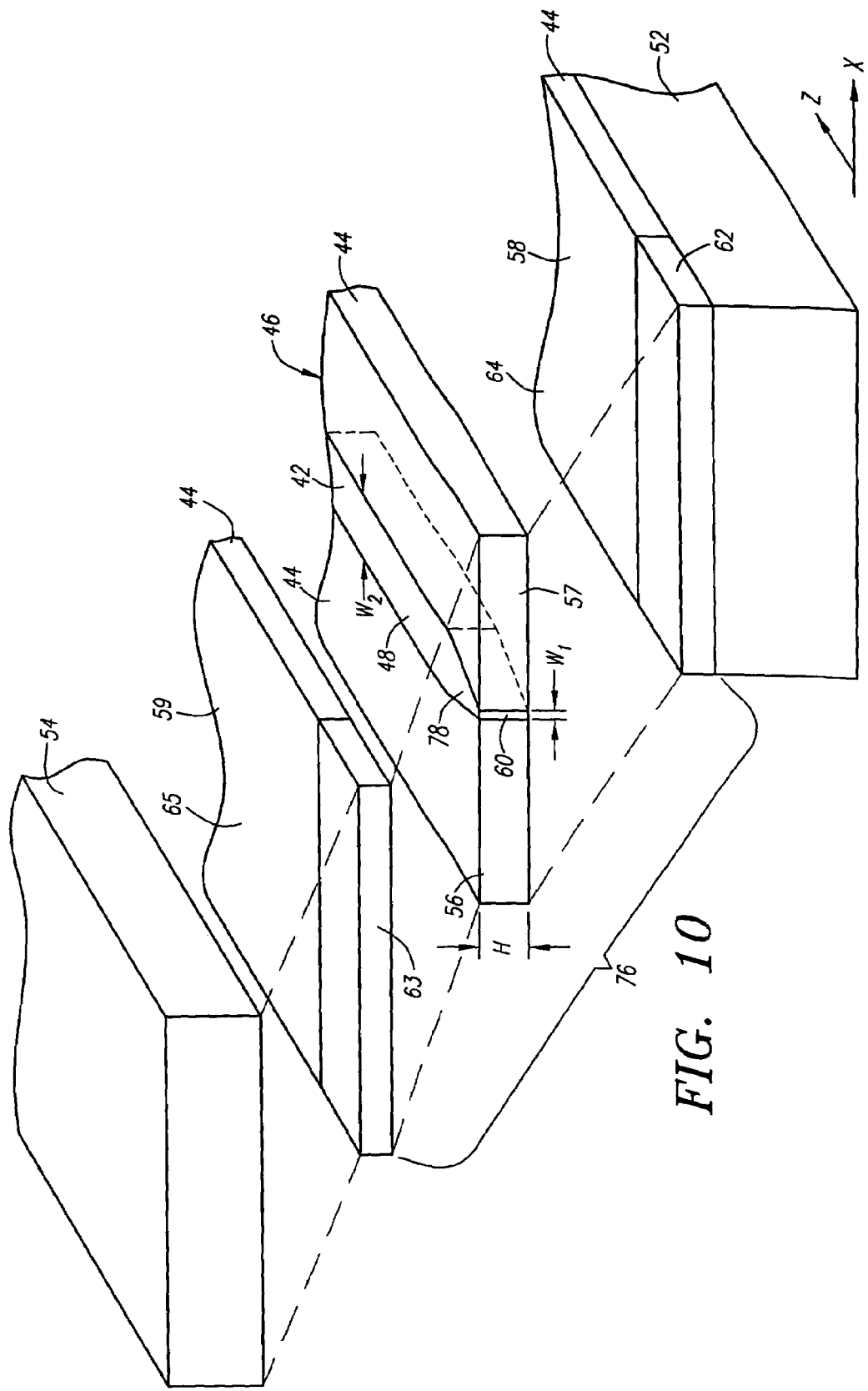
FIG. 10 is an exploded partial perspective view of still another embodiment of a waveguide structure according to the present invention.

A third embodiment of a waveguide structure according to the present invention is shown in FIG. 10. The principal difference between the waveguide structure 76 shown in FIG. 10 and the waveguide structures 40, 67 described in connection with the previous embodiments resides in the refractive index profiles of the core 42 and the cladding material 44 and the use of a taper 78 that tapers laterally inward from channel waveguide 48 rather than tapers laterally outward from the waveguide 48.

As with the previous embodiments, the core 42 is adapted to propagate light in an axial direction along a path defined by the core. The core 42 includes a channel waveguide 48 coupled to a taper 78 that, in the present embodiment, laterally extends inward from the waveguide 48. As a result, the lateral dimension, W, of the core 42 varies over the axial extent of taper 78 from $W_1$ at its narrowest point to $W_2$ at its widest point, which corresponds to the width of channel waveguide 48. On the other hand, the vertical dimension, H, of the core 42 preferably remains constant over the axial extent of core 42, at least within the limitations of the fabrication equipment employed.

The waveguide structure 76 has varying lateral and vertical light confinement strength in the direction of light propagation, or z-direction. In the present embodiment, the varying light confinement strength is achieved by varying the refractive indices of the vertically adjacent cladding material 58, 59 and the lateral dimension of core 42 in the direction of light propagation.

Figure 11:
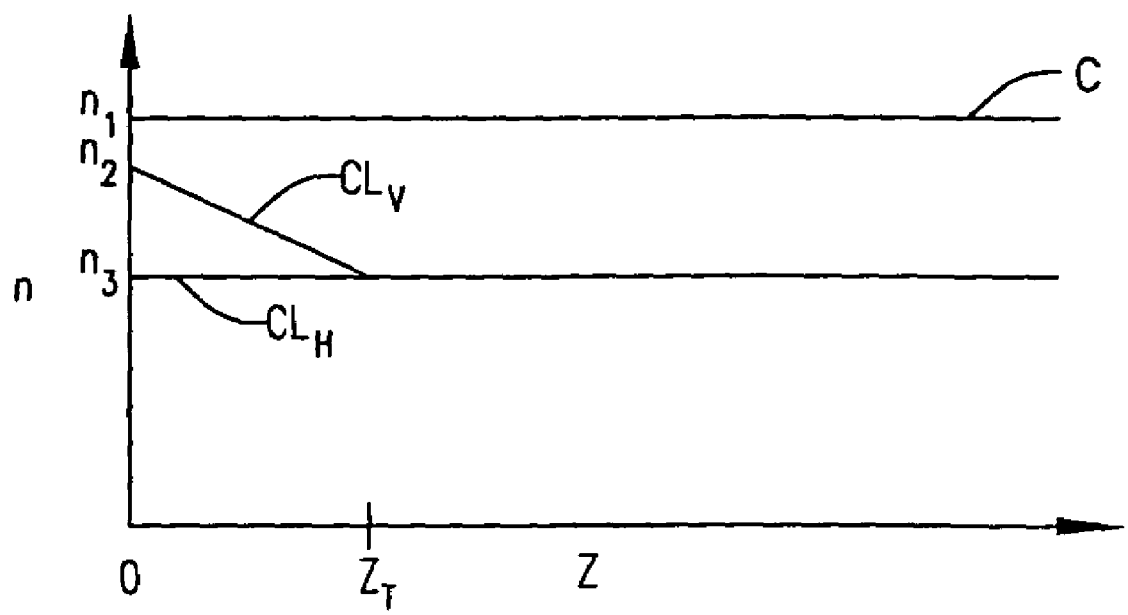
FIG. 11 is a graph illustrating refractive index profiles in the z-direction of the core, horizontally adjacent cladding material, and vertically adjacent cladding material of the waveguide structure shown in FIG. 10.

FIG. 11 graphically illustrates preferred refractive index profiles for the core 42, the horizontally adjacent cladding material 56, 57, and the vertically adjacent cladding material 58, 59 for the waveguide structure 76 shown in FIG. 10. As seen from FIG. 11, the core 42 has a higher refractive index than the surrounding cladding material 44 at all points along its axial extent. As a result, light will be internally reflected within core 42 throughout its axial extent.

In the present embodiment, the core 42 has a first constant refractive index value, $n_1$. In other words, the refractive index of the core does not vary in the region of taper 78.

The refractive index profile for the vertically adjacent cladding material 58, 59 is varied over regions 62, 63 from a second refractive index value, $n_2$, at an axial position corresponding to end face 60 to a third refractive index value, $n_3$, corresponding to the axial location where taper 78 is coupled to channel waveguide 48. This location is graphically represented with "$Z_T$" on the Z-axis of FIG. 11. The profile then remains constant at a refractive index value equal to $n_3$ over regions 64, 65, that are adjacent to the bottom and top of channel waveguide 48. Thus, the refractive index profile of the vertically adjacent cladding material 58, 59 includes a gradient along the portion of core 42 that varies in its lateral dimension.

The refractive index profile of the horizontally adjacent cladding material 56, 57 is constant along the axial extent of core 42 in the present embodiment. As seen from FIG. 11, the refractive index of the horizontally adjacent material 56, 57 is set equal to the third refractive index value, $n_3$.

In the present embodiment, the various refractive indices are set to have the following relationship: $n_1 > n_2 > n_3$. However, in other implementations of the embodiment, other relationships, as well as other profiles, may be desirable.

The values of $n_1$ and $n_3$ are selected to impart a desired light confinement strength to waveguide 48. The greater the Δn waveguide 48 possesses with respect to horizontally adjacent cladding 56, 57 the more strongly it will confine light in the horizontally transverse direction. This in turn will impact the packing densities that will be able to be achieved on optical chip 38 as discussed above.

Typically $n_1$ and $n_3$ will be selected so that channel waveguide 48 has a Δn of at least 0.3% with respect to the horizontally adjacent cladding material 56, 57. Preferably $n_1$ and $n_3$ are selected so that waveguide 48 has a Δn greater than or equal to 0.8% with respect to the horizontally adjacent cladding material 56, 57.

The lateral dimension, $W_2$, of waveguide 48 is preferably selected so as to support only the fundamental mode of the light that is to be propagated through waveguide 48. Thus, for example, if the waveguide 48 is provided with a Δn of 0.8% with respect to the horizontally adjacent cladding material 56, 57, its lateral dimension $W_2$ is preferably set at approximately 5 μm.

In the present embodiment, the lateral dimension of the narrowest point of taper 78 (i.e., $W_1$) is set based on the mode-field characteristics desired at end face 60 in the horizontally transverse direction. For example, if taper 78 is used as an input interface for a standard single-mode optical networking fiber with a mode-field diameter of 8 μm, then $W_1$ is preferably set at a dimension that will cause the mode-field dimension of core 42 to be 8 μm in the horizontal or x-direction at end face 60. This is essentially accomplished by squeezing the modal field out of the core 42 with the taper 78 until it is of the desired dimension. Thus, depending on the direction of light travel through core 42, the evanescent field of the light will expand or contract with respect to core 42. For example, the evanescent field of light traveling from end face 60 toward waveguide 48 will contract with respect to core 42, while the evanescent field of light traveling in the opposite direction will expand with respect to the core 42.

The height, H, of core 42 in the present embodiment is also preferably selected to support only the fundamental mode.

Accordingly, as the regions 64, 65 of the vertically adjacent cladding material 58, 59 have a refractive index value equal to $n_3$ in the present embodiment, the height H will preferably match the lateral dimension $W_2$ of the waveguide 48. Thus, for example if $W_2$ is set at 5 μm, H will also be set at 5 μm. Furthermore, if waveguide 48 has the same vertical and lateral dimensions and Δn of waveguide 48 is the same in both transverse directions, waveguide 48 will have a circular mode-field.

The refractive index of the vertically adjacent cladding material 58, 59 at end face 60 is set to a value $n_2$ that will preferably provide a circular mode-field shape at end face 60. Thus, for example, if end face 60 of core 42 is used as an input interface for a standard single-mode optical networking fiber with a mode-field diameter of 8 μm, then $n_2$ is preferably set at a value that will cause the mode-field dimension in the vertical or y-direction to be 8 μm at end face 60. This is accomplished by setting $n_2$ at a level that will cause core 42 to have weaker light confinement strength in the vertical direction at end face 60. As a result, the gradient provided in the vertically adjacent cladding material 58, 59 in regions 62, 63 accomplishes the same contraction (or expansion if light is travelling in the opposite direction) of the modal field with respect to core 42 in the vertical direction that taper 78 accomplishes in the horizontal direction.

Because waveguide 48 of the waveguide structure 76 may be provided with a high Δn in both the horizontal and vertical transverse directions, smaller bending radii, and hence closer packing densities, can be achieved in the waveguiding layer 46 of optical chip 38.

The angle at which taper 78 is tapered with respect to the axis of core 42 in the present embodiment depends on how quickly the refractive index in the regions 62, 63 is varied from $n_2$ to $n_3$. Preferably taper 78 is tapered at a rate that will, in light of the gradient in the refractive index profile of the vertically adjacent cladding material 68, 69, maintain a circular modal field throughout taper 78.

The refractive indices in the regions 62, 63 may be continuously graded, as shown in FIG. 11, or they may be graded quasi-continuously with a series of small steps or periodic changes in the refractive index. In general, however, the longer the taper 78 is and the more gradual the refractive indices are graded in the regions 62, 63, the lower the propagation losses will be in the taper 78.

As described above, the waveguide structure 76 may be used to match the modal field of an input fiber, thereby permitting waveguides having a higher Δn to be formed in the waveguiding layer 46 of optical chip 38 than the interfacing input fiber. Similarly, the waveguide structure 76 may also be used to match the modal field of an output fiber. Thus, the waveguide structure 76 satisfies the competing goals of achieving low loss, high efficiency couplings with fibers while also permitting higher packing densities to be realized.

Although, the illustrated embodiment was described in connection with matching the modal field of a weakly guiding standard optical networking fiber, the waveguide structure 76 is not limited to standard fibers. Using the principles described above, the taper 78, and the corresponding variations in the refractive index profiles provided in the regions 62, 63, may be adapted to match the modal field of any fiber, including those with a higher Δn than channel waveguide 48. The waveguide structure 76 may also be used to lower coupling losses between strongly guiding waveguides and weakly guiding waveguides in the waveguiding layer 46.

Figure 12:
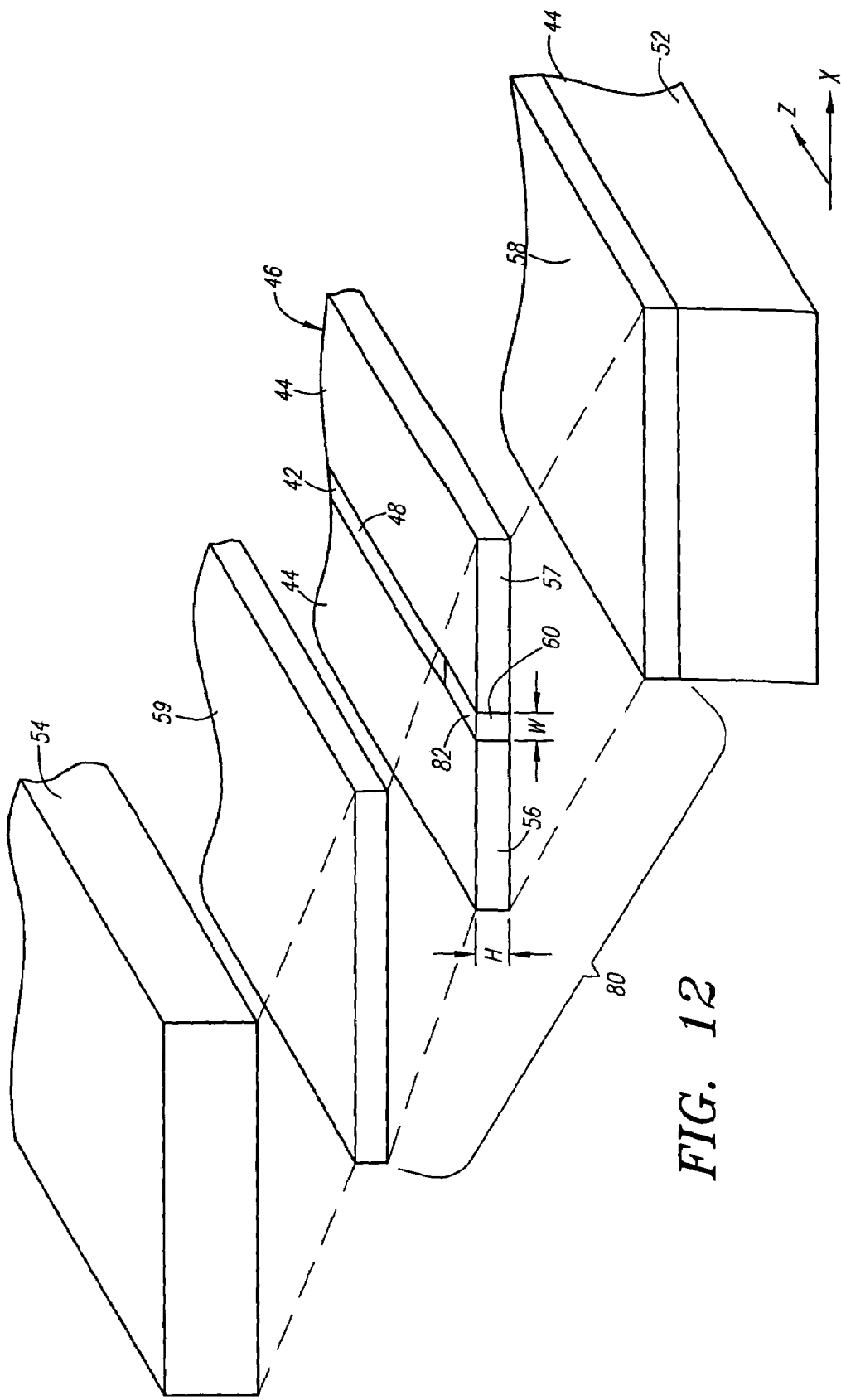
FIG. 12 is an exploded partial perspective view of yet another embodiment of a waveguide structure according to the present invention.

A fourth embodiment of a waveguide structure according to the present invention is shown in FIG. 12. In the waveguide structure 80 shown in FIG. 10 an expansion or contraction of the modal field with respect to the core 42 is accomplished in both the horizontal and vertical directions by varying Δn of the core 42 in both the horizontal and vertical directions over a predefined portion 82 of core 72. In contrast, in the waveguide structure 76 shown in FIG. 10, the vertical expansion or contraction of the modal field was achieved by varying Δn over the tapered portion 78, while the horizontal expansion or contraction of the modal field was achieved with taper 78.

Figure 13:
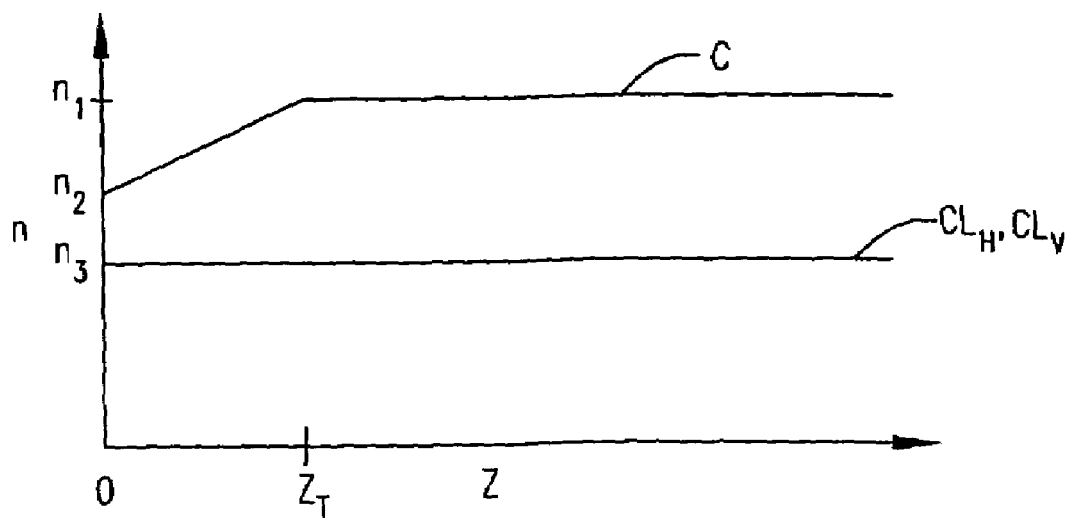
FIG. 13 is a graph illustrating refractive index profiles in the z-direction of the core, horizontally adjacent cladding material, and vertically adjacent cladding material of the waveguide structure shown in FIG. 12.

FIG. 13 graphically illustrates preferred refractive index profiles for the core 42, the horizontally adjacent cladding material 56, 57, and the vertically adjacent cladding material 58, 59 for the waveguide structure shown in FIG. 12. As seen from FIG. 13, the core 42 has a higher refractive index than the surrounding cladding material 44 at all points along its axial extent. As a result, light will be internally reflected within core 42 throughout its axial extent.

In the present embodiment, the channel waveguide 48 has a first constant refractive index value, $n_1$. On the other hand, the refractive index of the predetermined portion 82 of the core 42 varies from a second refractive index value, $n_2$, at the end face 60 to the first refractive index value, $n_1$, where the predetermined portion is coupled to channel waveguide 48. This location is graphically represented with "$Z_T$" on the Z-axis of FIG. 13.

The refractive index profile of the horizontally adjacent cladding material 56, 57 and the refractive index profile of the vertically adjacent cladding material 58, 59 are constant along the axial extent of core 42 in the present embodiment. As seen from FIG. 13, the refractive index of the horizontally adjacent cladding material 56, 57 and the vertically adjacent cladding material 58, 59 are set equal to the third refractive index value, $n_3$.

In the present embodiment, the various refractive indices are set to have the following relationship: $n_1 > n_2 > n_3$. In alternative implementations of the embodiment, however, other relationships or profiles may be employed. For example, the desired variation in Δn over the predetermined portion 82 may also be accomplished by making the refractive index of core 42 equal to a constant value $n_1$ over its axial extent and setting the refractive index profile of both the horizontally and vertically adjacent cladding material 56, 57, 58, 59 as shown in FIG. 11 for the vertically adjacent cladding material 56, 57 of the waveguide structure 76.

The values of $n_1$ and $n_3$ are selected to impart a desired strength of light confinement to waveguide 48. The greater the Δn waveguide 48 possesses with respect to cladding material 44 the more strongly it will confine light in the horizontally and vertically transverse directions. This in turn will impact the packing densities that will be able to be achieved on optical chip 38 as discussed above.

Typically $n_1$ and $n_3$ will be selected so that channel waveguide 48 has a Δn of at least 0.3% with respect to the horizontally and vertically adjacent cladding material 56, 57, 58, 59. Preferably $n_1$ and $n_3$ are selected so that waveguide 48 has a Δn greater than or equal to 0.8% with respect to the horizontally and vertically adjacent cladding material 56, 57, 58, 59.

The lateral and vertical dimensions of waveguide 48 are preferably selected so as to support only the fundamental mode of the light that is to be propagated through waveguide 48. Thus, for example, if the waveguide 48 is provided with a Δn of 0.8% with respect to the cladding material 44, its lateral dimension W and height H may be set at approximately 5 μm.

The value of $n_2$ is set based on the mode-field diameter desired at end face 60. Thus, for example, if end face 60 of core 42 is used as an input interface for a standard single-mode optical networking fiber with a mode-field diameter of 8 µm, then $n_2$ is preferably set at a value that will cause the mode-field diameter to be 8 µm at end face 60. This is accomplished by setting $n_2$ at a level that will cause core 42 to have very weak light confinement at end face 60 with respect to cladding material 44. For light traveling through the core 42 from the predefined portion 82 toward the waveguide 48, the refractive index gradient provided in the predefined portion 82 effects a contraction of the modal field with respect to the core 42 in both the vertical and horizontal directions. In contrast, an expansion of the modal field with respect to the core 42 is effected for light traveling in the opposite direction.

Because waveguide 48 of the waveguide structure 80 may be provided with a high Δn in both the horizontal transverse direction and vertical transverse directions, smaller bending radii, and hence closer packing densities, can be achieved in the waveguiding layer 46 of optical chip 38.

The refractive index in the predefined portion 82 may be continuously graded, as shown in FIG. 13, or it may be graded quasi-continuously with a series of small steps or periodic changes in the refractive index. In general, however, the longer the predefined portion 82 is and the more gradual the refractive index is graded in the predefined portion 82, the lower the propagation losses will be in the predefined portion.

By appropriately selecting the value of $n_2$, the waveguide structure 82 may be used to match the modal field of any input fiber, while simultaneously permitting waveguides having a higher Δn to be formed in the waveguiding layer 46 of optical chip 38 than the interfacing input fiber would otherwise permit. Similarly, the waveguide structure 76 may also be used to match the modal field of an output fiber. The waveguide structure 80 may also be used to lower coupling losses between strongly guiding waveguides and weakly guiding waveguides in the waveguiding layer 46 of optical chip 38. Thus, the waveguide structure 76 satisfies the competing goals of achieving low loss, high efficiency couplings with fibers while also permitting higher packing densities to be realized.

Figure 14:
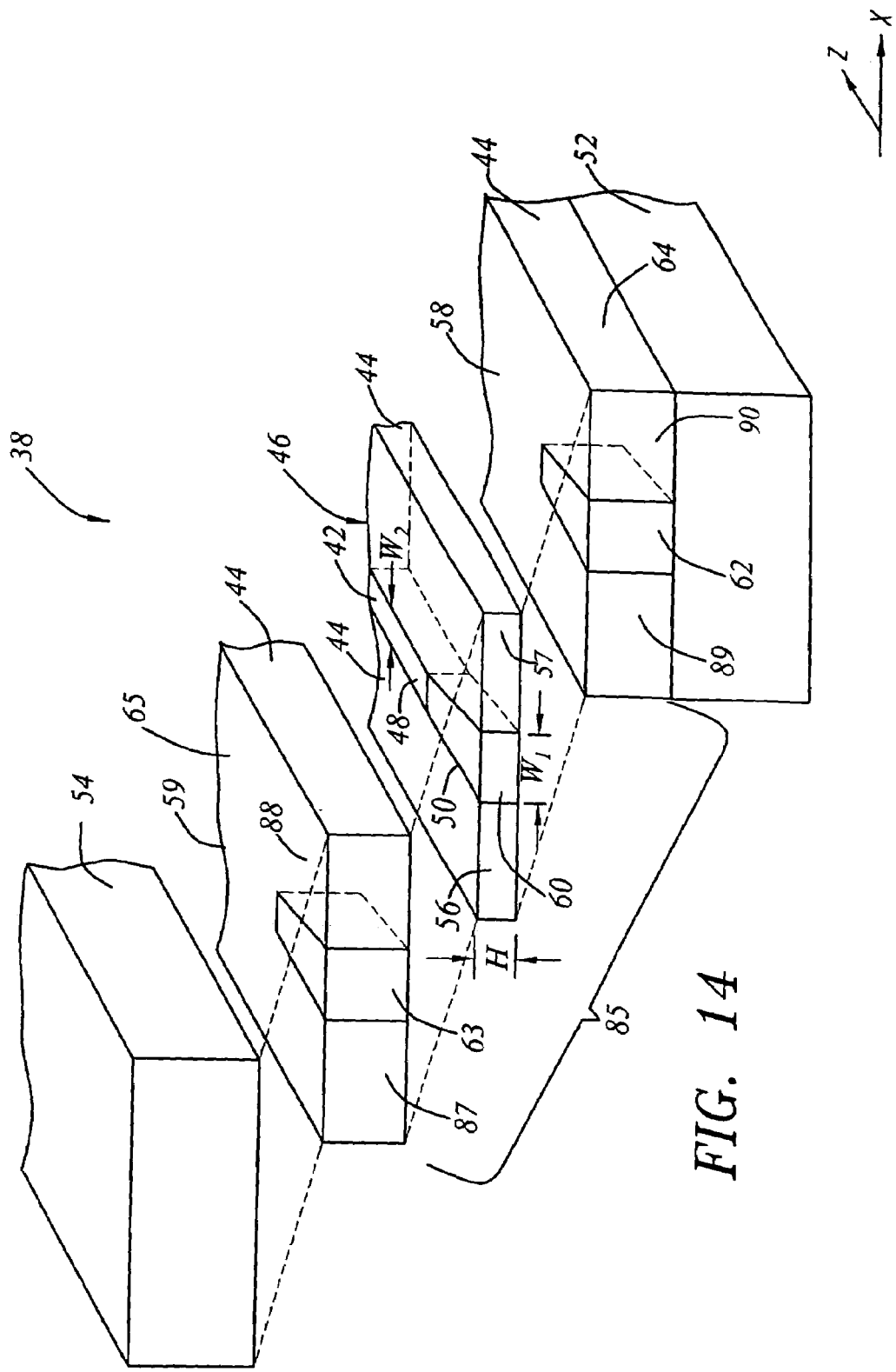
FIG. 14 is an exploded partial perspective view of still another embodiment of a waveguide structure according to the present invention.

A fifth embodiment of a waveguide structure according to the present invention is shown in FIG. 14. The principal difference between the waveguide structure 85 shown in FIG. 14 and the waveguide structure 40 of the first embodiment resides in the refractive index profiles of the vertical cladding material 58, 59. In addition, the index of refraction of the vertically adjacent cladding material 58, 59 varies in the x-direction between Z=0 and $Z=Z_T$, i.e., the region of the vertically adjacent cladding material that is adjacent the predefined portion of the core.

As with the previous embodiment, the core 42 is adapted to propagate light in an axial direction along a path defined by the core. The core 42 includes a channel waveguide 48 coupled to a taper 50 that, in the present embodiment, laterally extends out from the waveguide 48. As a result, the lateral dimension, W, of the core 42 varies over the axial extent of taper 50 from $W_1$ at its widest point to $W_2$ at its narrowest point, which corresponds to the width of channel waveguide 48. On the other hand, the vertical dimension, H, of the core 42 preferably remains constant over the axial extent of core 42, at least within the limitations of the fabrication equipment employed.

The waveguide structure 85 has varying lateral and vertical light confinement strength in the direction of light propagation, or z-direction. In the present embodiment, the varying light confinement strength is achieved by varying the refractive indices of the core 42, vertically adjacent cladding material 58, 59 and the lateral dimension of core 42 in the direction of light propagation.

FIGS. 15, 16A and 16B graphically illustrate preferred refractive index profiles for the core 42, the horizontally adjacent cladding material 56, 57, and the vertically adjacent cladding material 58, 59 for the waveguide structure 85 shown in FIG. 14. In FIGS. 15, 16A and 16B the refractive index profile of the core 42 is labeled "C", the refractive index profile of the horizontally adjacent cladding material 56, 57 is labeled "$CL_H$", and the refractive index profile of the vertically adjacent cladding material 58, 59 is labeled "$CL_V$".

As seen from FIG. 15, the core 42 has a higher refractive index than the surrounding cladding material 44 at all points along its axial extent. As a result, light will be internally reflected within core 42 throughout its axial extent.

In the present embodiment, the core 42 has a refractive index value C that varies from $n_2$ to $n_1$ in the region of taper 50, and is maintained at a constant value $n_1$ in the channel waveguide 48. The refractive index profile of the horizontally adjacent cladding material 56, 57 is constant along the axial extent of core 42 in the present embodiment, and set equal to a third refractive index value $n_3$. The vertically adjacent cladding material 58, 59 has regions 62, 63 where the refractive index is varied along the z-direction from a fourth refractive index value, $n_4$, at an axial location corresponding to Z=0 to $n_3$ at an axial location $Z=Z_T$. In the present embodiment, regions 62, 63 have lateral dimensions that are substantially the same as the lateral dimensions of taper 50. As a result, regions 62, 63 comprise a taper of generally the same dimensions as taper 50. Because regions 62, 63 do not span the entire width of optical chip 38, in contrast to the waveguide structure 40 described in connection with the first embodiment, the index of the vertically adjacent cladding material 58, 59 also varies in the x-direction in the region between Z=0 and $Z=Z_T$. FIGS. 16A and 16B show preferred refractive index profiles in the x-direction for two locations along the Z-axis, Z=0 and $Z=Z_T$, where $Z_T$ corresponds to the axial location where taper 50 is coupled to channel waveguide 48. As seen from FIGS. 16A and B, the refractive index of regions 89, 90, which are laterally adjacent to region 62, and the refractive index of regions 87, 88, which are laterally adjacent to region 63, are set equal to the third refractive index, $n_3$.

Although in the present embodiment regions 62, 63 have lateral dimensions that are substantially the same as the lateral dimensions of taper 50, and thus form tapered regions having a graded refractive index in the direction of light propagation above and below taper 50, in other embodiments the lateral dimensions of regions 62, 63 may be different. Indeed, this is illustrated by the previously described embodiments.

By shaping regions 62, 63 in the form of a taper that is similar in size to the taper 50 in core 42, at least two advantages are achieved. First, the lateral dimensions of regions 62, 63 are reduced. This allows the refractive index gradient provided in regions 62, 63 to be provided only in those portions of cladding material 44 where a gradient in the direction of light propagation is required to expand or contract the mode field characteristics of the waveguide structure in the desired manner. Thus, other waveguides may also be provided on optical chip 38 without being effected by the gradient provided in regions 62, 63 of the present embodiment. As a result, a host of waveguides, including waveguide structures according to the present invention, may be provided on the same optical chip 38 if desired. Similarly, those skilled in the art will appreciate from the foregoing that although the lateral dimensions of, for example, regions 64, 65 and 68, 69 have been illustrated in the various embodiments as extending across the entire width of optical chip 38 that this is not necessary. Instead, the lateral dimensions of such regions need only extend in the lateral direction a sufficient distance to impart the desired optical properties to core 42.

Figure 17:
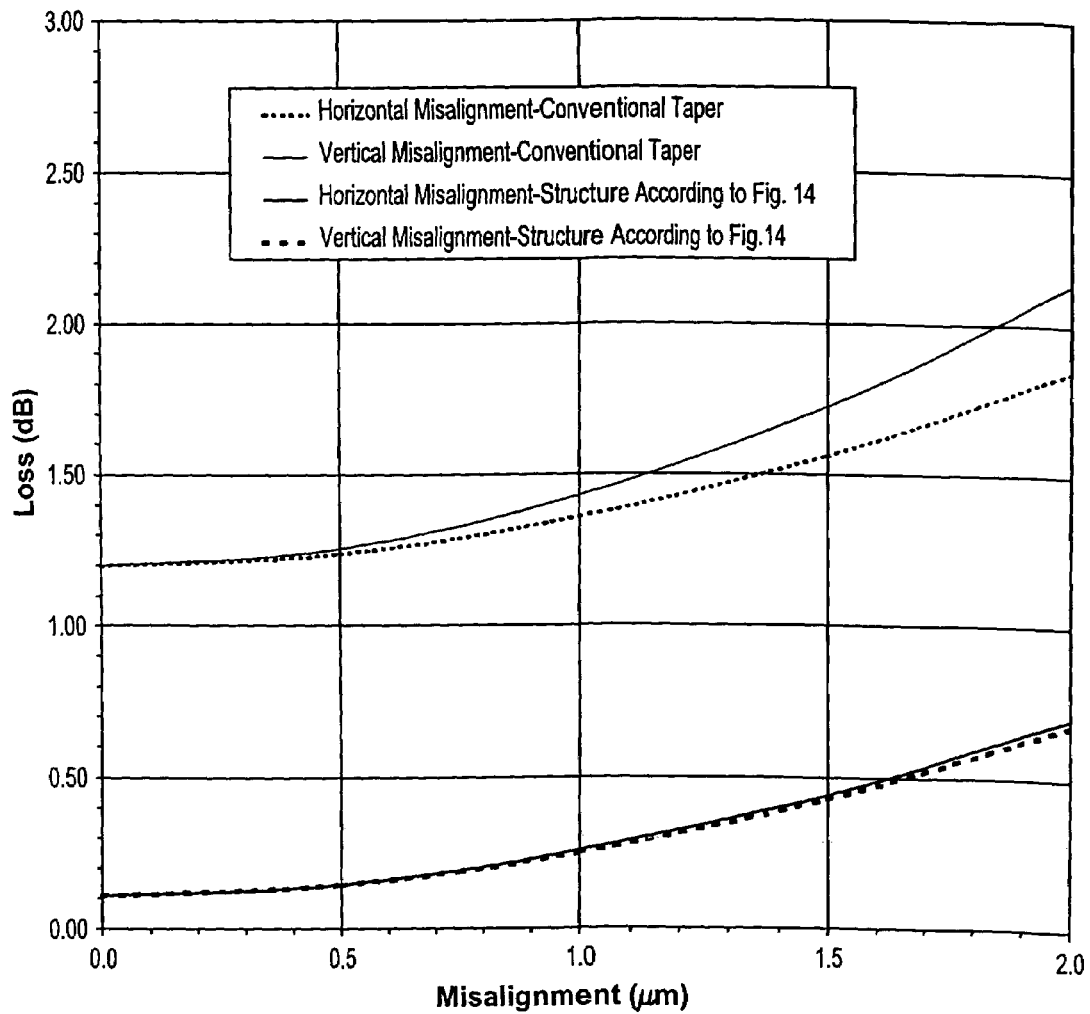
FIG. 17 is a graph depicting calculated insertion losses due to misalignments in horizontal and vertical directions for the structures shown in FIG. 1 and FIG. 14.

As shown in FIG. 17, a second advantage of shaping regions 62, 63 is that the resulting transitions in the lateral refractive index profiles in the vertically adjacent cladding material 58, 59 between Z=0 and Z=$Z_T$ improves the coupling loss in the presence of slight misalignment when the waveguide structure 85 is coupled to an external component. The present embodiment therefore represents a design that is more tolerant to transverse misalignment in a fabrication process.

In the present embodiment, the various refractive indices are set to have the following relationship: $n_1 > n_2 > n_4 > n_3$. However, in alternative implementations of the embodiment, other relationships or profiles may be desirable.

The values of $n_1$ and $n_3$ are selected to impart a desired light confinement strength to waveguide 48. The greater the Δn waveguide 48 possesses with respect to horizontally adjacent cladding 56, 57, the more strongly it will confine light in the horizontally transverse direction. This in turn will impact the packing densities that will be able to be achieved on an optical chip 38 as discussed above.

Typically $n_1$ and $n_3$ will be selected so that channel waveguide 48 has a Δn of at least 0.3% with respect to the horizontally adjacent cladding material 56, 57. Preferably $n_1$ and $n_3$ are selected so that waveguide 48 has a Δn greater than or equal to 0.8% with respect to the horizontally adjacent cladding material 56, 57.

The lateral dimension, $W_2$, of waveguide 48 is preferably selected so as to support only the fundamental mode of the light that is to be propagated through waveguide 48. Thus, for example, if the waveguide 48 is provided with a Δn of 0.8% with respect to the horizontally adjacent cladding material 56, 57, its lateral dimensions $W_2$ may be set at approximately 5 μm. In specific applications, however, it may be desirable to choose $W_2$ such that a limited number of modes are supported.

The value of $n_2$ and the lateral dimension of the widest point of taper 50 (i.e., $W_1$) are set based on the mode-field characteristics desired at end face 60 in the horizontally transverse direction. For example, if taper 50 is used as an input interface for a standard single-mode optical networking fiber with a mode-field diameter of 8 μm, then $W_1$ may be set at approximately 7 μm and $n_2$ may be selected so as to provide a Δn of approximately 0.2% to 0.4% between the core 42 and the horizontally adjacent cladding material 56, 57 at the end face 60.

The height, H, of core 42 in the present embodiment is also preferably selected to support only the fundamental mode. Accordingly, as the regions 64, 65 of the vertically adjacent cladding material 58, 59 have a refractive index value equal to $n_3$ in the present embodiment, the height H will preferably match the lateral dimension $W_2$ of the waveguide 48. Thus, for example if $W_2$ is set at 5 μm, H will also be set at 5 μm. Furthermore, if waveguide 48 has the same vertical and lateral dimensions and Δn of waveguide 48 is the same in both transverse directions, waveguide 48 will have a generally circular mode-field.

The refractive index of the vertically adjacent cladding material 58, 59 at end face 60 is set to a value $n_4$ that will preferably provide a generally circular mode-field shape at end face 60. Thus, for example, if end face 60 of core 42 is used as an input interface for a standard single-mode optical networking fiber with a mode-field diameter of 8 μm, then $n_4$ is preferably set at a value that will provide a suitable Δn between the core and vertical cladding material given the height, H, of the core to cause the mode-field dimension in the vertical or y-direction to be 8 μm at end face 60. In the present embodiment, this is accomplished by setting $n_4$ at a level that will cause core 42 to have weaker light confinement strength in the vertical direction at end face 60. As a result, the gradient provided in the vertically adjacent cladding material 58, 59 in regions 62, 63 in combination with the gradient provided in core 42 in the taper 50 accomplishes the same contraction (or expansion if light is travelling in the opposite direction) of the modal field in the vertical direction that taper 50 in combination with the gradient in core 42 accomplishes in the horizontal direction.

Because waveguide 48 of the waveguide structure 76 may be provided with a high Δn in both the horizontal and vertical transverse directions, smaller bending radii, and hence closer packing densities, can be achieved in the waveguiding layer 46 of optical chip 38.

The angle at which taper 50 is tapered with respect to the axis of core 42 in the present embodiment depends on how quickly the refractive index in the core 42 is varied from $n_1$ to $n_2$. For example, if only single-mode propagation is desired in the horizontally transverse direction, then taper 50 should be tapered at a rate that will ensure only the fundamental mode of the propagating light is supported within the taper 50 at any point along its axial extent.

The refractive indices in the taper 50 and the regions 62, 63 may be continuously graded, as shown in FIG. 15, or they may be graded quasi-continuously with a series of small steps or periodic changes in the refractive index. In general, however, the longer the taper 50 is and the more gradual the refractive indices are graded in the taper 50 and the regions 62, 63, the lower the propagation losses will be in the taper 50.

As described above, the waveguide structure 85 may be used to match the modal field of an input fiber, thereby permitting waveguides having a higher Δn to be formed in the waveguiding layer 46 of optical chip 38 than the interfacing input fiber. Similarly, the waveguide structure 85 may be used to match the modal field of an output fiber. Thus, the waveguide structure 85 satisfies the competing goals of achieving low loss, high efficiency couplings with fibers while also permitting higher packing densities to be realized.

Although the illustrated embodiment was described in connection with matching the modal field of a weakly guiding standard optical networking fiber, the waveguide structure 85 is not limited to standard fibers. Using the principles described above, the taper 50, and the corresponding variations in the refractive index profiles provided in the taper 50 and the regions 62, 63, may be adapted to match the modal field of any fiber or waveguide, including those with a higher Δn than channel waveguide 48, e.g. semiconductor laser structures. The waveguide structure 85 may also be used to lower coupling losses between strongly guiding waveguides and weakly guiding waveguides in the waveguiding layer 46.

Figure 1:
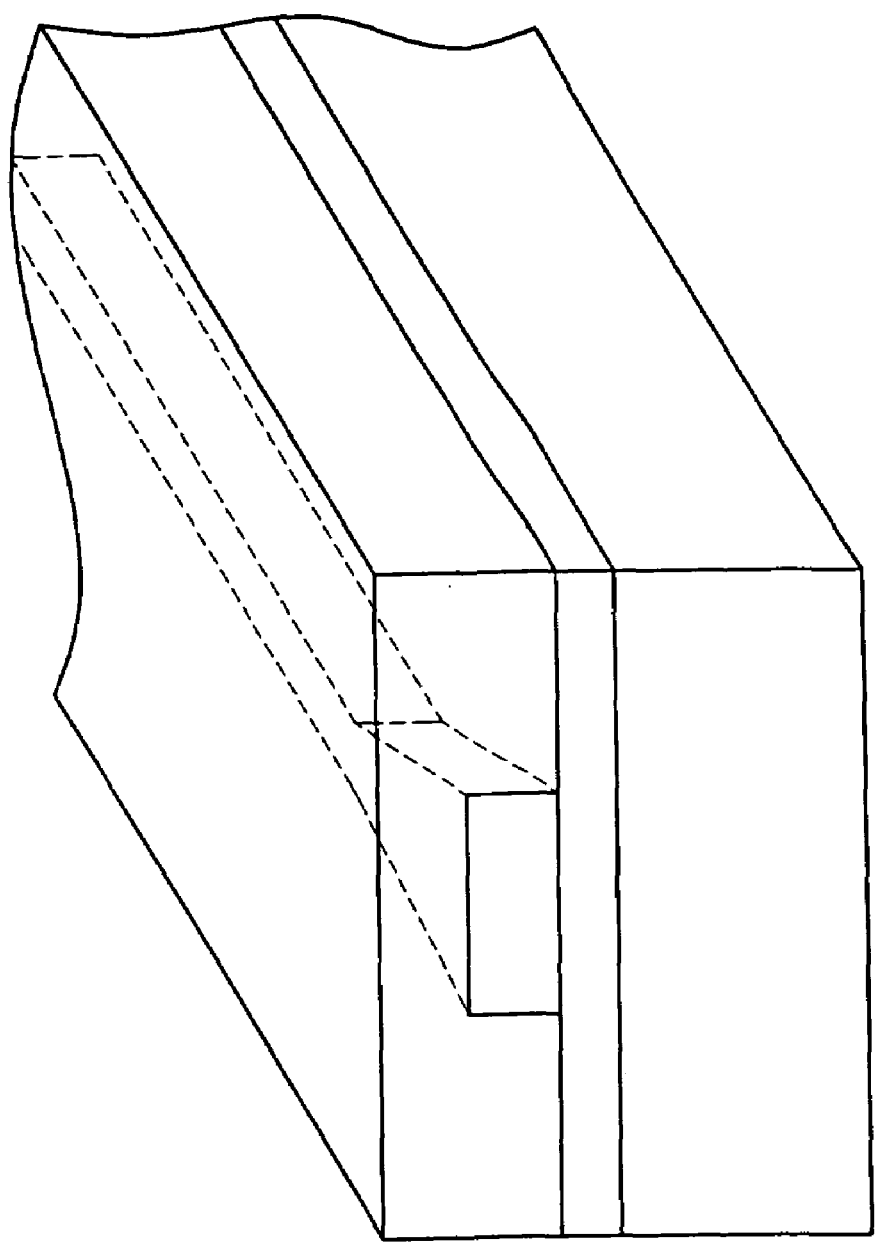
FIG. 1 is a partial perspective view of a prior art waveguide structure having a one dimensional taper for partially mode-matching a high Δn waveguide with a low Δn fiber.
Figure 2:
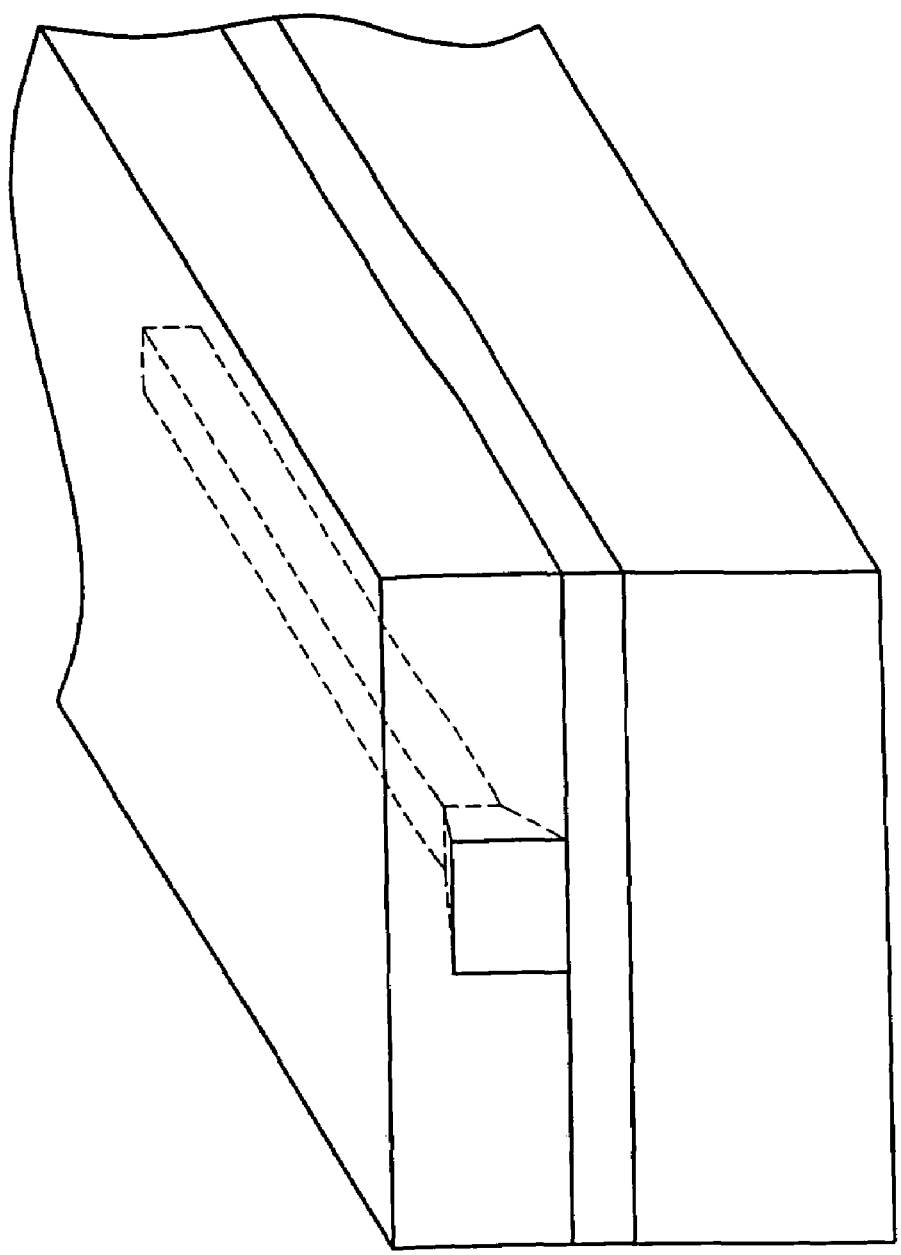
FIG. 2 is a partial perspective view of a prior art waveguide structure having a three dimensional adiabatic taper for mode-matching a high Δn waveguide with a low Δn fiber.
Figure 3:
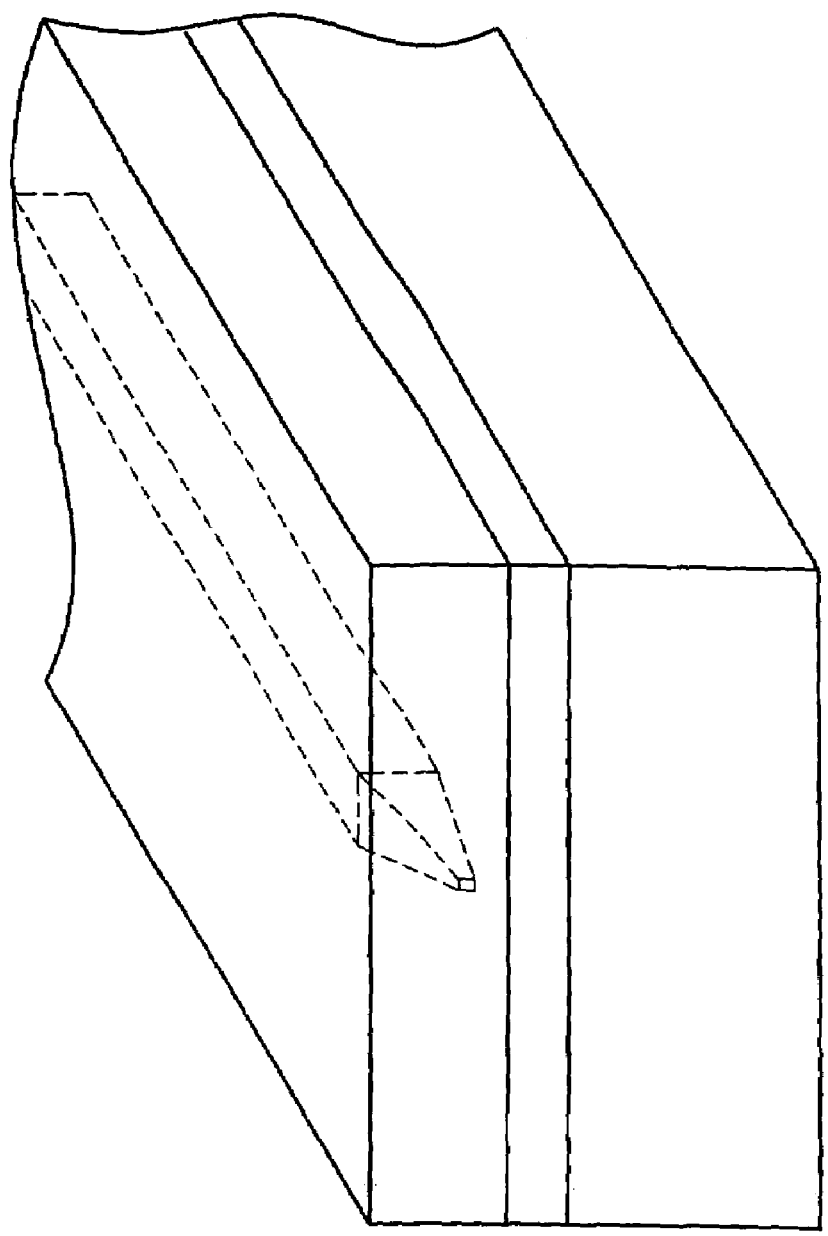
FIG. 3 is a partial perspective view of a prior art waveguide structure having a three dimensional taper for mode-matching a high Δn waveguide with a low Δn fiber.

To compare the performance of the present invention with that of the conventional approach for coupling an optical wave through a fiber-and-high-Δn-waveguide interface, Beam Propagation Method (BPM) modeling of such interfaces is presented below. The modeled high-Δn waveguide core has a Δn of 1.5% of the cladding refractive index and width of 4 μm. For purposes of comparing a planar waveguide taper with constant indices along the z direction as shown in FIG. 1 to a planar waveguide structure 85 with variable light confinement strength, as just described in connection with FIGS. 14-16, the coupling loss to a standard single mode fiber as a function to horizontal and vertical misalignment was calculated. The results of the calculation are depicted in FIG. 17.

In the conventional approach, increasing the waveguide width to generate a mode profile similar to the connected fiber in the horizontal direction of waveguide, reduces the coupling loss. However, the waveguide mode in the vertical direction remains almost unchanged and causes a substantial amount of insertion loss due to mode-mismatch. In contrast, in the present invention the refractive indices of all three layers of the waveguide taper are variables in all directions. Because varying either the waveguide size or the index profile can modify the mode profile, the modes of the waveguide and the fiber can be better matched in both vertical and horizontal directions; therefore, the coupling loss can be significantly reduced. Based on the cases modeled, less than 0.1 dB per interface loss can be achieved. The result is clearly better than the conventional approach that results in a loss more than 1.2 dB, as indicated in FIG. 17.

The present invention not only reduces the insertion loss but also bears higher alignment tolerance, which makes aligning fibers in a V-groove array to an array of waveguides much easier. FIG. 17 shows the insertion losses due to misalignments in horizontal and vertical directions for the conventional taper shown in FIG. 1 and the waveguide structure 85 according to the present invention shown in FIG. 14. In the approach shown in FIG. 1, the vertical alignment has less tolerance than the horizontal one. In contrast, the present invention has relatively similar alignment tolerance in both directions. Further, the insertion losses due to misalignments in the present invention are smaller than those in the conventional taper. In particular, the present invention has about 25% better alignment tolerance in vertical direction in the 2 µm range. Because V-groove arrays tend to have less fabrication accuracy in the vertical direction, the present invention can greatly reduce the channel loss non-uniformity caused by fabrication fluctuation in a V-groove array.

Figure 18:
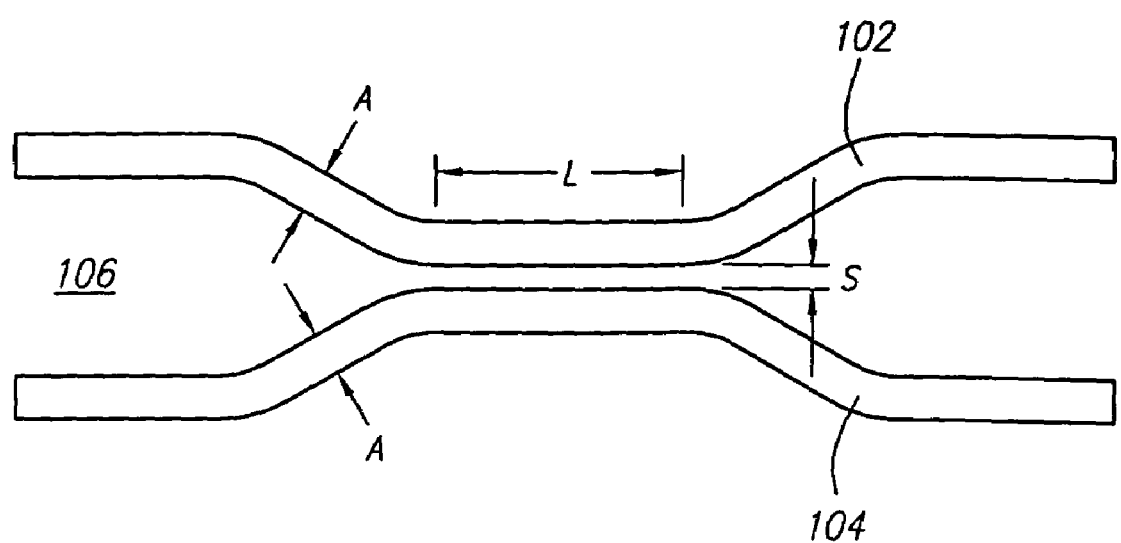
FIG. 18 is a diagrammatic representation of a top view of a prior art directional coupler.

FIG. 18 illustrates a classical design of a prior art directional coupler 100. In the classical design, all or a portion of light propagating in a first waveguide 102 is coupled into a second waveguide 104 which is brought into close proximity to the first waveguide such that the evanescent fields of modes in both waveguides can interact. The waveguides are curved such that a parallel coupling region, L, is limited to the optimal length to achieve the desired coupling and then physically separated. This is necessary because the first and second waveguides 102, 104, as well as the cladding material 106, all have a constant refractive index. Without physical separation, light would simply continue to couple back and forth between the guides. As a result, however, classical directional couplers, particularly coupler arrays such as those used in star couplers, take up a significant amount of the real estate available on an optical chip.

Figure 19:
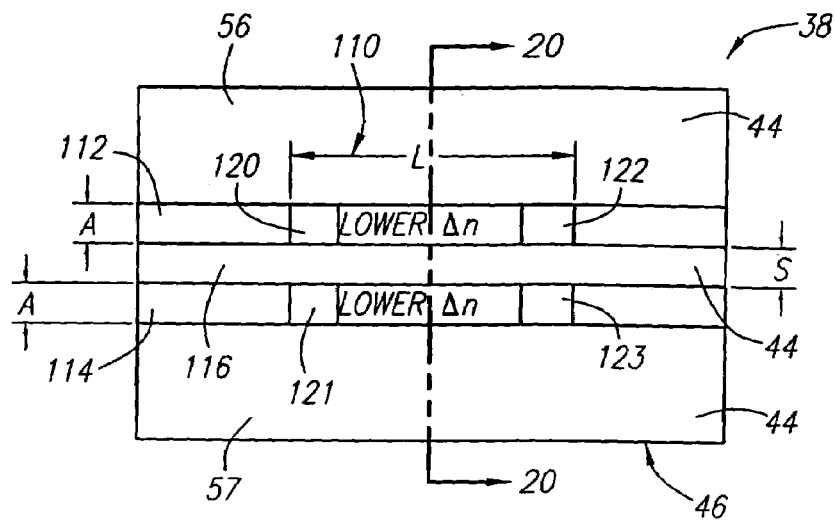
FIG. 19 is a diagrammatic top view of an embodiment of a directional coupler realized from a waveguide structure according to the present invention.
Figure 20:
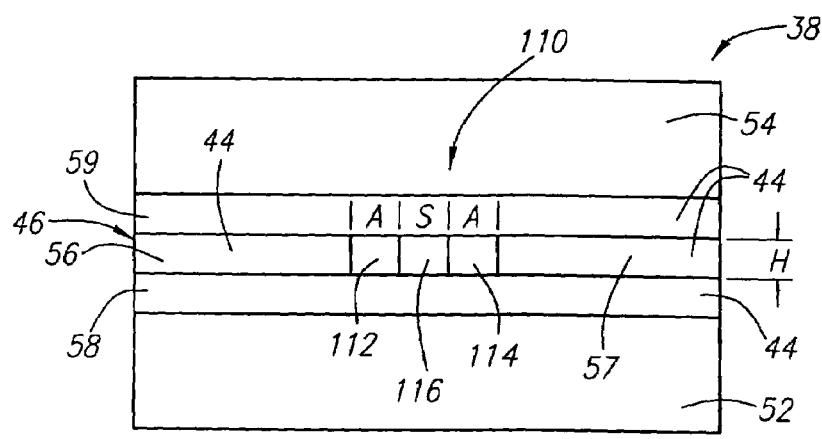
FIG. 20 is a cross-sectional view taken at line 20-20 of the directional coupler shown in FIG. 19.
Figure 21:
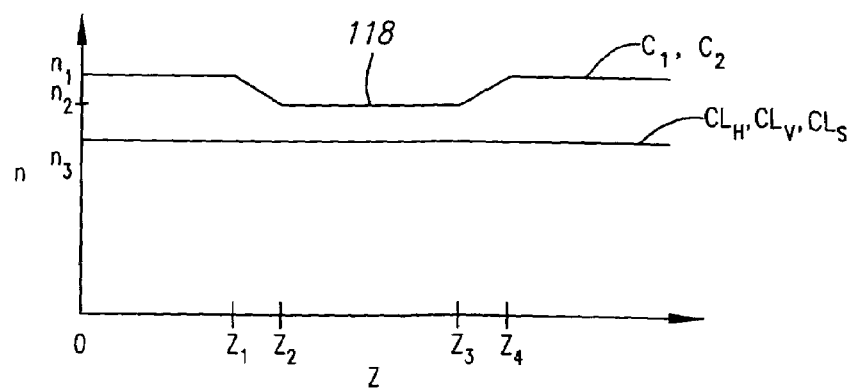
FIG. 21 is a graph illustrating refractive index profiles in the z-direction of various components of the directional coupler shown in FIG. 19.

FIGS. 19, 20, and 21 illustrate a design of an optical coupler 110 according to one embodiment of the present invention. The directional coupler 110 may be achieved using any of the waveguide structures according to the present invention. FIGS. 19 and 20 provide a top view and a cross-sectional view of the coupler 110, respectively. As illustrated, the directional coupler 110 is preferably provided in a waveguiding layer 46 of an integrated optical chip 38.

The directional coupler 110 comprises first and second cores 112, 114 and cladding material 44 that surrounds the cores 112, 114 and is interposed therebetween. Although cladding material 44 is shown as completely surrounding the first and second cores 112, 114 in the illustrated embodiment, the cladding material may only partially surround the first and second cores in other embodiments. For example, in certain implementations, the cladding material 44 may be omitted from the top of the first and second cores.

The core 112 preferably extends in close proximity in a direction parallel to the core 114 over some distance that is greater than the coupling region L provided in the coupler 110. The coupling region L is preferably formed by tailoring the field confinement strength in one or both of the cores 112, 114 such that the evanescent field of the guided wave spreads out and then returns to a stronger confinement with respect to the cores 112, 114 over a limited region corresponding to the coupling length L. This may be accomplished in the directional couplers of the present invention by constructing one or both of the cores 112, 114 so that they exhibit a gradient in light confinement over the coupling region L. The gradient in light confinement may be provided by, for example, modifying $\Delta n$ in one or both of the cores 112, 114 over the coupling region L.

FIG. 21 graphically illustrates preferred refractive index profiles for the first and second cores 112, 114, the horizontally adjacent cladding 56, 57, the vertically adjacent cladding 58, 59, and the cladding material 116 interposed between the first and second cores 112, 114 ("the interposed cladding material"). In FIG. 21, the refractive index profile of the first core 112 is labeled "$C_1$", the refractive index profile of the second core 114 is labeled "$C_2$", the refractive index profile of the horizontally adjacent cladding material 56, 57 is labeled "$CL_H$", the refractive index profile of the vertically adjacent cladding material 58, 59 is labeled "$CL_V$", and the refractive index profile of the interposed cladding material 116 is labeled "$CL_S$".

As seen from FIG. 21, the cores 112, 114 have a higher refractive index than the surrounding cladding material 44 at all points along their axial extent. As a result, light will be internally reflected within the cores 112, 114 throughout their axial extent.

The refractive index profiles of the cores 112, 114 include a gradient 118 that extends from a point $Z_1$ to a point $Z_4$ along the Z-axis of the cores. Points $Z_1$ and $Z_4$ correspond to the beginning and end of the coupling region L, respectively. However, light may also be propagated through the coupler 110 in the opposite direction, in which case $Z_4$ would correspond to the beginning of coupling region L and $Z_1$ would correspond to the end of coupling region L.

As shown in FIG. 21, the refractive index profiles of the first and second cores 112, 114 are the same in the present embodiment. Outside of the coupling region L, the cores 112 and 114 have a constant refractive index equal to a first refractive index value, $n_1$. In transition regions 120, 121 the refractive index profiles of the first and second cores 112, 114 are transitioned from $n_1$ at point $Z_1$ to a second refractive index value $n_2$ at point $Z_2$. The refractive index profiles of the cores 112, 114 then remain constant until point $Z_3$ where the refractive index profiles are transitioned back in transition regions 122, 123 to a value of $n_1$ at point $Z_4$.

The refractive index profiles for the horizontally adjacent cladding material 56, 57, vertically adjacent cladding material 58, 59, and interposed cladding material 116 are also all the same in the present embodiment. Further, as shown in FIG. 21, the refractive index profiles of these cladding materials 44 are set at a constant third refractive index value, $n_3$, along the axial extent of the cores 112, 114.

As illustrated by the various embodiments of directional couplers described herein, other refractive index profiles may be employed in the couplers of the present invention than those illustrated in FIG. 21. Further, in certain implementations it may be desirable for the first and second cores 112, 114 to have different refractive index profiles from one another. Similarly, it may also be desirable for one or more of the cladding materials 56, 57, 58, 59, and 116 to have a different refractive index profile than the other cladding materials.

In the present embodiment, the various refractive indices are set to have the following relationship: $n_1 > n_2 > n_3$. As a result, the cores 112, 114 have reduced light confinement strength within the coupling region L, as both the cores have reduced Δn values with respect to the cladding material 44 in this region.

The values of $n_1$ and $n_3$ are selected to impart a desired strength of light confinement to the cores 112, 114 outside of the coupling region L. The greater the Δn the cores 112, 114 possess outside the coupling region L with respect to the various cladding materials 44, the more strongly they will confine light outside the coupling region in both the horizontally and vertically transverse directions. This in turn will permit the first and second cores 112, 114 to be more closely spaced without resulting in unacceptable levels of parasitic cross talk between them. Further, as discussed above, this will also impact the packing densities that may be achieved on optical chip 38. As a result, $n_1$ and $n_3$ are preferably selected so that the cores 112, 114 have a Δn of at least 0.3% with respect to the cladding material 44 outside the coupling region. More preferably, $n_1$ and $n_3$ are selected so that the cores 112, 114 have a Δn greater than or equal to 0.8% outside the coupling region L with respect to the cladding material 44.

The lateral and vertical dimensions of the cores 112, 114 are preferably selected so as to support only the fundamental mode of the light that is to be propagated through the cores. Thus, for example, if the values of $n_1$ and $n_3$ are selected so that the first and second cores have a Δn of 0.8% with respect to the cladding material 44 outside the coupling region L, then the lateral dimension, A, and the vertical dimension, H, of the first and second cores would be preferably set at approximately 5 μm.

Although the lateral dimension A of the cores 112, 114 is the same in the present embodiment, in other embodiments the lateral dimensions of the first and second cores 112, 114 may be different.

The value of $n_2$ is selected based on the desired coupling strength in coupling region L and the spacing S between the cores 112, 114. Preferably, sufficient spacing S is provided between the cores 112, 114 so that, based on their guiding strength, less than −10 dB/cm parasitic cross talk occurs between the cores 112, 114 outside the coupling region L. On the other hand, $n_2$ is preferably selected to minimize the length of the coupling region L necessary to achieve the desired power splitting function between the first and second cores 112, 114.

Because the cores 112, 114 of the coupler 110 may be provided with a high Δn in the horizontally transverse direction, and preferably in both the horizontally and vertically transverse directions, small bending radii, and hence closer packing densities, can be achieved in the waveguiding layer 46 of optical chip 38.

The refractive index profiles in the transition regions 120, 121, 122, 123 may be continuously graded, as shown in FIG. 21, or they may be graded quasi-continuously with a series of small steps or periodic changes in the refractive index. In general, however, the longer the transition regions 120, 121, 122, 123 are and the more gradual the refractive index is graded in the transition regions, the lower the propagation losses will be in the transition regions.

Figure 22:
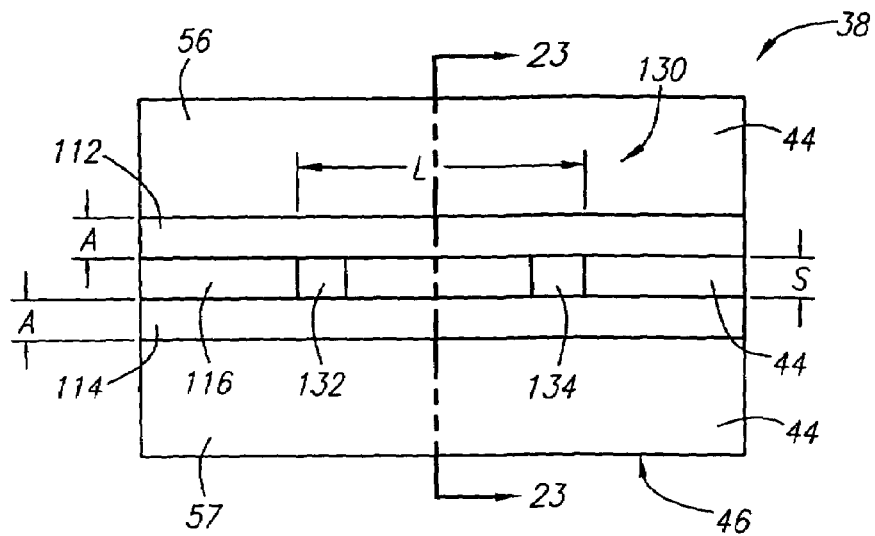
FIG. 22 is a diagrammatic top view of another embodiment of a directional coupler realized from a waveguide structure according to the present invention.
Figure 23:
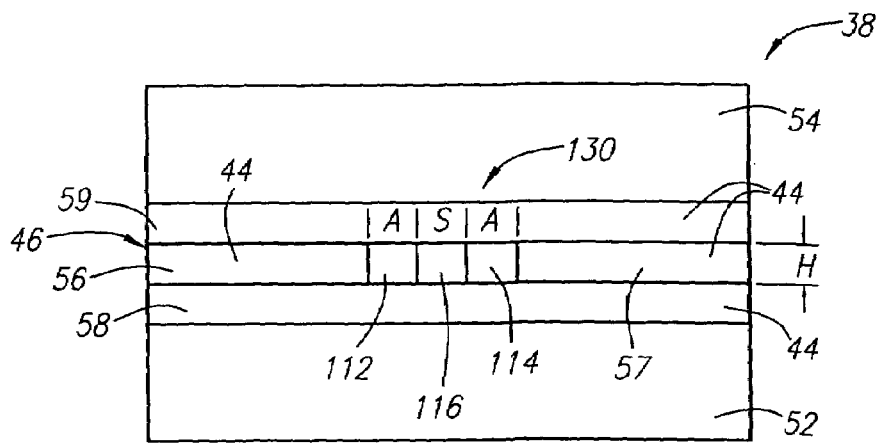
FIG. 23 is a cross-sectional view taken at line 23-23 of the directional coupler shown in FIG. 22.

A second embodiment of a directional coupler according to the present invention will now be described in connection with FIGS. 22, 23, and 24. The principal difference between the optical coupler 130 shown in FIGS. 22, 23, and 24 and the optical coupler 110 of the previous embodiment resides in the refractive index profiles shown in FIG. 24.

Figure 24:
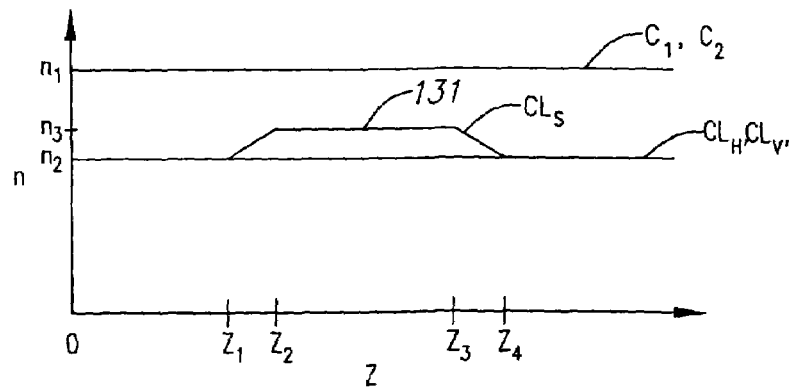
FIG. 24 is a graph illustrating refractive index profiles in the z-direction of various components of the directional coupler shown in FIG. 22.

FIG. 24 graphically illustrates preferred refractive index profiles for the first and second cores 112, 114, the horizontally adjacent cladding 56, 57, the vertically adjacent cladding 58, 59, and the interposed cladding material 116. In FIG. 24, the refractive index profile of the first core 112 is labeled "$C_1$", the refractive index profile of the second core 114 is labeled "$C_2$", the refractive index profile of the horizontally adjacent cladding material 56, 57 is labeled "$CL_H$", the refractive index profile of the vertically adjacent cladding material 58, 59 is labeled "$CL_V$", and the refractive index profile of the interposed cladding 116 is labeled "$CL_S$".

As seen from FIG. 24, the refractive index profiles of the first and second cores 112, 114 are the same in the present embodiment. Further, the refractive index profiles of the first and second cores 112, 114 are set at a constant first refractive index value, $n_1$, along their axial extent. Thus, the refractive index of the cores does not vary over the coupling region L in the present embodiment.

The refractive index profiles for the horizontally adjacent cladding material 56, 57 and vertically adjacent cladding material 58, 59 are also the same in the present embodiment. Further, as shown in FIG. 24, the refractive index profiles of the horizontally adjacent cladding material 56, 57 and vertically adjacent cladding material 58, 59 are set at a constant second refractive index value, $n_2$, along the axial extent of the cores 112, 114.

In the present embodiment, the reduction in the light confinement strength of the first and second cores 112, 114 within the coupling region L is achieved by including a gradient 131 in the refractive index profile of the interposed cladding material 116. The gradient 131 extends from a point $Z_1$ to a point $Z_4$ along the Z-axis of the cores. Points $Z_1$ and $Z_4$ correspond to the beginning and end of the coupling region L, respectively. However, light may also be propagated through the coupler 130 in the opposite direction, in which case $Z_4$ would correspond to the beginning of coupling region L and $Z_1$ would correspond to the end of coupling region L.

Outside of the coupling region L, the interposed cladding material 116 has a constant refractive index equal to the second refractive index value, $n_2$. In transition region 132 the refractive index profile of the interposed cladding material 116 is transitioned from $n_2$ at point $Z_1$ to a third refractive index value $n_3$ at point $Z_2$. The refractive index profile of the interposed cladding material 116 then remains constant until point $Z_3$ where the refractive index profile is transitioned back in transition region 134 to a value of $n_2$ at point $Z_4$.

The various refractive indices are set to have the following relationship in the present embodiment: $n_1 > n_3 > n_2$. As a result, both the cores have reduced Δn values, and thus light confinement strength, with respect to the interposed cladding material 116 in the coupling region 116.

The values of $n_1$ and $n_2$ are selected to impart a desired strength of light confinement to the cores 112, 114 outside of the coupling region L. The refractive index values $n_1$ and $n_2$ are preferably selected so that the cores 112, 114 have a Δn of at least 0.3% with respect to the cladding material 44 outside the coupling region. More preferably, $n_1$ and $n_2$ are selected so that the cores 112, 114 have a Δn greater than or equal to 0.8% outside the coupling region L with respect to the cladding material 44.

The value of $n_3$ is selected based on the desired coupling strength in coupling region L and the spacing S between the cores 112, 114. Preferably, sufficient spacing S is provided between the cores 112, 114 so that, based on their guiding strength, less than −10 dB/cm parasitic cross talk occurs between the cores 112, 114 outside the coupling region L. On the other hand, $n_3$ is preferably selected to minimize the length of the coupling region L necessary to achieve the desired power splitting function between the first and second cores 112, 114.

Because the cores 112, 114 of the coupler 130 may be provided with a high Δn in the horizontally transverse direction, and preferably in both the horizontally and vertically transverse directions, small bending radii, and hence closer packing densities, can be achieved in the waveguiding layer 46 of optical chip 38.

The refractive index profiles in the transition regions 132, 134 may be continuously graded, as shown in FIG. 24, or they may be graded quasi-continuously with a series of small steps or periodic changes in the refractive index. In general, however, the longer the transition regions 132, 134 are and the more gradual the refractive index is graded in the transition regions, the lower the propagation losses will be in the transition regions.

Figure 25:
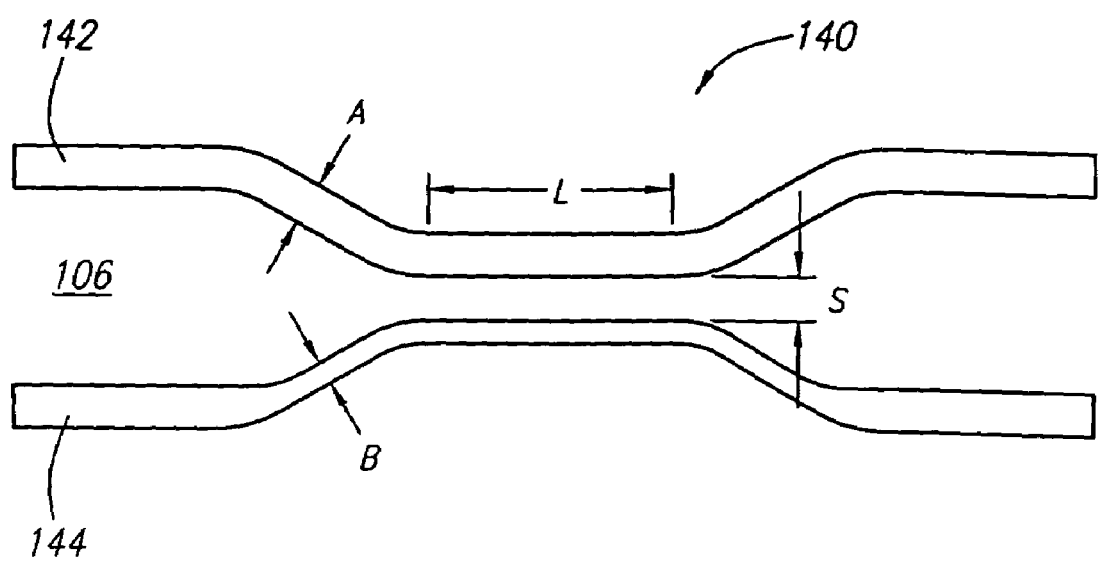
FIG. 25 is a diagrammatic representation of a top view of a prior art asymmetric directional coupler.

FIG. 25 illustrates a classical design of a prior art asymmetric directional coupler 140. In the classical asymmetric coupler design, all or a portion of light propagating in a first waveguide 142 is coupled into a second waveguide 144 which is brought into close proximity to the first waveguide such that the evanescent fields of modes in both waveguides can interact. The difference between the classical symmetrical directional coupler and the classical asymmetric directional coupler is that the two cores have different widths in the classical asymmetric coupler. The waveguides are provided with different widths in order to minimize variations in coupling efficiencies between wavelengths. Thus, the asymmetric coupler shown in FIG. 25 provides good broadband performance. However, as with the classical symmetrical coupler, one or both the waveguides in the asymmetrical coupler are curved such that a parallel coupling region, L, is limited to the optimal length to achieve the desired coupling and then the waveguides are physically separated. This is necessary because the first and second waveguides 142, 144, as well as the cladding material 106, all have a constant refractive index. Without physical separation, light would simply continue to couple back and forth between the guides. As a result, however, classical asymmetric directional couplers take up a significant amount of the real estate available on an optical chip.

Figure 26:
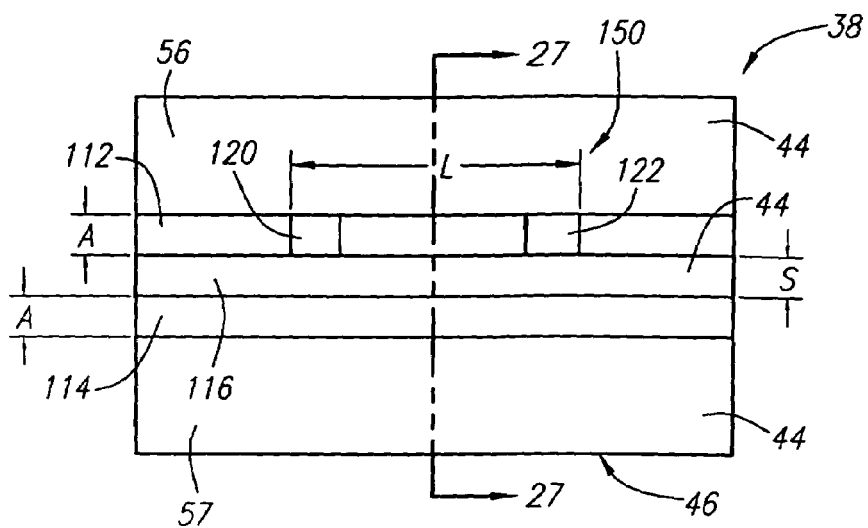
FIG. 26 is a diagrammatic top view of an embodiment of an asymmetric directional coupler realized from a waveguide structure according to the present invention.
Figure 27:
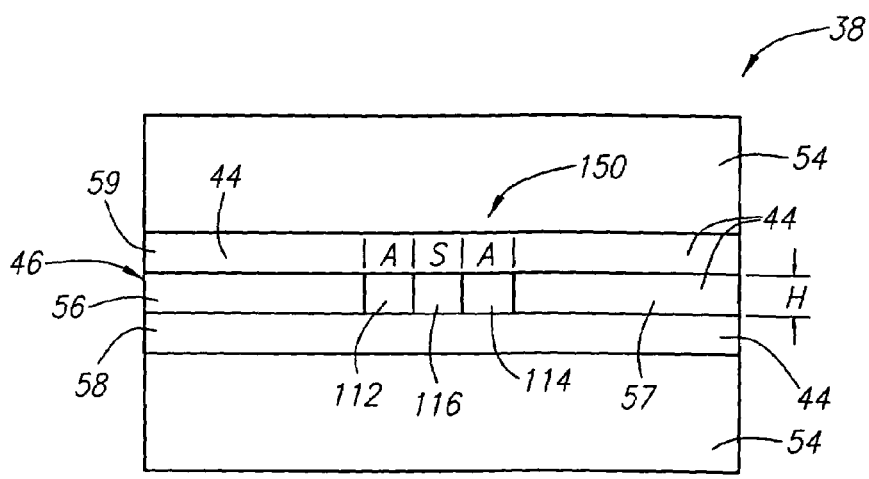
FIG. 27 is a cross-sectional view taken at line 27-27 of the asymmetric directional coupler shown in FIG. 26.
Figure 28:
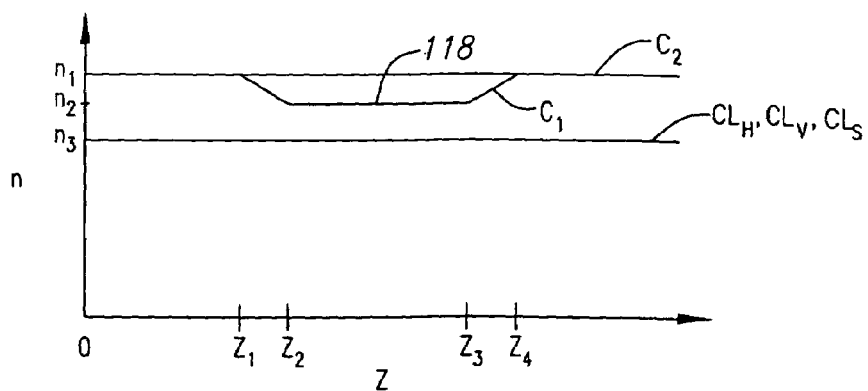
FIG. 28 is a graph illustrating refractive index profiles in the z-direction of various components of the directional coupler shown in FIG. 26.

FIGS. 26, 27, and 28 illustrate a design of an asymmetric optical coupler 150 according to one embodiment of the present invention. The asymmetric directional coupler 150 may be achieved using any of the waveguide structures according to the present invention. FIGS. 26 and 27 provide a top view and a cross-sectional view of the coupler 150, respectively. As illustrated, the directional coupler 150 is preferably provided in a waveguiding layer 46 of an integrated optical chip 38.

The directional coupler 150 comprises first and second cores 112, 114 and cladding material 44 that surrounds the cores 112, 114 and is interposed therebetween. Although cladding material 44 is shown as completely surrounding the first and second cores 112, 114 in the illustrated embodiment, the cladding material may only partially surround the first and second cores in other embodiments. For example, in certain implementations, the cladding material 44 may be omitted from the top of the first and second cores.

The core 112 preferably extends in close proximity in a direction parallel to the core 114 over some distance that is greater than the coupling region L provided in the coupler 150. The coupling region L is formed by tailoring the field confinement strength in one or both of the cores 112, 114 such that the evanescent field of the guided wave spreads out and then returns to a stronger confinement with respect to the cores 112, 114 over a limited region corresponding to the coupling length L. This may be accomplished in the asymmetric directional couplers of the present invention by constructing one or both of the cores 112, 114 so that they exhibit a gradient in light confinement over the coupling region L. The gradient in light confinement may be provided by, for example, modifying Δn in one or both of the cores 112, 114 over the coupling region L. To achieve an asymmetrical directional coupler according to the present invention, however, the first and second cores require different effective refractive indices in the coupling region L.

FIG. 28 graphically illustrates preferred refractive index profiles for the first and second cores 112, 114, the horizontally adjacent cladding 56, 57, the vertically adjacent cladding 58, 59, and the interposed cladding material 116. In FIG. 28, the refractive index profile of the first core 112 is labeled "$C_1$", the refractive index profile of the second core 114 is labeled "$C_2$", the refractive index profile of the horizontally adjacent cladding material 56, 57 is labeled "$CL_H$", the refractive index profile of the vertically adjacent cladding material 58, 59 is labeled "$CL_V$", and the refractive index profile of the interposed cladding 116 is labeled "$CL_S$".

As seen from FIG. 28, the cores 112, 114 have a higher refractive index than the surrounding cladding material 44 at all points along their axial extent. As a result, light will be internally reflected within the cores 112, 114 throughout their axial extent.

The refractive index profiles of the cores 112, 114 are not the same in the present embodiment. By making the refractive index profiles of the first and second cores 112, 114 different, an asymmetric coupler is achieved. In the present embodiment, the refractive index profile of the second core 114 is set at a constant first refractive index value, $n_1$. On the other hand, the refractive index profile of the first core 112 includes a gradient 118 that extends from a point $Z_1$ to a point $Z_4$ along the Z-axis of the cores, corresponding to the beginning and end of the of the coupling region L. Outside of the coupling region L, the first core 112 has a constant refractive index equal to the first refractive index value, $n_1$. In transition region 120 the refractive index profile of the first core 112 is transitioned from $n_1$ at point $Z_1$ to a second refractive index value $n_2$ at point $Z_2$. The refractive index profile of the first core 112 then remains constant until point $Z_3$ where the refractive index profile is transitioned back in transition regions 122 to a value of $n_1$ at point $Z_4$.

The refractive index profiles for the horizontally adjacent cladding material 56, 57, vertically adjacent cladding material 58, 59, and interposed cladding material 116 are all the same in the present embodiment. Further, as shown in FIG. 24, the refractive index profiles of these cladding materials 44 are set at a constant third refractive index value, $n_3$, along the axial extent of the cores 112, 114.

It will be appreciated by those skilled in the art, however, from the teachings herein that refractive index profiles other than the ones illustrated in FIG. 24 may be used to achieve an asymmetric directional coupler 150 according to the present invention.

In the present embodiment, the various refractive indices are set to have the following relationship: $n_1 > n_2 > n_3$. As a result, the first core 112 has reduced light confinement strength within the coupling region L, as it has a reduced Δn value with respect to the cladding material 44 in this region.

The values of $n_1$ and $n_3$ are selected to impart a desired strength of light confinement to the cores 112, 114 outside of the coupling region L. The greater the Δn the cores 112, 114 possess outside the coupling region L with respect to the various cladding materials 44, the more strongly they will confine light outside the coupling region in both the horizontally and vertically transverse directions. This in turn will permit the first and second cores 112, 114 to be more closely spaced without resulting in unacceptable levels of parasitic cross talk between them. Further, as discussed above, this will also impact the packing densities that may be achieved on optical chip 38. As a result, $n_1$ and $n_3$ are preferably selected so that the cores 112, 114 have a $\Delta n$ of at least 0.3% with respect to the cladding material 44 outside the coupling region. More preferably, $n_1$ and $n_3$ are selected so that the cores 112, 114 have a $\Delta n$ greater than or equal to 0.8% outside the coupling region L with respect to the cladding material 44.

The lateral and vertical dimensions of the cores 112, 114 are preferably selected so as to support only the fundamental mode of the light that is to be propagated through the cores. Thus, for example, if the values of $n_1$ and $n_3$ are selected so that the first and second cores have a $\Delta n$ of 0.8% with respect to the cladding material 44 outside the coupling region L, then the lateral dimension, A, and the vertical dimension, H, of the first and second cores would preferably set at approximately 5 μm.

Although the lateral dimension A of the cores 112, 114 is the same in the present embodiment, in other embodiments the lateral dimensions of the first and second cores 112, 114 may be different.

The value of $n_2$ is selected based on the desired coupling strength in coupling region L and the spacing S between the cores 112, 114. Preferably, sufficient spacing S is provided between the cores 112, 114 so that, based on their guiding strength, less than −10 dB/cm parasitic cross talk occurs between the cores 112, 114 outside the coupling region L. On the other hand, $n_2$ is preferably selected to minimize the length of the coupling region L necessary to achieve the desired power splitting function between the first and second cores 112, 114.

Because the cores 112, 114 of the coupler 110 may be provided with a high $\Delta n$ in the horizontally transverse direction, and preferably in both the horizontally and vertically transverse directions, small bending radii, and hence closer packing densities, can be achieved in the waveguiding layer 46 of optical chip 38.

The refractive index profiles in the transition regions 120, 122 may be continuously graded, as shown in FIG. 28, or they may be graded quasi-continuously with a series of small steps or periodic changes in the refractive index. In general, however, the longer the transition regions 120, 122 are and the more gradual the refractive index is graded in the transition regions, the lower the propagation losses will be in the transition regions.

Figure 29:
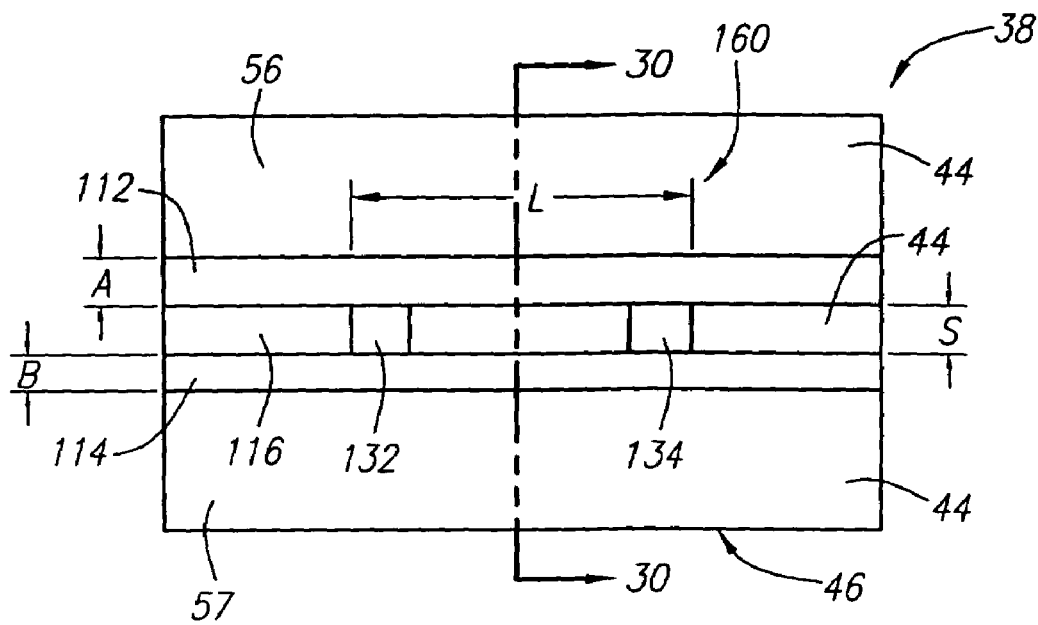
FIG. 29 is a diagrammatic top view of another embodiment of an asymmetric directional coupler formed from a waveguide structure according to the present invention.
Figure 30:
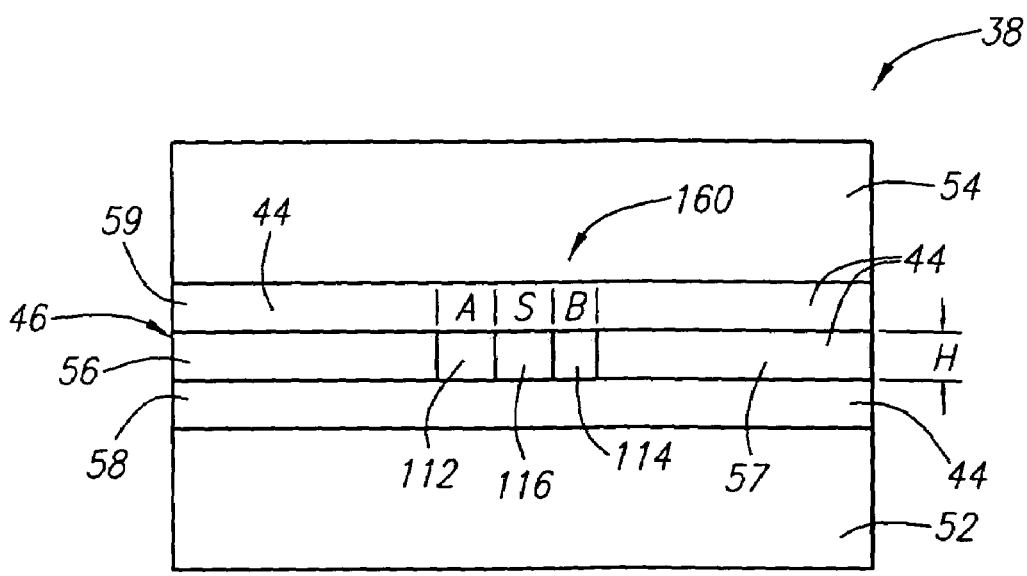
FIG. 30 is a cross-sectional view taken at line 30-30 of the asymmetric directional coupler shown in FIG. 29.

A second embodiment of an asymmetric directional coupler according to the present invention will now be described in connection with FIGS. 29, and 30. The only difference between the asymmetric coupler 160 shown in FIGS. 29 and 30 and the symmetric directional coupler described in connection with FIGS. 22, 23, and 24 is that the first and second cores 112 and 114 have differing widths A, B. Thus, although the first and second cores 112, 114 of the present embodiment have the symmetrical refractive index profiles shown in FIG. 24, the first and second cores 112, 114 have different effective refractive indexes in the coupling region L because they have differing widths A, B. As a result, an asymmetrical coupler is achieved.

Figure 31:
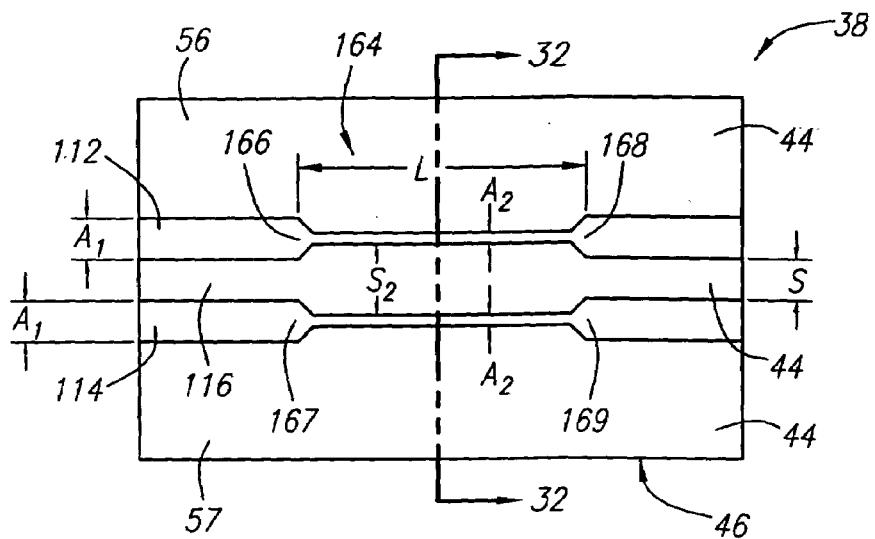
FIG. 31 is a diagrammatic top view of another embodiment of a directional coupler according to the present invention.
Figure 32:
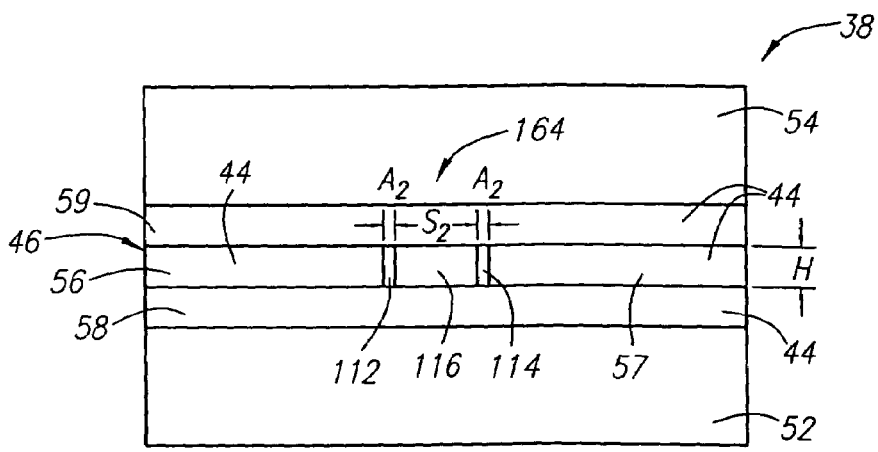
FIG. 32 is a cross-sectional view taken at line 32-32 of the directional coupler shown in FIG. 31.
Figure 33:
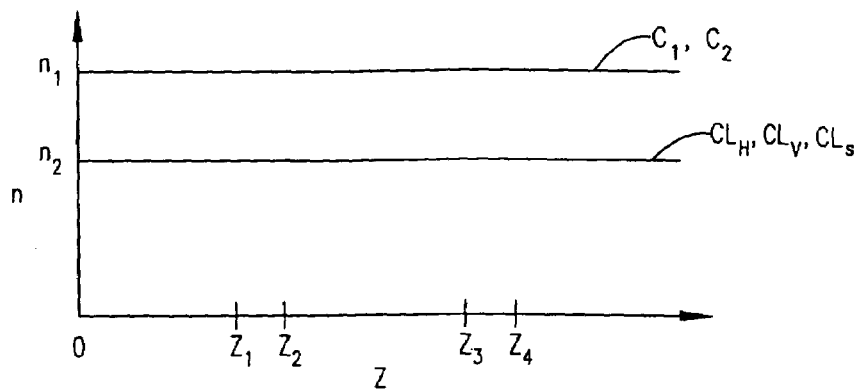
FIG. 33 is a graph illustrating refractive index profiles in the z-direction of various components of the directional coupler shown in FIG. 31.

FIGS. 31, 32, and 33 illustrate another embodiment of a directional coupler 164 according to the present invention. In the previously described embodiments of directional couplers, a gradient in light confinement was provided in the coupling region L by modifying the $\Delta n$ of one or both guides by varying the refractive index of the first core 112, the second core 114, and/or the interposed cladding material 116 in the coupling region L. In the directional coupler 164 of the present embodiment, the lateral dimension of the cores 112, 114 are modified in the longitudinal direction within the coupling region L to achieve the desired reduction and than increase in light confinement strength.

FIGS. 31 and 32 provide a top view and a cross-sectional view of the coupler 164, respectively. As illustrated, the directional coupler 164 is preferably provided in a waveguiding layer 46 of an integrated optical chip 38.

The directional coupler 164 comprises first and second cores 112, 114 and cladding material 44 that surrounds the cores 112, 114 and is interposed therebetween. Although cladding material 44 is shown as completely surrounding the first and second cores 112, 114 in the illustrated embodiment, the cladding material may only partially surround the first and second cores in other embodiments. For example, in certain implementations, the cladding material 44 may be omitted from the top of the first and second cores.

The first core 112 preferably extends in close proximity in a direction parallel to the second core 114 over some distance that is greater than the coupling region L provided in the coupler 164. The coupling region L is formed by tailoring the field confinement strength in one or both of the cores 112, 114 such that the evanescent field of the guided wave spreads out and then contracts with respect to the cores 112, 114 over a limited region corresponding to the coupling length L. This is accomplished in the directional coupler 164 of the present embodiment by varying the lateral dimensions of the first and/or second cores within the coupling region L, which in turn results in a gradient in the light confinement strength of the cores over the coupling region L.

FIG. 33 graphically illustrates preferred refractive index profiles for the first and second cores 112, 114, the horizontally adjacent cladding 56, 57, the vertically adjacent cladding 58, 59, and the interposed cladding material 116. In FIG. 33, the refractive index profile of the first core 112 is labeled "$C_1$", the refractive index profile of the second core 114 is labeled "$C_2$", the refractive index profile of the horizontally adjacent cladding material 56, 57 is labeled "$CL_H$", the refractive index profile of the vertically adjacent cladding material 58, 59 is labeled "$CL_V$", and the refractive index profile of the interposed cladding material 116 is labeled "$CL_S$".

As seen from FIG. 33, the refractive index profiles of the cores 112, 114 are the same in the present embodiment. Further, the refractive index profiles of the first and second cores 112, 114 are set at a constant first refractive index, $n_1$, along their axial extent. Thus, the refractive index of the cores does not vary in over the coupling region L in the present embodiment.

The refractive index profiles for the horizontally adjacent cladding material 56, 57, vertically adjacent cladding material 58, 59, and interposed cladding material 116 are also all the same in the present embodiment. Further, as shown in FIG. 33, the refractive index profiles of these cladding materials 44 are set at a constant second refractive index value, $n_2$, along the axial extent of the cores 112, 114.

As illustrated by the various embodiments of directional couplers described herein, however, other refractive index profiles may be employed in the coupler 164 of the present embodiment than those illustrated in FIG. 33. Further, in certain implementations it may be desirable for the first and second cores 112, 114 to have different refractive index profiles from one another. Similarly, it may also be desirable for one or more of the cladding materials 56, 57, 58, 59, and 116 to have a different refractive index profile than the other cladding materials.

In the present embodiment, the first and second cores 112, 114 are provided with a gradient in their lateral width A from a point $Z_1$ to a point $Z_4$ along the Z-axis of the cores. Points $Z_1$ and $z_4$ correspond to the beginning and end of the coupling region L, respectively. However, light may also be propagated through the coupler 164 in the opposite direction, in which case $Z_4$ would correspond to the beginning of coupling region L and $Z_1$ would correspond to the end of coupling region L.

Outside of the coupling region L, the first and second cores 112 and 114 have a constant width, $A_1$. In tapers 166, 167 the lateral width of the first and second cores 112, 114 are transitioned from $A_1$ at point $Z_1$ to a second width $A_2$ at point $Z_2$. The width of the cores 112, 114 then remains constant until point $Z_3$ where the width of the cores is transitioned back in tapers 168, 169 to a width of $A_1$ at point $Z_4$.

In the present embodiment, the various refractive indices are set to have the following relationship: $n_1 > n_2$. However, due to the reduction in core width in the coupling region L, the cores 112, 114 have reduced propagation constants and thus reduced light confinement strength in the coupling region L. Furthermore, the reduction in core width will cause the evanescent field of light propagating through the cores 112, 114 to be expanded with respect to the cores in the coupling region L.

The values of $n_1$ and $n_2$ are selected to impart a desired strength of light confinement to the cores 112, 114 outside of the coupling region L. The greater the $\Delta n$ the cores 112, 114 possess outside the coupling region L with respect to the various cladding materials 44, the more strongly they will confine light outside the coupling region in both the horizontal and vertical transverse directions. This in turn will permit the first and second cores 112, 114 to be more closely spaced without resulting in unacceptable levels of parasitic cross talk between them. Further, as discussed above, this will also impact the packing densities that may be achieved on optical chip 38. As a result, $n_1$ and $n_2$ are preferably selected so that the cores 112, 114 have a $\Delta n$ of at least 0.3% with respect to the cladding material 44 outside the coupling region. More preferably, $n_1$ and $n_3$ are selected so that the cores 112, 114 have a $\Delta n$ greater than or equal to 0.8% outside the coupling region L with respect to the cladding material 44.

The lateral and vertical dimensions of the cores 112, 114 outside the coupling region are preferably selected so as to support only the fundamental mode of the light that is to be propagated through the cores. Thus, for example, if the values of $n_1$ and $n_3$ are selected so that the first and second cores have a $\Delta n$ of 0.8% with respect to the cladding material 44 outside the coupling region L, then the lateral dimension, $A_1$, and the vertical dimension, H, of the first and second cores would preferably set at approximately 5 µm. Preferably, sufficient spacing $S_1$ is provided between the first and second cores 112, 114 so that, based on their guiding strength, less than −10 dB/cm parasitic cross talk occurs between the cores 112, 114 outside the coupling region L.

Although the lateral dimension $A_1$ of the cores 112, 114 is the same in the present embodiment, in other embodiments the lateral dimensions $A_1$ of the first and second cores 112, 114 may be different.

In the present embodiment, the lateral dimension of the narrowest point of tapers 166, 167, 168, 169 (i.e. $A_2$) is set based on the mode-field characteristics desired in the coupling region L in the horizontally transverse direction to the cores 112, 114. In other words, the width $A_2$ of the first and second cores 112, 114 is selected based on the desired coupling strength in coupling region L and the spacing $S_2$ between the cores 112, 114 in the coupling region L. $A_2$ is preferably selected to minimize the length of the coupling region L necessary to achieve the desired power splitting function between the first and second cores 112, 114.

Because the cores 112, 114 of the coupler 164 may be provided with a high $\Delta n$ in the horizontally transverse direction, and preferably in both the horizontally and vertically transverse directions, small bending radii, and hence closer packing densities, can be achieved in the waveguiding layer 46 of optical chip 38.

The tapers 166, 167, 168, 169 may be continuously graded, as shown in FIG. 31, or they may be graded quasi-continuously with a series of small steps or periodic changes in the lateral dimension. In general, however, the longer the tapers 166, 167, 168, 169 are and the more gradual their taper angle, the lower the propagation losses will be in the tapers.

Figure 34:
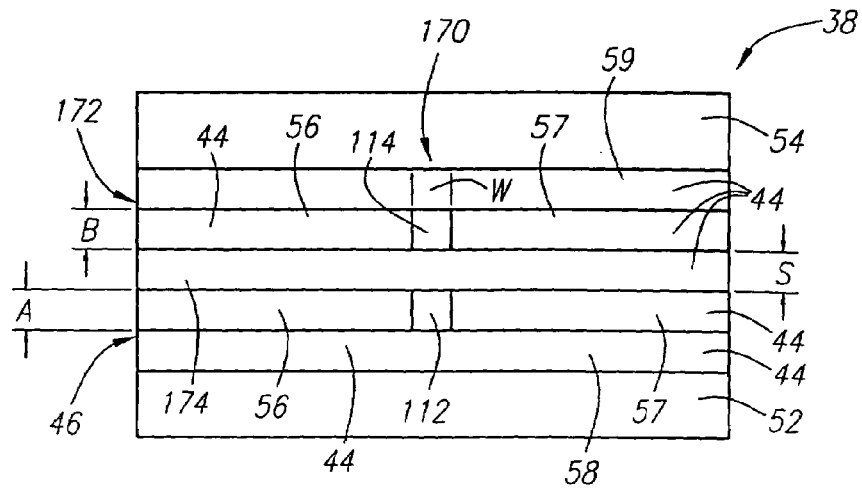
FIG. 34 is a cross-sectional view taken through a three dimensional directional coupler according to the present invention.
Figure 35:
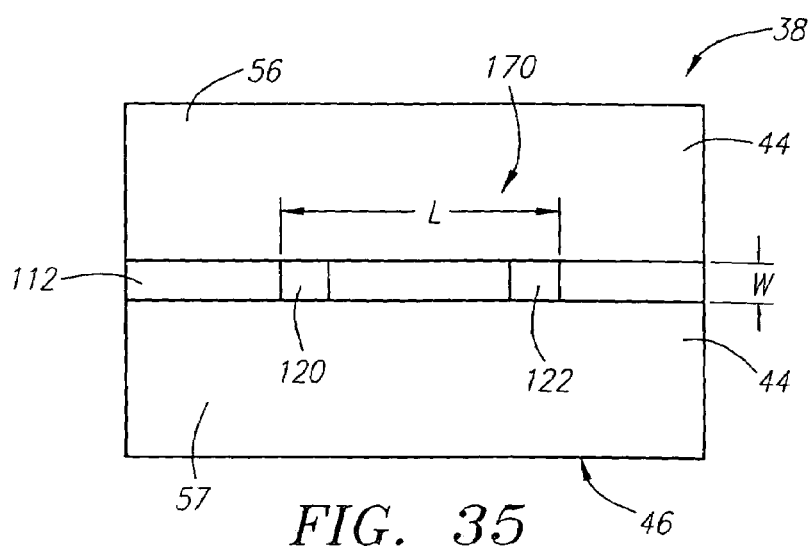
FIG. 35 is a diagrammatic top view of a first waveguiding plane of the three-dimensional directional coupler shown in FIG. 34.
Figure 36:
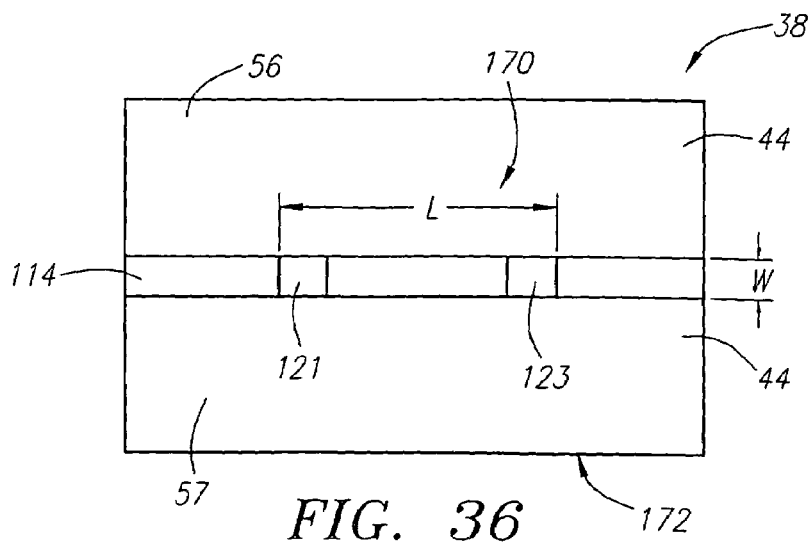
FIG. 36 is a diagrammatic top view of a second waveguiding plane of the three-dimensional directional coupler shown in FIG. 34.

FIGS. 34, 35, and 36 illustrate a design of a three-dimensional optical coupler 170 according to one embodiment of the present invention. The directional coupler 170 is formed as part of an optical chip 38 and may be achieved using any of the waveguide structures according to the present invention. FIG. 35 shows the top view of a first waveguiding layer 46 included in the coupler 170. The first waveguiding layer includes a first core 112. FIG. 36 shows a top view of a second waveguiding layer 172 included in the directional coupler 170. In the present embodiment, the second waveguiding layer 172 is the same as the first waveguiding layer 46 except that it includes a second core 114 in place of the first core 112. The directional coupler 160 permits coupling between the first core 112 provided in the waveguiding layer 46 and the second core 114 provided in the second waveguiding layer 172.

The directional coupler 170 comprises the first and second cores 112, 114 and cladding material 44 that surrounds the cores 112, 114 and is interposed therebetween. Although cladding material 44 is shown as completely surrounding the first and second cores 112, 114 in the illustrated embodiment, the cladding material may only partially surround the first and second cores in other embodiments. For example, in certain implementations, the vertically adjacent cladding material 59 may be omitted.

The second core 114, which is included in the second waveguiding layer 172, is disposed above the first core 112, which is included in the first waveguiding layer 46. The second core 114 is located in close proximity to the first core 112 and preferably extends in a direction parallel to the first core 112 over some distance that is greater than the coupling region L provided in the coupler 170. As with the planar directional couplers described above, the coupling region L is formed by tailoring the field confinement strength in one or both of the cores 112, 114 such that the evanescent field of the guided wave spreads out and then contracts with respect to the cores 112, 114 over a limited region corresponding to the coupling length L. This may be accomplished in the three dimensional directional couplers of the present invention by constructing one or both of the cores 112, 114 so that they exhibit a gradient in light confinement over the coupling region L. The gradient in light confinement may be provided by, for example, modifying $\Delta n$ in one or both of the cores 112, 114 over the coupling region L.

The preferred refractive index profiles for the first and second cores 112, 114, the horizontally adjacent cladding 56, 57, the vertically adjacent cladding 58, 59, and the interposed cladding layer 174 of coupler 170 are the same as the refractive index profiles graphically illustrated in FIG. 21. In FIG. 21, the refractive index profile of the first core 112 is labeled "$C_1$", the refractive index profile of the second core 114 is labeled "$C_2$", the refractive index profile of the horizontally adjacent cladding material 56, 57 is labeled "$CL_H$", the refractive index profile of the vertically adjacent cladding material 58, 59 is labeled "$CL_V$", and the refractive index profile of the interposed cladding layer 174 is labeled "$CL_S$".

As seen from FIG. 21, the cores 112, 114 have a higher refractive index than the surrounding cladding material 44 at all points along their axial extent. As a result, light will be internally reflected within the cores 112, 114 throughout their axial extent.

The refractive index profiles of the cores 112, 114 include a gradient 118 that extends from a point $Z_1$ to a point $Z_4$ along the Z-axis of the cores. Points $Z_1$ and $Z_4$ correspond to the beginning and end of the coupling region L, respectively. However, light may also be propagated through the coupler 170 in the opposite direction, in which case $Z_4$ would correspond to the beginning of coupling region L and $Z_1$ would correspond to the end of coupling region L.

As shown in FIG. 21, the refractive index profiles of the first and second cores 112, 114 are the same in the present embodiment. Outside of the coupling region L, the cores 112 and 114 have a constant refractive index equal to a first refractive index value, $n_1$. In transition regions 120, 121 the refractive index profiles of the first and second cores 112, 114 are transitioned from $n_1$ at point $Z_1$ to a second refractive index value $n_2$ at point $Z_2$. The refractive index profiles of the cores 112, 114 then remain constant until point $Z_3$ where the refractive index profiles are transitioned back in transition regions 122, 123 to a value of $n_1$ at point $Z_4$.

The refractive index profiles for the horizontally adjacent cladding material 56, 57, vertically adjacent cladding material 58, 59, and interposed cladding layer 174 are also all the same in the present embodiment. Further, as shown in FIG. 21, the refractive index profiles of these cladding materials 44 are set at a constant third refractive index value, $n_3$, along the axial extent of the cores 112, 114.

As illustrated by the various embodiments of planar directional couplers described herein, other refractive index profiles may be employed in the three dimensional couplers of the present invention than those illustrated in FIG. 21. For example, rather than including a gradient in the refractive index profiles of the first and second cores 112, 114, a gradient may be provided in the interposed cladding layer as shown in FIG. 24. Further, if an asymmetric coupler is desired, it may be desirable for the first and second cores 112, 114 to have different refractive index profiles from one another as shown in FIG. 28. Other variations for achieving three-dimensional symmetrical and asymmetrical directional couplers will also become apparent to those skilled in the art from the teachings herein.

In the present embodiment, the various refractive indices are set to have the following relationship: $n_1 > n_2 > n_3$. As a result, the cores 112, 114 have reduced light confinement strength within the coupling region L, as both the cores have reduced Δn values with respect to the cladding material 44 in this region.

The values of $n_1$ and $n_3$ are selected to impart a desired strength of light confinement to the cores 112, 114 outside of the coupling region L. The greater the Δn the cores 112, 114 possess outside the coupling region L with respect to the various cladding materials 44, the more strongly they will confine light outside the coupling region in both the horizontal and vertical transverse directions. This in turn will permit the first and second cores 112, 114 to be more closely spaced without resulting in unacceptable levels of parasitic cross talk between them. Further, as discussed above, this will also impact the packing densities that may be achieved on optical chip 38. As a result, $n_1$ and $n_3$ are preferably selected so that the cores 112, 114 have a Δn of at least 0.3% with respect to the cladding material 44 outside the coupling region. More preferably, $n_1$ and $n_3$ are selected so that the cores 112, 114 have a Δn greater than or equal to 0.8% outside the coupling region L with respect to the cladding material 44.

The lateral and vertical dimensions of the cores 112, 114 are preferably selected so as to support only the fundamental mode of the light that is to be propagated through the cores. Thus, for example, if the values of $n_1$ and $n_3$ are selected so that the first and second cores have a Δn of 0.8% with respect to the cladding material 44 outside the coupling region L, then the lateral dimension, W, and the vertical dimensions A, B of the first and second cores would preferably be set at approximately 5 μm.

Although the vertical dimensions A, B of the cores 112, 114 are illustrated as being the same in the present embodiment, in other embodiments the vertical dimensions of the first and second cores 112, 114 may be different in order to achieve an asymmetric coupler.

The value of $n_2$ is selected based on the desired coupling strength in coupling region L and the spacing S between the cores 112, 114. Preferably, sufficient spacing S is provided between the cores 112, 114 so that, based on their guiding strength, less than −10 dB/cm parasitic cross talk occurs between the cores 112, 114 outside the coupling region L. On the other hand, $n_2$ is preferably selected to minimize the length of the coupling region L necessary to achieve the desired power splitting function between the first and second cores 112, 114.

Because the cores 112, 114 of the coupler 170 may be provided with a high Δn in the horizontally transverse, and preferably in both the horizontally and vertically transverse directions, small bending radii, and hence closer packing densities, can be achieved in both the first and second waveguiding layers 46, 172 of optical chip 38.

The refractive index profiles in the transition regions 120, 121, 122, 123 may be continuously graded, as shown in FIG. 21, or they may be graded quasi-continuously with a series of small steps or periodic changes in the refractive index. In general, however, the longer the transition regions 120, 121, 122, 123 are and the more gradual the refractive index is graded in the transition regions, the lower the propagation losses will be in the transition regions.

Figure 37:
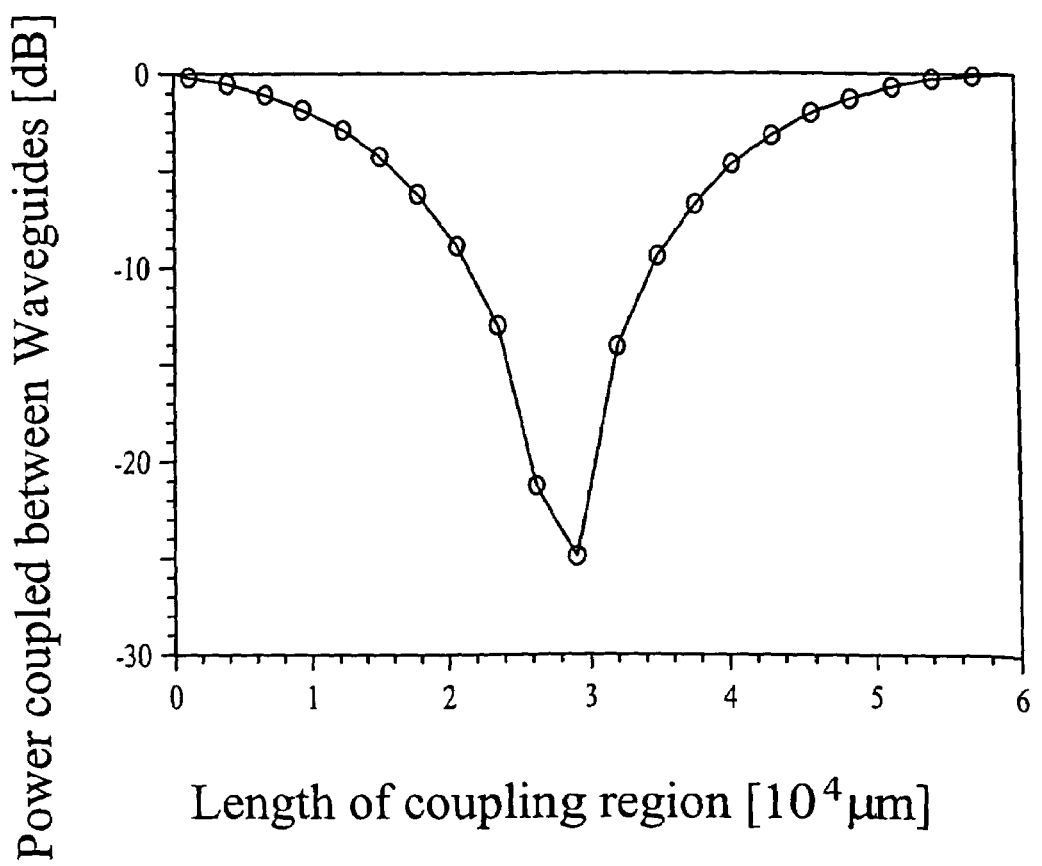
FIG. 37 is a graph illustrating the calculated variation of power coupled between two waveguides as a function of the length of the coupling region in the embodiment shown in FIG. 19.

A simulation employing the Beam Propagation Method (BPM) was employed to demonstrate the feasibility of the coupler shown in FIGS. 19-21. By means of example, the following parameters were chosen: Core width A=8 μm, core separation S=23 μm, cladding index $n_3$=1.410, core base index $n_1$=1.416, core index in coupling region $n_2$=1.412. The simulation showed that a coupling length L=12.4 mm would result in coupling −3 dB of light between core 112 and core 114. Increasing the length to the value L=27.9 mm would lead to the complete exchange of the power from one core to the other. FIG. 37 graphically illustrates the results of the simulation and shows the calculated power decrease in the input core as light is coupled to the other core as a function of coupling length L. Outside of the coupling region, the simulation showed that coupling between the cores would be less than −30 dB/cm. The simulation also showed that a length of 15 mm for the transition regions 120, 122, 116 and 123 would lead to less than 0.03 dB power loss in each of the regions. While various other values can be chosen for a particular embodiment of this invention, the example shows that realization of a coupler from a pair of waveguides, at least one of which has reduced light confinement in the coupling region, is feasible within commonly achievable index ranges and waveguide dimensions.

Figure 38:
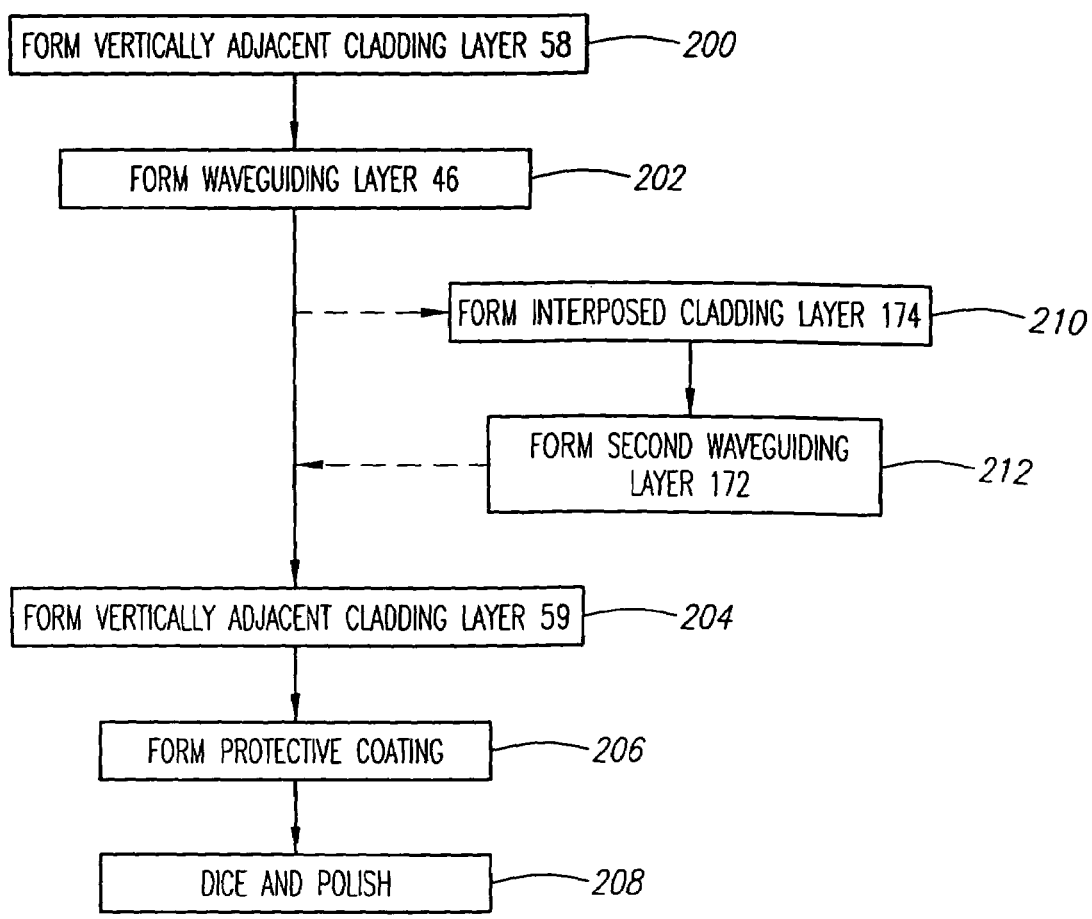
FIG. 38 illustrates a preferred embodiment of a process for forming the waveguide structures and directional couplers according to the present invention.

FIG. 38 is a schematic diagram illustrating a preferred process for fabricating the waveguide structures and directional couplers according to the present invention.

First, in step 200, the vertically adjacent cladding layer 58 is formed on substrate 52. In step 202 the waveguiding layer 46 is formed on the vertically adjacent cladding layer 58. Next, in step 204, the vertically adjacent cladding layer 59 is formed on the waveguiding layer 46. In step 206, the protective coating is optionally formed on vertically adjacent cladding layer 59. If multiple integrated optical chips 38 are formed on a single substrate 52, then in step 208, the wafer may be diced and polished using standard techniques known in the integrated optics art to form individual integrated optical chips 38.

If the waveguide structure or directional coupler includes multiple waveguiding layers, then the process may also include steps 210, 212. In step 210, the interposed cladding layer 174 is formed on the first waveguiding layer 46, and in step 212 the second waveguiding layer 172 is formed on the interposed cladding layer 174. If more than two waveguiding layers are desired, then steps 210, 212 may be repeated as many times as necessary to produce the desired number of waveguiding layers. When multiple waveguiding layers are formed on substrate 52, the vertically adjacent cladding layer 59 is formed on the last waveguiding layer.

In those embodiments where the vertically adjacent cladding layers 58, 59 have a constant refractive index profile, then any of the standard planar techniques known in the art for forming a cladding layer may be used in steps 200 and 204 to form vertically adjacent cladding layers 58, 59, respectively. The same is true for the interposed cladding layer 174 in the waveguide structures and directional couplers having multiple waveguiding layers. Namely, if the interposed cladding layer 174 has a constant refractive index profile in the direction of light propagation then any of the standard planar techniques known in the art may be used in step 210 to form the interposed cladding layer 174. Similarly, in those instances where neither the core(s) nor the cladding material 44 included in the waveguiding layer include a gradient in the direction of light propagation, standard planar technique may be used in step 202 to form the waveguiding layer. Although any of the standard planar techniques may be used under the foregoing circumstances, sol-gel based processes are preferred due to their ease and flexibility in terms of tailoring the refractive index of the deposited layer with the addition of appropriate precursors.

When a gradient is required in the refractive index profile of a core or cladding material contained in one of the layers to achieve a waveguide structure or directional coupler according to the present invention, modified planar fabrication techniques are required to form the layer. For example, gradients may be produced in the refractive index profiles of the horizontally adjacent cladding material, vertically adjacent cladding material, core or cores, and interposed cladding material or layer through the use of standard planar deposition techniques followed by laser or e-beam densification, or by selective material deposition, such as the chemical vapor deposition method used in the fabrication of commercially available low loss gradient index fibers. Preferably, however, a photosensitive sol-gel based process is employed. In this manner, the various layers of the waveguide structures and directional couplers of the present invention that have a gradient structure may be formed by exposing a layer of the photosensitive sol-gel to appropriately patterned light to yield the desired refractive index pattern for the layer. The exposed film may then be developed to fix the written index pattern into the resulting sol-gel derived glass layer.

Two photosensitive sol-gel formulations that may be used in forming the various layers of the waveguide structures and couplers of the present invention are described in S. Iraj Najafi, et. al., *Sol-gel Glass Waveguide and Grating on Silicon*, Journal of Lightwave Tech., Vol. 16, No. 9, pp. 1640-1646 (September 1998), which is hereby incorporated by reference. In particular, the photosensitive sol-gel processes described in Section II of the Najafi article may be used to form the various layers of the waveguide structures and optical couplers of the present invention. The refractive index of the photosensitive sol-gel formulations described in Section II of the Najafi article increases with increasing UV exposure. The maximum possible change in refractive index is reported as being 0.006. This translates into a maximum possible $\Delta n$ of approximately 0.38% for the resulting sol-gel derived glass layer. Thus, the refractive index profiles required in the various layers of the waveguide structures and directional couplers of the present invention may be directly written into a film of the photosensitive sol-gel by varying the amount of UV-light exposure in the area of the gradient. This may be accomplished, for example, through the use of a gray-scale mask to write the desired gradient structure into a layer of the photosensitive sol-gel, or by laser writing the desired gradient structure into a layer of the photosensitive sol-gel film. Further, the photosensitive sol-gel formulations described in section II of the Najafi article will also permit the direct writing of the refractive index pattern of the core(s) and cladding material contained in a waveguiding layer in a single layer of the photosensitive sol-gel. Accordingly, the entire refractive index pattern of any layer of the waveguide structures and directional couplers of the present invention may be written into a single layer of the photosensitive sol-gel without resorting to multistep deposition, masking, and etch back procedures. The primary disadvantage of the photosensitive sol-gel formulations described in the Najafi article is that they only provide for a maximum $\Delta n$ of 0.38%. As a result, they are only suitable for forming moderately guiding waveguides.

Figure 39:
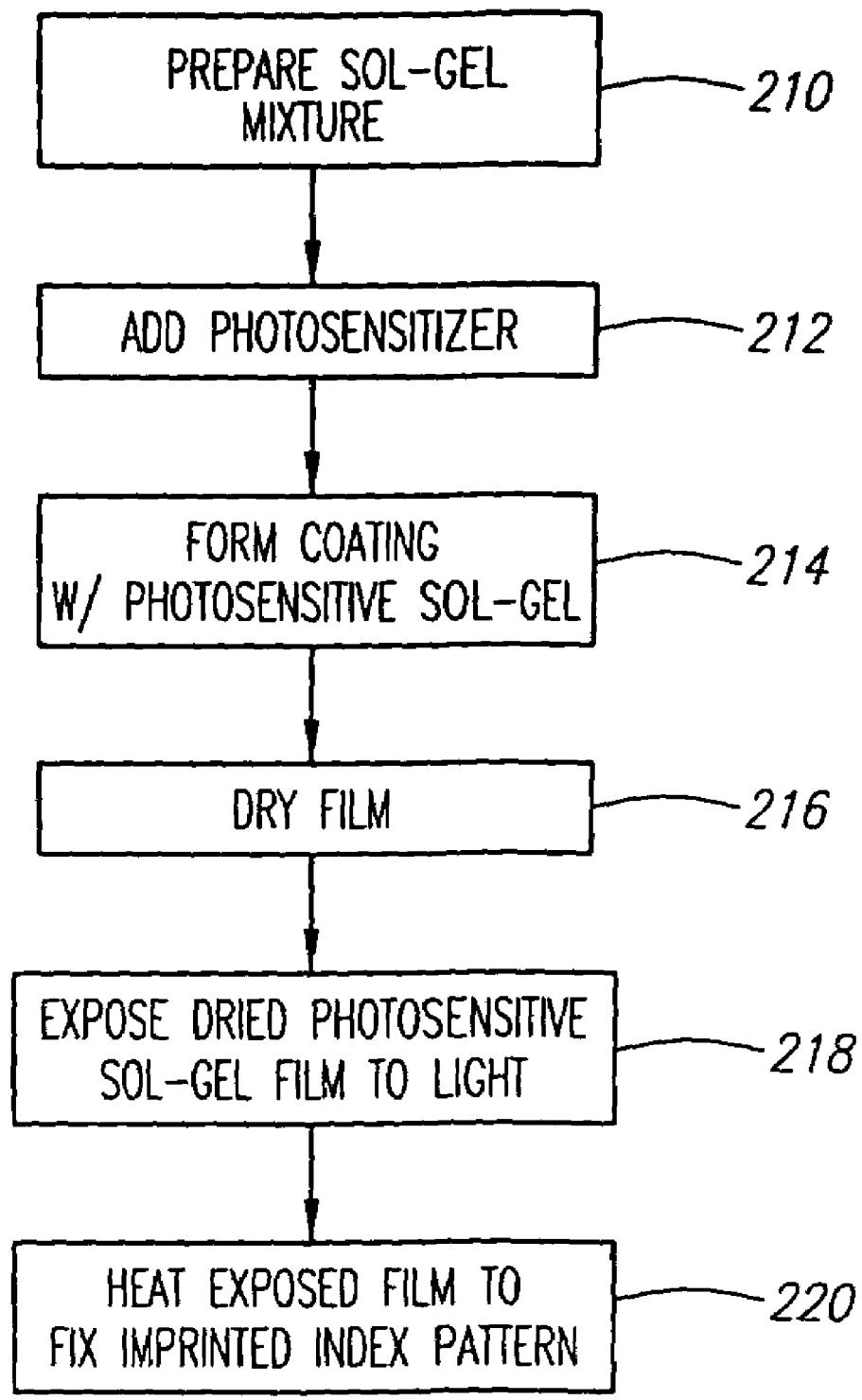
FIG. 39 illustrates a preferred process for forming the various layers that make up the waveguide structures and directional couplers according to the present invention using a preferred photosensitive sol-gel material.

FIG. 39 shows a preferred method for fabricating the various layers of the waveguide structures and directional couplers of the present invention.

In step 210, a sol-gel mixture that is to be employed in forming a particular layer is prepared. This is typically accomplished by preparing a solution of a metal alkoxide, water, and a mutual solvent, such as ethanol, then causing or permitting the solution to undergo a sol-to-gel transition to form a gel through hydrolysis followed by polymerization through condensation. An inorganic acid or base may also be added to the sol-gel mixture to help catalyze the hydrolysis and polymerization reactions. Common examples of the process for producing silica glass include mixing tetraethylorthosilicate (TEOS) or tetramethylorthosilicate (TMOS), water, and ethanol with a trace amount of an acid catalyst such as HCl acid. Other examples include the use of aluminum t-butoxide (Al(OBu)$_3$) for alumina sol-gels and tetraorthoethyltitanate (TET) or tetrapropylorthotitatanate (TPOT) for titania sol-gels.

In general, the particular sol-gel composition prepared in step 210 will depend on the optical properties desired for the unexposed portions of the resulting layer, whether it be a vertically adjacent cladding layer 58 or 59, a waveguiding layer 46 or 172, or an interposed cladding layer 164. For example, if light-exposure of the photosensitizer increases the refractive index of the sol-gel material, then the sol-gel composition selected for the waveguiding layer will typically be one that yields the lowest refractive index value desired for the cladding material in the waveguiding layer. Although not required, in many cases it will be desirable to use the same basic sol-gel composition in the fabrication of each of the layers of the waveguide structures and directional couplers of the present invention. This may be desirable, for example, where the lowest refractive index value of the cladding material in each of the layers is the same for the particular waveguide structure or directional coupler being formed. This will also tend to make the modal field of the light propagating through the core or cores to be as symmetric as possible in such situations following the writing and fixing of the refractive index patterns in each of the layers.

Thus, depending on the desired optical properties of the unexposed portions of the layer being formed, multicomponent reagents can be mixed into the sol to produce glasses with higher or lower indexes of refraction. For example, the refractive index of a sol-gel derived silica glass may be increased by introducing $TiO_2$, derived from the addition of a TET or TPOT precursor, as a dopant, to the original silica based sol-gel mixture.

As those skilled in the art will appreciate, a wide variety of glass modifiers may be used to vary the index of refraction of the base sol-gel derived glass. In general, dopants that contain an element that has a larger diameter than the primary metal atoms of the sol-gel derived oxide glass matrix will increase the refractive index of the glass matrix, while those having a smaller diameter will decrease the refractive index of the glass matrix. Thus, for example, a sol-gel derived silica glass matrix doped with $Al_2O_3$, $As_2O_3$, $GeO_2$, $P_2O_5$, $TiO_2$ and $ZrO_2$ will increase the index of refraction of the glass matrix. On the other hand, a sol-gel derived silica glass matrix doped with $B_2O_3$ will decrease the index of refraction of the glass matrix. As one skilled in the art will appreciate the range over which a particular index of refraction of a sol-gel derived glass may be adjusted varies considerably over a wide range as a function of the concentration of the particular dopant/sol-gel system employed.

The foregoing glass modifiers may be readily introduced into the glass matrix by adding precursors, such as metal alkoxides, corresponding to the desired dopant to the sol mixture in a molar concentration necessary to yield the desired index of refraction change. Other methods known in the art for doping a glass matrix with a glass modifier may also be employed.

The molar concentrations of the reagents used to make the base sol-gel mixture in step 210 and the mixing times of the sol-gel mixture should be selected so as to provide a sol-gel solution having a viscosity suitable for the coating process employed in step 214. Typically a viscosity of approximately 10 to 50 centipoise is suitable for most film coating techniques. More preferably, however, the viscosity of the sol-gel mixture is set in the range of 10 to 30 centipoise to ensure a uniform coating is achieved.

During the preparation step 210, the sol-gel solution is preferably stirred in an air or oxygen atmosphere at room temperature until the solution reaches the desired viscosity. Although the sol-gel solution may be stirred in an inert atmosphere, oxygen increases the rate of the sol-gel reaction. If the polymerization reaction proceeds too quickly, the reaction may be slowed by adding a solvent such as ethanol or lowering the temperature to decrease the rate of evaporation of the alcohol formed from the hydrolysis reaction. Any steps taken that remove the solvent from the sol-gel, for example, spinning, desiccating or heating, will tend to accelerate the polymerization process resulting in a rapid gelation of the sol-gel mixture.

After the initial sol-gel mixture is prepared in step 210, in step 212 a photosensitive sol-gel glass material is prepared by adding a photosensitizer to the sol-gel mixture from step 210. The added photosensitizer includes a photo labile moiety and an inorganic glass-modifying constituent that photolyze upon exposure to light energy. The photosensitizer is used to induce a refractive index variation in the glass matrix of the layer being formed. This in turn allows the writing of the refractive index pattern of any of the layers making up the waveguide structures and directional couplers of the present invention, including those with continuous refractive index gradients, using conventional photolithographic or other light exposure methods.

The inorganic constituent of the photosensitizer is transformed into an oxide that acts as a glass modifier, which produces the change in the refractive index, when first exposed to light and then subjected to a heat treatment. Preferred photosensitizer compounds possess the following characteristics: 1) the photosensitizer is photochemically active when exposed to light, preferably when exposed to light in the UV or visible spectrum; 2) the inorganic constituent of the photosensitizer irreversibly binds to the sol-gel glass matrix when exposed to light; 3) the photosensitizer exhibits thermal stability, at least at the temperature range used to remove unphotolyzed photosensitizer from the sol-gel material; and 4) the photosensitizer compound is volatile, preferably highly volatile.

Photo-activity of the photosensitizer allows the formation of reactive radicals of the inorganic constituent during light exposure. The highly reactive radicals then irreversibly bind to the glass matrix. Thermal stability and volatility are desirable, because a key step in the process is the ability to remove, by evaporation, the unexposed photosensitizer using a heat treatment step.

The amount the index of refraction can be changed from the base index of the sol-gel glass material prepared in step 210 depends not only on the particular photosensitizer added in step 212, but also on the molar concentration of the photosensitizer added to the sol-gel mixture and the amount of light energy delivered during the exposure step discussed below. Typically, the concentration of the photosensitizer will range between approximately 2% and approximately 30% by volume of the sol-gel mixture prepared in step 210, and more preferably between approximately 2 and 10%. By employing a photosensitizer concentration within these ranges, it is possible to photoinduce changes in the refractive index of the base sol-gel mixture between approximately 0.001 and 0.012 or higher. In terms of percent difference, it is possible to photoinduce $\Delta n$ values from 0.07% to 0.9% or higher.

Once the photosensitizer is added to the sol-gel mixture, the sol-gel mixture is preferably stirred until a homogeneous photosensitive sol-gel mixture is achieved. Stir times of approximately 10 minutes have been found suitable for this purpose. The photosensitizer is preferably added after preparation of the base sol-gel mixture in step 210 to minimize the exposure of the photosensitizer to light, to prevent any predissociation of the photosensitizer due to the acid or intermediate radicals formed during the sol-gel reaction, and to economize the use of an expensive photosensitizer. However, steps 210 and 212 may be combined into a single step.

The photosensitizer added in step 212 is preferably an organometallic photosensitizer. Preferred organometallic photosensitizers have the general structure R-M-X, where R is either a branched, unbranched or cyclo-alkyl group of less than 20 carbons, X is a photo-labile moiety and represents a halogen atom, such as chlorine, bromine, iodine, and fluorine, but also includes carbonyls (CO), and M is a metal or semi-metal. The M constituent is preferably a metal selected from the Group IVA, VA, VIA, VIIA, VIIIA, IIB, IIIB, IVB, and VIB metals and the rare earth metals. More preferably M is selected from the group consisting of Ge, Sn, Pb, Se, Te, Fe, Co, Ni, Ti, Zn, Nd, Er, Eu, Pr, and Th. Especially preferred photosensitizers include trimethyl-tin-iodide, cyclopentadienyl titanium dichloride and iron pentacarbonyl. The M constituent may also be a semi-metal selected from the Group IIIB, IVB, VB, and VIB elements, including, for example, B, Si, and P.

Figure 40:
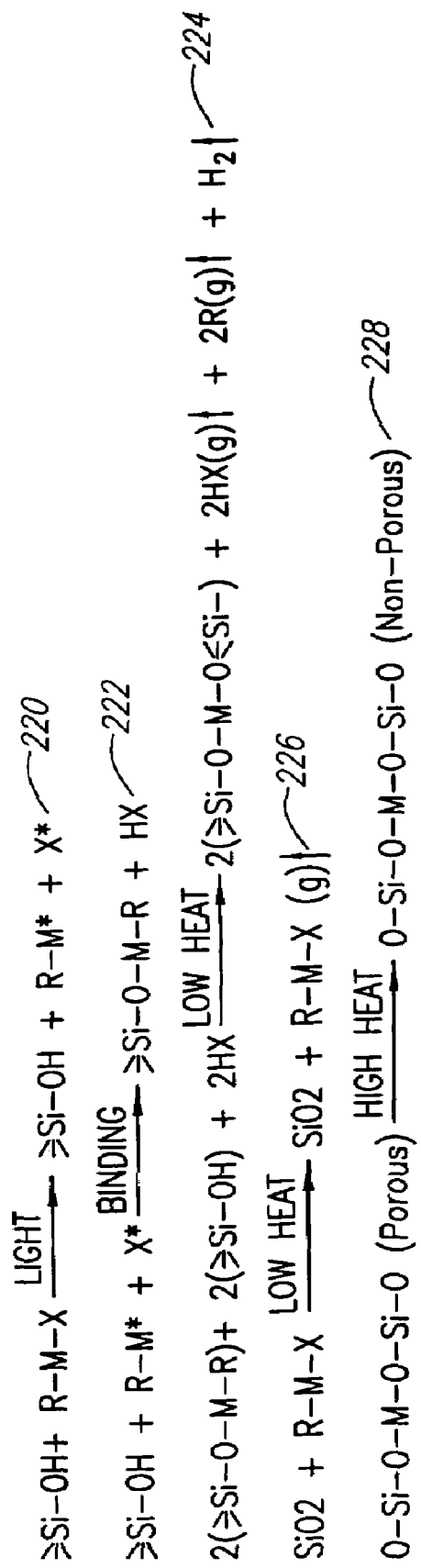
FIG. 40 illustrates a postulated photochemical reaction that allows a refractive index pattern to be permanently imprinted into film coatings of the preferred photosensitive sol-gel material.

FIG. 40 illustrates a postulated photochemical reaction for the organometallic photosensitizers in a silica based sol-gel glass material. As illustrated in FIG. 40, the photochemical reaction followed by a heat treatment leads to the formation of a photoproduced metal oxide that permits selective modification of the refractive index of the resulting sol-gel derived glass material.

The individual steps that lead to the change in the refractive index of the resulting sol-gel derived glass material are shown in reactions 220 through 228. First, in reaction 220, the organometallic photosensitizer is photodissociated into a reactive metal radical (M*) and a photo-labile halogen radical. In a second reaction 222, the metal radical (M*) reacts rapidly with the abundant silanol (Si—OH) groups in the sol-gel glass material to form an irreversible chemical bond between the metal and the available oxygen in the sol-gel glass matrix. Binding of the metal radical to the oxide glass matrix is a key step in formation of resolved index patterns in sol-gel derived oxide glass film or films that comprise each of the layers. Concomitantly, volatile HX compounds are formed.

In a third reaction 224, a low temperature heat treatment is used to remove the organic component (R) from the metal, which allows the metal to bind to another silanol group. The end product is a metal oxide glass modifier permanently bound to the silica, or other oxide glass, matrix. Further, the photoproduced metal oxide permanently modifies the index of refraction of the glass matrix. The low temperature heat treatment also drives off the HX compounds and dissociated R component as gas. In actual practice, not only are HX compounds produced but so are $H_2$ gas molecules and $X_2$ gas molecules. In a fourth reaction 226, the same low temperature heat treatment is used to drive off any unphotolyzed photosensitizer, thus fixing the image of the imprinted index pattern and leaving behind the base sol-gel derived oxide glass matrix (a silica matrix in the example illustrated in FIG. 40) in the unexposed regions of the photosensitized sol-gel material. In a fifth reaction 228, the porosity of the resulting sol-gel derived glass matrix, as well as the photoproduced metal oxide modified sol-gel derived glass matrix, may be reduced by heating at a high temperature, typically between 200° C. and 1000° C.

Preferably the organometallic photosensitizers that are employed are highly volatile so that all of the unphotolyzed photosensitizer may be readily removed following the image writing step 218 with a low temperature heat treatment in the fixing step 220 discussed below. For purposes of the present application, a photosensitizer is considered highly volatile if it has a vapor pressure greater than or equal to about 20 mm Hg at 25° C. More preferably the photosensitizer has a vapor pressure greater than or equal to about 40 mm Hg at 25° C. It is also desirable for the organometallic photosensitizer to have a melting point of less than or equal to about 25° C. and a boiling point less than or equal to about 180° C. However, it is also possible to employ photosensitizers having a melting point above room temperature, but the photosensitizer must be dissolvable in the sol-gel mixture.

By setting the vapor pressure of the photosensitizer to greater than or equal to 20 mm Hg, the unphotolyzed photosensitizer can be readily evaporated from the sol-gel material at temperatures of less than 150° C. in a relatively short period of time (e.g., less than 60 minutes). Furthermore, it has also been found that the organic component(s) (R) can be readily removed from the metal radicals that have bonded to the oxide glass matrix during this low temperature heat treatment and evaporated if the photosensitizer is highly volatile. Photosensitizers that are highly volatile typically have an organic component (R) that is a very low molecular weight volatile organic constituent having three or less carbons.

It is desirable for the unphotolyzed photosensitizer and the dissociated organic components (R) to be readily evaporated at temperatures of less than 150° C., because as the fixing temperature increases above approximately 150 to 200° C., the sol-gel derived glass matrix begins to densify. Furthermore, as the porosity of the glass matrix is decreased it becomes more difficult to remove the organic compounds from the matrix, which in turn can lead to bubbles or other discontinuities in the glass matrix. This, however, tends to be more of a problem for films that are thicker than 2 μm than those that are less than 2 μm.

Returning to FIG. 39, after the photosensitive sol-gel glass mixture for the desired layer is prepared in steps 210, 212, it is coated onto the substrate 52 in step 214. Depending on which layer of the waveguide structure or optical coupler is being formed in step 214, the layer may actually be formed directly on substrate 52, such as in the case of vertically adjacent cladding layer 58, or it may be formed on a preceding layer, such as in the case of waveguiding layer 46. The photosensitive sol-gel mixture may, for example, be coated onto substrate 52 using spin coating, dip coating or spraying techniques known in the art. Preferably the photosensitive sol-gel mixture is spin coated. The photosensitive sol-gel film may typically be spin coated at a speed from approximately 250 rpm to approximately 2000 rpm. The selected speed should be sufficient to produce a film of uniform thickness given the viscosity of the photosensitive sol-gel material being spin coated.

Due to the reactivity of the photosensitizer, the coating step 214 is preferably carried out as soon as possible after the photosensitizer is mixed into the sol-gel mixture in step 212, and preferably within 2 hours.

In step 216, the photosensitive sol-gel film formed on substrate 216 is preferably allowed to dry at room temperature, or approximately 25° C., until the film is no longer tacky, or it can also be pre-baked at temperatures below 80° C. for less than five minutes. Partially drying the photosensitive film is desirable to facilitate subsequent handling during fabrication, especially if a contact photolithography mask is to be used in the exposure step 218. The drying step may be accomplished by storing the coated substrate in a desiccator at room temperature. A drying time of 15 to 60 minutes is typically sufficient. However, if the refractive index pattern is not to be immediately written into the photosensitive sol-gel film, the coated substrate may be stored in the desiccator, with no exposure to stray light that would photolyze the photosensitizer, for up to about 24 hours without a significant decrease in the activity of the photosensitizer.

As shown in FIG. 39, in step 218 the dried photosensitive sol-gel film is imprinted with an image of the desired index pattern by exposing a portion of the photosensitive sol-gel film to light energy patterned in the image of the desired index pattern. The patterned light photolyzes the photosensitizer within the exposed portion of the photosensitive film. When a continuous refractive index gradient is not required in the layer being fabricated, a simple binary photolithographic mask may be used to pattern the light energy. When a continuous or quasi-continuous gradient is required, however, the light energy may be patterned with a gray scale photolithographic mask. Alternatively, successive exposures through differently shaped binary photolithography masks may be used to write refractive index profiles containing quasi-continuous gradients. Each region of the exposed portion of the layer that is delivered different amounts of light energy will contain different amounts of photolyzed photosensitizer; thus, for example, a semi-continuous gradient may be written with successive exposures through binary masks that each have a slightly smaller hole in the direction of light propagation than the preceding mask.

If photolithography is used to write the image of the desired index pattern, the photolithographic mask employed may be either a contact or proximity photomask. There are advantages and disadvantages to each. Contact masks provide a sharper lithography image because refraction and other edge effects between the mask and the light are minimized. However, the removal of contact masks may compromise both the film and the mask.

Alternatively, instead of writing the index pattern by photolithography, the desired index pattern may be created by rastering a laser over the surface of the photosensitive sol-gel film in the image of the desired device (i.e., laser writing). Further, by varying the raster rate, different amounts of photosensitizer may be photolyzed within different regions of the exposed portion of the photosensitive sol-gel film, thereby permitting continuous or semi-continuous gradients to be produced in the index pattern.

Light from either a laser or arc lamp is preferably used in the image writing step 218. The light source employed should produce a wavelength of light that is sufficiently energetic to photodissociate the photosensitizer. In order to maximize the quantum yield of the photodissociation process, the wavelength corresponding to the peak of the photodissociation absorption spectrum of the photosensitizer should be used. Once the threshold photodissociation wavelength is determined, any light source producing this wavelength or smaller may be employed. For the photosensitizers disclosed in the application this will generally be light in the visible to UV range.

As noted above, both coherent and incoherent light sources may be employed. Appropriate coherent light sources include, for example, ArF excimer lasers, KrF excimer lasers, frequency multiplied YAG and Nd:YAG lasers, and Ar ion lasers. Suitable incoherent sources include, for example, Xenon flash lamps, mercury discharge lamps or tungsten halide light sources.

The amount of the change in the index of refraction between the exposed and unexposed portions of the layer will depend on the photosensitizer employed, the base sol-gel mixture, the concentration of the photosensitizer included in the photosensitive sol-gel material, and the amount of light energy delivered to the photosensitive sol-gel material. In general, however, the difference in the index of refraction between the exposed portion and unexposed portion of the device layer may be set as little as 0.001 ($\Delta n=0.007\%$) to as great as 0.012 ($\Delta n=0.9\%$) or more. For weakly guiding waveguides a $\Delta n$ of about 0.25% is typically desired. For moderately guiding waveguides $\Delta n$ of 0.3% to about 0.8% is typically desired. Whereas, for strongly guiding waveguides a $\Delta n$ of 0.8% or more may be desirable. Furthermore, for a given photosensitizer/sol-gel system the index of refraction may be continuously varied from the maximum that may be induced by complete photolysis of the photosensitizer all the way to no change, based simply on the amount of light energy delivered prior to conducting the fixing step 220.

To determine the appropriate exposure time to generate a particular index of refraction change for a given photosensitizer/sol-gel system, a simple calibration curve may be generated. Alternatively, the extent of the photochemical reaction may be optically assayed by monitoring the disappearance of the characteristic absorption peak of the photosensitizer using an appropriate light detector.

It should be noted that while in most applications photolysis of the photosensitizer will induce an increase in the index of refraction of the sol-gel derived glass, it is also possible to use the photosensitizer to induce decreases in the index of refraction of the base sol-gel matrix. This may, for example, be accomplished by selecting a photosensitizer that has an M constituent with a smaller diameter than that of the primary backbone atoms of the sol-gel derived oxide glass matrix. If photolysis of the photosensitizer induces a decrease in the index of refraction, then a negative of the index pattern may be used to imprint the index pattern in the photosensitive sol-gel film during the exposure step 218.

In step 220, the imprinted device image is fixed in the exposed sol-gel film to complete the formation of the desired layer. This may be accomplished, for example, by heating the exposed sol-gel film to a temperature between 80° C. and 1000° C. The layer may be heated by a variety of means including, for example, radiative heating, convective heating, or even microwave heating. Further, the fixing step 220 may comprise a single heat treatment or it may comprise two or more heat treatments. In general, the exposed sol-gel film should be heated at a temperature and for a time sufficient to drive off any unphotolyzed photosensitizer and to dissociate and drive off the organic component (R) from the bound glass modifier, as well as any volatile compounds resulting from the photoreaction. As noted above in connection with FIG. 40, temperatures of less than or equal to about 150° C. are generally suitable for driving off the unphotolyzed photosensitizer, as well as dissociating the organic component (R). However, if the employed photosensitizer has a vapor pressure of less than 20 mm Hg at 25° C., the fixing step is preferably carried out in a vacuum to reduce the time required to remove the unphotolyzed photosensitizer and dissociated organic compounds (R).

The fixing process should also finish polymerizing the sol-gel derived glass device layer, as well as remove water formed during the polymerization reaction and alcohol formed from the hydrolysis of the metal alkoxides included in the sol-gel. However, heat treatments at less than or equal to 150° C. are also generally suitable for this purpose.

If a photolithographic process employing a contact mask is used to write the image of the optical device into the photosensitive sol-gel film, the mask should be removed prior to fixing the image in the exposed sol-gel film.

If it is desired to reduce the porosity of the resulting sol-gel derived glass layer, then the layer may be further heat treated at a higher temperature to consolidate the sol-gel derived glass. Typically the layer will begin to consolidate when heated to temperatures greater than about 150 to 200° C. However, the higher the temperature achieved during the fixing step 220, the greater the bulk density of the resulting layer will be. Consolidation of the glass will, therefore, also increase the index of refraction of the layer, both in the exposed and unexposed portions. Thus, the final temperature at which the layer to be heated during the fixing step 220 is another parameter that may be used to adjust the final indices of refraction of the resulting layer.

If the layer is to be consolidated, the amount the layer is to be consolidated should be taken into account when determining the thickness of the original photosensitive sol-gel layer that needs to be coated on substrate 52 to achieve a final target layer thickness. Furthermore, if a layer greater than about 1 to 2 μm is required, then multiple coating steps may be employed to arrive at a layer of the desired final thickness without experiencing cracking of the sol-gel derived film. However, between each coating step, the desired refractive index pattern will need to be written into the photosensitive sol-gel film and the image fixed as discussed above in connection with steps 218 and 220. This is not the most desirable approach, however, as registration issues arise with each successive photosensitive sol-gel film deposited on substrate 52. A more desirable approach, therefore, is to add a plasticizer to the photosensitive sol-gel material so that layers greater than 2 μm, and preferably as thick as at least 10 μm, can be produced in a single film-coating step without cracking.

Suitable plasticizers include polysilane derivatives, such as organotrialkoxysilanes, organotriaminosilanes, and organotrihalosilanes. Organotrialkoxysilanes of the type R—Si—(OR)$_3$ are especially preferred, where R=H, Me, Et, Pr, i-Pr, n-Bu, i-Bu, t-Bu, hexyl, octyl, decyl, dodecyl, vinyl, phenyl, benzyl, chloromethyl, and chloromethylphenyl, with methoxy or ethoxy substituents on the silicon.

The organotrialkoxysilanes are preferred since they polymerize to produce highly cross-linked network polymers analogous to silica gels.

It is generally preferable to minimize the alkyl content of the OR substituent of the polysilane plasticizer in order to be able to remove through evaporation the hydroxyl compounds produced during the sol-gel hydrolysis reaction at lower curing temperatures (e.g. $\leq 200°$ C.). Similarly, it is also desirable to reduce the alkyl content of the R substituent to minimize the amount of organics in the resulting glass matrix. To generate an even more silica like layer, a polysilane with the R substituent having a very low molecular weight should be chosen so the R substituent can be removed through evaporation from the silica gel matrix by heating, preferably to temperatures of less than about 500° C. As the alkyl content of the R substituent of the plasticizer is increased, however, thicker films may be produced without cracking because the elasticity of the resulting sol-gel derived glass layer increases with increasing organic content.

An example of preferred sol-gel glass materials that may be used in the process illustrated in FIG. 39 to form the various layers of the waveguide structures and directional couplers of the present invention is now described.

In step 210, a sol-gel mixture was prepared by mixing together approximately 44% by volume of TEOS, approximately 44% by volume of methyltrimethoxysilane (MTMS) as a plasticizer, approximately 10% by volume of water, and approximately 2% by volume of HCl acid in a mixing vessel. The mixture was stirred until the viscosity of the base sol-gel mixture was approximately 15 centipoise.

Next, in step 212, trimethyltiniodide was added as a photosensitizer to the sol-gel mixture from step 210 in a concentration of 3.5% by volume. The photosensitizer was then mixed with the sol-gel glass mixture for 10 minutes to form a photosensitive sol-gel mixture.

In step 214, a 10 ml aliquot of the photosensitive sol-gel glass material was applied on top of a vertically adjacent cladding layer 58 previously formed on the substrate 52. The substrate was then spun at 1000 rpm for 60 seconds or until the film reached a thickness of at least 8 μm. If a thicker film is desired, a larger aliquot may be applied to the substrate and the spin rate and time adjusted until the desired thickness is achieved.

In step 216, the substrate with the coated photosensitive film was permitted to dry at 25° C. in a desiccator until it was no longer tacky. Then in step 218, the dried photosensitive sol-gel film was exposed through a binary photolithography contact mask to deep UV radiation having a wavelength of approximately 254 nm, which, for example, could be from a mercury discharge lamp, a frequency quadrupled YAG laser or a KrF excimer laser. Finally, in step 220, the imprinted image was fixed by placing the coated substrate on a hot plate heated to 150° C. and heating the exposed photosensitive sol-gel film for five minutes. A second heat treatment at 100° C. for 3 minutes was then employed to finish fixing the image in the waveguiding layer 46, as well as cure the glass matrix forming the waveguiding layer 46.

The index of refraction of the resulting doped sol-gel was about 1.42 when exposed, and 1.41 for unexposed portions. However, depending upon the concentration of photosensitizer employed and the time of exposure, the resulting index of refraction between the exposed and unexposed portions of the device layer may be varied. When trimethyltiniodide is used as a photosensitizer, the sol-gel matrix modifier is $SnO_2$.

Based on the foregoing example and description, it will be appreciated that a wide variety of refractive index patterns may be readily written into the vertically adjacent cladding layers 58 or 59, the waveguiding layers 46 or 172, and/or the interposed cladding layer 174 of the waveguide structures and directional couplers of the present invention. Each of these layers may be formed simply by exposing a film of the foregoing photosensitive sol-gel materials to light energy patterned in the image of the desired index pattern for the corresponding layer and then fixing the image. Furthermore, refractive index patterns that include continuous or quasi-continuous gradients may be written simply by grading the amount of light energy delivered to the film in the area where the gradient is desired. As noted above, the amount of light energy delivered to a film coating of the photosensitive sol-gel material may be graded with a gray-scale photolithographic mask or through the use of laser writing.

Optional protective layer 54 may be formed on top of vertically adjacent cladding layer 59 using any of the conventional techniques known in the art. For example, if protective layer 54 comprises a polymer coating, it may be formed on top of vertically adjacent cladding layer 59 using a dipping, spraying, spin coating or physical vapor deposition process. On the other hand, if protective layer 54 comprises a metal layer, it may be formed using standard physical or chemical vapor deposition techniques known in the art.

Although the invention has been described with reference to preferred embodiments and specific examples, those skilled in the art will readily appreciate that many modifications and adaptations of the invention are possible without deviating from the spirit and scope of the invention. For example, the geometry of the cores in the preceding embodiments of the invention have all been depicted as rectangular. Furthermore, the transitions in the lateral dimensions of the core, i.e. the illustrated tapers, and the refractive indices profiles in the direction of light propagation have all been depicted as being linear transitions. However, the invention is not limited to waveguides having rectangular cores. Nor is the invention limited to waveguides that exhibit variable light confinement along the direction of light propagation due to linear transitions in the core cross section or indices profiles. Indeed, it will be appreciated by those skilled in the art, that a host of other core shapes and transitions are possible, and fall within the scope of the present invention. Thus, it is to be clearly understood that this description is made only by way of example and not as a limitation on the scope of the invention as claimed below.

What is claimed is:

1. A waveguide structure comprising:
   a. a core having a lateral dimension and a vertical dimension and adapted to propagate light along a path defined by the core; and
   b. a cladding material at least partially surrounding the core, the core and the cladding material each having a refractive index profile in a direction light propagates through the core, wherein
   at least one of (1) the lateral dimension of the core or (2) the refractive index profile of the core vary along a predefined portion of the core;
   the refractive index profile of the cladding includes a gradient along the predefined portion and the refractive index profile of the cladding material comprises a refractive index profile for cladding material vertically adjacent to the core;
   wherein the core comprises a channel waveguide coupled to a taper that laterally flares out from the channel waveguide;
   the refractive index profile of the core in the region of the channel waveguide is defined by a first refractive index value, $n_1$ where the taper is coupled to the channel waveguide, where $n_1 > n_2$; and
   the refractive index profile of the cladding material vertically adjacent to the core is graded from a third refractive index value, $n_3$, at the widest point of the taper to a fourth refractive index value, $n_4$, where the taper is coupled to the channel waveguide, where $n_1 > n_4$, $n_2 > n_3$, and $n_4 > n_3$.

2. A waveguide structure according to claim 1, wherein a constant $\Delta n$ exists between the refractive index profile of the cladding material vertically adjacent to the core and the refractive index profile of the core.

3. A waveguide structure comprising:
   a. a core having a lateral dimension and a vertical dimension and adapted to propagate light along a path defined by the core; and
   b. a cladding material at least partially surrounding the core, the core and the cladding material each having a refractive index profile in direction light propagates through the core, wherein
   at least one of (1) the lateral dimension of the core or (2) the refractive index profile of the core vary along a predefined portion of the core;
   the refractive index profile of the cladding includes a gradient along the predefined portion and the refractive index profile of the cladding material comprises a refractive index profile for cladding material vertically adjacent to the core;
   the core comprises a channel waveguide coupled to a taper that laterally flares out from the channel waveguide;
   the refractive index profile of the core in the region of the channel waveguide is defined by a first refractive index value, $n_1$, and wherein the refractive index profile of the core is graded from a second index value, $n_2$, at the widest point of the taper to $n_1$ where the taper is coupled to the channel waveguide, where $n_1 > n_2$; and
   a constant $\Delta n$ value in the range of 0.2% and 0.4% exists between the refractive index profile of the cladding material vertically adjacent to the core and the refractive index profile of the core.

4. A waveguide structure comprising:
   a. a core having a lateral dimension and vertical dimension and adapted to propagate light along a path defined by the core; and
   b. a cladding material at least partially surrounding the core, the core and the cladding material each having a refractive index profile in a direction light propagates through the core; wherein
   at least one of (1) the lateral dimension of the core or (2) the refractive index profile of the core vary along a predefined portion of the core;
   the refractive index profile of the cladding includes a gradient along the predefined portion and the refractive index profile of the cladding material comprises a refractive index profile for cladding material vertically adjacent to the core;
   the core comprises a channel waveguide coupled to a taper that laterally flares out from the channel waveguide;
   the refractive index profile of the core in the region of the channel waveguide is defined by a first refractive index value, $n_1$, and wherein the refractive index profile of the core is graded from a second index value, $n_2$, at the widest point of the taper to $n_1$ where the taper is coupled to the channel waveguide, where $n_1 > n_2$; and
   the refractive index profile of the cladding material vertically adjacent to the core is defined by a third refractive index value, $n_3$, in a first and second region vertically above and below the channel waveguide, respectively, and wherein the refractive index profile of the cladding material vertically adjacent to the core is graded in a third and forth region vertically above and below taper, respectively, from a fourth refractive index value, $n_4$, at the widest point of the taper to the third refractive index value, $n_3$, where the taper is coupled to the channel waveguide, where $n_1 > n_2 > n_4 > n_3$.

5. A waveguide structure according to claim 4, wherein the cladding material comprises a second refractive index profile in the direction light propagates through the core, and the second refractive index profile comprises a refractive index profile for cladding material horizontally adjacent to the core, and wherein the second refractive index profile is defined by the third refractive index value, $n_3$.

6. A waveguide structure according to claim 4, wherein the third and fourth regions comprise second and third tapers having lateral dimensions that are substantially the same as the lateral dimensions of the taper in the core.

7. A waveguide structure according to claim 4, wherein the vertically adjacent cladding material comprises regions laterally adjacent to the third and fourth regions and the refractive index of these laterally adjacent regions is set equal to the third refractive index value, $n_3$.

8. A waveguide structure according to claim 4, wherein the difference between $n_1$ and $n_3$ is greater than or equal to 0.8% of $n_3$ and the difference between $n_2$ and $n_3$ is greater than or equal to 0.2% of $n_3$ and less than or equal to 0.4% of $n_3$.

9. A waveguide structure comprising:
   a. a core a adapted to propagate light along a path defined by the core, the core having a lateral dimension, a vertical dimension, and a first refractive index profile in a direction light propagates through the core; and
   b. a cladding material at least partially surrounding the core, the cladding material having a second and third refractive index profile in the direction light propagates through the core, the second refractive index profile defining a refractive index profile of cladding material horizontally adjacent to the core, and the third refractive index profile defining a refractive index profile of cladding material vertically adjacent to the core, wherein at least one core parameter selected from the group consisting of (1) the lateral dimension of the core and (2) the refractive index profile of the core vary along a predefined portion of the core, and wherein at least one of the second and third refractive index profiles includes a gradient along the predefined portion; wherein second and third refractive index profiles includes a gradient along the predefined portion; wherein the core comprises a channel waveguide coupled to a taper that laterally flares out from the channel waveguide;

the first refractive index profile of the core in the region of the channel waveguide is defined by a first refractive index value, $n_1$;

the first refractive index profile of the core is graded from a second index value, $n_2$, at the widest point of the taper to $n_1$ where the taper is coupled to the channel waveguide, where $n_1 > n_2$; and the third refractive index profile is graded from a third refractive index value, $n_3$, at the widest point of the taper to a fourth refractive index value, $n_4$, where the taper is coupled to the channel waveguide, where $n_1 > n_4$, $n_2 > n_3$, and $n_4 > n_3$ and wherein the second refractive index profile is characterized by a constant refractive index value equal to $n_3$.

10. A waveguide structure according to claim 9, wherein the third refractive index profile of the cladding material is defined to provide a constant $\Delta n$ with respect to the core.

11. A waveguide structure according to claim 9, wherein the third refractive index profile of the cladding material is defined to provide a constant $\Delta n$ value in the range of 0.2% and 0.4% with respect to the core.

12. A waveguide structure according to claim 9, wherein the difference between $n_1$ and $n_3$ is greater than or equal to 0.8% of $n_3$ and the difference between $n_2$ and $n_3$ is set in the range of 0.2% to 0.4% of $n_3$.

* * * * *